(12) United States Patent
Venkiteswaran et al.

(10) Patent No.: US 12,381,920 B2
(45) Date of Patent: Aug. 5, 2025

(54) APPARATUSES, COMPUTER-IMPLEMENTED METHODS, AND COMPUTER PROGRAM PRODUCTS FOR GENERATING CONTENT FOR PRESENTATION AT A COLLABORATIVE CONTENT INTERFACE BASED ON A CAPTURED CONTENT SOURCE

(71) Applicants: ATLASSIAN PTY LTD., Sydney (AU); ATLASSIAN US, INC., San Francisco, CA (US)

(72) Inventors: Sriram Venkiteswaran, Bangalore (IN); Shashank Prasad Rao, Noida (IN)

(73) Assignees: ATLASSIAN PTY, LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 17/667,251

(22) Filed: Feb. 8, 2022

(65) Prior Publication Data

US 2023/0188577 A1    Jun. 15, 2023

Related U.S. Application Data

(60) Provisional application No. 63/265,332, filed on Dec. 13, 2021.

(51) Int. Cl.
  *H04L 65/401*   (2022.01)
  *G06F 16/904*   (2019.01)
  *H04L 65/403*   (2022.01)

(52) U.S. Cl.
  CPC ........ *H04L 65/4015* (2013.01); *G06F 16/904* (2019.01); *H04L 65/403* (2013.01)

(58) Field of Classification Search
  CPC . H04L 65/4015; H04L 65/403; G06F 16/955; G06F 16/904; G06F 16/986; G06F 16/908
  See application file for complete search history.

(56) References Cited

U.S. PATENT DOCUMENTS 10,599,758 B1 * 3/2020 Yu .......................... G06F 40/169
2003/0220905 A1 * 11/2003 Amado ................. G06F 40/166
(Continued)

*Primary Examiner* — Boris D Grijalva Lobos
(74) *Attorney, Agent, or Firm* — Alston & Bird LLP

(57) ABSTRACT

Methods, apparatuses, systems, and computer program products are disclosed for generating content for presentation at a collaborative content interface based on a captured content source. In example embodiments, an apparatus receives a collaborative content generation request associated with a captured content source defined by one of a source collaborative content document and an external networked location, the collaborative content generation request being associated with a collaborative content document; generates a collaborative content data object associated with the collaborative content document based on a source content data object accessed at the captured content source; stores the collaborative content data object at a system repository such that a collaborative content document data structure defining the collaborative content document includes the collaborative content data object; and causes rendering of a collaborative content interface associated with the collaborative content document based on the collaborative content document data structure and the collaborative content data object.

18 Claims, 17 Drawing Sheets

(56) References Cited

U.S. PATENT DOCUMENTS

| | | | | |
|---|---|---|---|---|
| 2009/0193345 | A1* | 7/2009 | Wensley | H04L 65/1094 |
| | | | | 715/756 |
| 2019/0132393 | A1* | 5/2019 | Ring | H04L 67/1097 |
| 2019/0208014 | A1* | 7/2019 | Goldberg | G06F 16/951 |
| 2019/0384850 | A1* | 12/2019 | Lo | G06F 16/901 |
| 2019/0391959 | A1* | 12/2019 | Niu | G06F 16/176 |
| 2021/0099502 | A1* | 4/2021 | Stern | G06Q 10/103 |
| 2022/0036311 | A1* | 2/2022 | Didrickson | G06F 16/93 |
| 2022/0200937 | A1* | 6/2022 | Bar-On | H04L 51/04 |
| 2022/0207086 | A1* | 6/2022 | Rao | H04L 65/4015 |

* cited by examiner

← → C  🔒 HTTPS://WWW.PAGEA.COM  ☆ ♡ ⊙

HOME  RECENT▼  SPACES▼  PEOPLE  APPS▼  [CREATE]   [🔍 SEARCH]   ✏ ♡ ★ ⊙ 🗎 [PUBLISH] ⋯

MOLLY'S CORNER

≡ OVERVIEW
❞ BLOG
⊢ ANALYTICS
⊙ SPACE SETTINGS

SPACE SHORTCUTS
🗋 MARS LANDER
🗋 LUNAR ROVER

PAGES
• TOP SECRET
• MARS MISSION 2021
   • MISSING PIECES ← 802
• LAUNCH PLANS

MOLLY'S CORNER / MARS MISSION 2021 / MISSING PIECES ← 800

MISSING PIECES ← 804

🔍 CREATED BY ALANA CRAVE
    LAST UPDATES 4 HRS AGO.  LET ANALYZE ← 808

○ THE MISSION NEEDS TO START IN ABOUT 8 MONTHS AND WE AREN'T THERE YET. I'M CREATING
   THIS SPACE HERE TO DOCUMENT SOME MISSING PIECES

○ BEAMED SOURCE: ☐ WALKING UNDERWATER  ☐ BREATHING GEARS  ☐ WWW.SPACEX.COM    ← 814

☐ WALKING UNDERWATER ← 820
BACKGROUND ← 816

THE GUIDE TOLD US THAT IF WE WERE TO GO TO MARS, WE WOULD EXPERIENCE THE SAME
AMOUNT OF GRAVITY AND ATMOSPHERE.  SO IF ANYONE WOULD BE TRAVELING TO THE LITTLE
RED PLANET, PLEASE MAKE SURE THAT.

• YOUR CALCIUM LEVELS ARE ABOVE 30% OF MEAN VALUE FROM THE AVERAGE PERSON.
• MAKE SURE THAT YOU CHECK YOUR SP02 LEVELS FROM THE NEXT 5 DAYS TO MAKE SURE YOU
  DON'T GET LOWER LEVELS OF O2 CONCENTRATION.
• USE THIS LINK TO GET YOURSELF TESTED BEFORE YOU GO UNDERWATER WALKING. ← 810
• YOUR HEIGHT SHOULD BETWEEN 5FT TO 7FT
• SEE THESE REFERENCES FOR MORE TRAINING

☐ BREATHING GEAR ← 818

APPARATUSES, COMPUTER-IMPLEMENTED METHODS, AND COMPUTER PROGRAM PRODUCTS FOR GENERATING CONTENT FOR PRESENTATION AT A COLLABORATIVE CONTENT INTERFACE BASED ON A CAPTURED CONTENT SOURCE

CROSS-REFERENCE TO RELATED APPLICATIONS

This application claims priority from provisional U.S. Patent Application No. 63/265,332, entitled "Apparatuses, Computer-Implemented Methods, and Computer Program Products Generating Content For Presentation at a Collaborative Content Interface Based on a Captured Content Source" and filed on Dec. 13, 2021, which is herein incorporated by reference in its entirety.

BACKGROUND

Applicant has identified a number of deficiencies and problems associated with efficiently capturing diverse content associated with various computing systems for effective presentation within a collaborative content interface. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

Various embodiments are directed to improved apparatuses, computer-implemented methods, systems, and computer program products configured for generating content for presentation at a collaborative content interface based on a captured content source. In various embodiments, an apparatus for generating content for presentation at a collaborative content interface based on a captured content source, the apparatus comprising at least one processor and at least one memory, the at least one memory having computer-coded instructions therein, wherein the computer-coded instructions are configured to, in execution with the at least one processor, cause the apparatus to: receive a first collaborative content generation request associated with a captured content source identifier associated with a captured content source defined at least in part by one of a source collaborative content document and an external networked location associated with an external resource, the first collaborative content generation request comprising a collaborative content document identifier associated with a collaborative content document; generate a first collaborative content data object associated with the collaborative content document identifier based at least in part on a source content data object accessed based on the captured content source identifier; store the first collaborative content data object at a system repository associated with a collaborative content system such that the first collaborative content data object defines at least a portion of a collaborative content document data structure associated with the collaborative content document identifier; and cause rendering of a collaborative content interface associated with the collaborative content document identifier based at least in part on the collaborative content document data structure and on the first collaborative content data object.

In various embodiments, the computer-coded instructions may be further configured to, in execution with the at least one processor, cause the apparatus to: parse the source content data object to determine source content metadata; wherein the first collaborative content data object generated based at least in part on the source content data object comprises first collaborative content metadata associated with a first collaborative content data object identifier associated with the first collaborative content data object, the first collaborative content metadata being generated based at least in part on the source content metadata. In various embodiments, the collaborative content interface may be further configured to display at least a portion of the first collaborative content metadata. In various embodiments, causing rendering of the collaborative content interface may be based at least in part on a collaborative content document selection associated with the collaborative content document identifier and initiated at the authorized client device; and wherein the authorized client device is associated with a user identifier associated with a user profile authorized to access the collaborative content document.

In various embodiments, the first collaborative content generation request may be initiated at a client device associated with a first user identifier associated with a first user profile authorized to access the collaborative content document. In various embodiments, the computer-coded instructions may be further configured to, in execution with the at least one processor, cause the apparatus to: receive from the client device a selection of a user engagement capture content generation element displayed at the client device; and retrieve from the system repository first user profile data associated with the first user identifier, wherein the first user profile data comprises one or more collaborative content document identifiers respectively associated with one or more collaborative content documents that the first user profile associated with the first user identifier is authorized to access. In certain embodiments, the computer-coded instructions may be further configured to, in execution with the at least one processor, cause the apparatus to: display at the client device an interactive dialog based at least in part on the first user profile data, wherein the interactive dialog comprises one or more selectable elements corresponding to the one or more collaborative content document identifiers retrieved from the system repository; and receive a collaborative content document selection associated with the collaborative document identifier from the client device, the collaborative content document selection being defined by user input provided to the interactive dialog and comprising a selection of a selectable element corresponding to the collaborative content document. In various embodiments, the computer-coded instructions may be further configured to, in execution with the at least one processor, cause the apparatus to: receive first user credentials associated with the first user profile associated with the first user identifier from the client device as user input provided at the client device.

In various embodiments, the computer-coded instructions may be further configured to, in execution with the at least one processor, cause the apparatus to: identify a second collaborative content generation request associated with a second captured content source, the second collaborative content generation request comprising the collaborative content document identifier associated with the collaborative content document, and a second source content data object associated with the second captured content source; generate a second collaborative content data object based at least in part on the second source content data object, wherein the second collaborative content data object is assigned a second collaborative content data object identifier; associate the generated second collaborative content data object with the collaborative content document identifier; store the second collaborative content data object at the system repository such that the second collaborative content data object defines at least a portion of the collaborative content document data structure associated with the collaborative content document identifier; and generate an updated collaborative content interface associated with the collaborative content document identifier based at least in part on the collaborative content document data structure such that the updated collaborative content interface is configured to display at least a portion of the second collaborative content data object. In various embodiments, the first collaborative content generation request may further comprise a source content type identifier and a first user identifier associated with a first user profile.

In various embodiments, the captured content source may be defined at least in part by an external networked location associated with an external resource, wherein the source content data object is defined at least in part by external content stored on the external resource. In certain embodiments, the computer-coded instructions may be further configured to, in execution with the at least one processor, cause the apparatus to: receive the source content data object from the external resource in an unsupported format defined by the external resource; and processing at least a portion of the source content data object so as to convert the source content data object into a supported format in association with generating the first collaborative content data object. In certain embodiments, the source content data object may be received via a proxy endpoint configured to facilitate communication between a collaborative content server associated with the collaborative content system and the external resource, the proxy endpoint being defined at least in part by an application program interface (API). In various embodiments, the external networked location may comprise a webpage hosted by the external resource and displayed at the authorized client device via a web-based browser service. In certain embodiments, processing the at least a portion of the source content data object may comprise extracting inline-HTML elements of the source content data object. Further, in various embodiments, at least a portion of the collaborative content system may be defined by a plug-in of the web-based browser service. In certain embodiments, the collaborative content interface may be further configured to display a selectable element comprising a link to the external networked location.

In various embodiments, the captured content source may be defined at least in part by a source collaborative content document associated with the collaborative content system, wherein the source content data object is defined at least in part by a source collaborative content data object that is accessible to a collaborative content server of the collaborative content system, wherein the captured content source identifier comprises a source collaborative content document identifier associated with the source collaborative content document, and wherein generating the first collaborative content data object associated with the collaborative content document identifier comprises appending the source content data object to the collaborative content document data structure associated with the collaborative content document identifier. In certain embodiments, the collaborative content interface may be further configured to display a selectable element comprising a link to the source collaborative content document.

In various embodiments, the computer-coded instructions may be further configured to, in execution with the at least one processor, cause the apparatus to: identify a second collaborative content generation request associated with a second captured content source identifier associated with a second captured content source, the second collaborative content generation request comprising the collaborative content document identifier associated with the collaborative content document, and a second source content data object associated with the second captured content source identifier, wherein the second captured content source is defined at least in part by an external networked location associated with an external resource, wherein the source content data object is defined at least in part by external content stored on the external resource; generate a second collaborative content data object based at least in part on the second source content data object, wherein the second collaborative content data object is assigned a second collaborative content data object identifier; associate the generated second collaborative content data object with the collaborative content document identifier; store the second collaborative content data object at the system repository such that the second collaborative content data object defines at least a portion of the collaborative content document data structure associated with the collaborative content document identifier; and generate an updated collaborative content interface associated with the collaborative content document identifier based at least in part on the collaborative content document data structure such that the updated collaborative content interface is configured to display at least a portion of the first collaborative content data object and at least a portion of the second collaborative content data object.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 5A-5C illustrate various example collaborative content interfaces structured in accordance with some example embodiments described herein;

FIGS. 8A-8B illustrate an example collaborative content interfaces structured in accordance with some example embodiments described herein.

DETAILED DESCRIPTION

Figure 1:
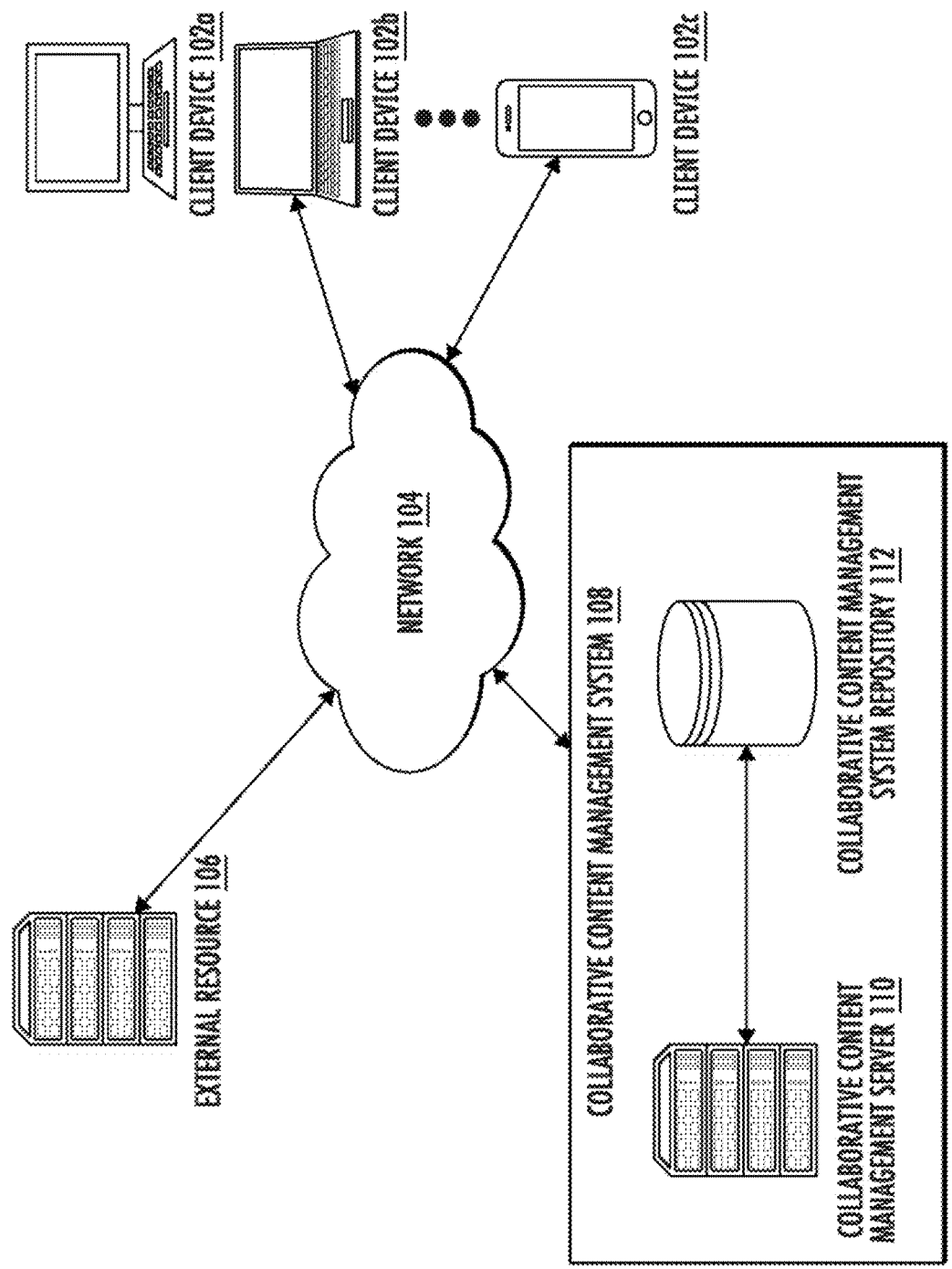
FIG. 1 is a block diagram of an example collaborative content management system configured to communicate with an external resource and two or more client devices in accordance with some example embodiments described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Embodiments of the present disclosure now will be described more fully hereinafter with reference to the accompanying drawings, in which some, but not all embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

As web-based technologies have continued to evolve, robust networked communication capabilities have led to an increase in the amount of data that is collected, stored, disseminated, and shared between computing devices. Where network access continues to become more ubiquitous, the amount of content available to a user of a networked computing device has grown exponentially. The increased volume of publicly available content available via the internet has been accompanied by an increase in the diversity of the type of content that may be accessed by a user and the format in which that content is hosted by the corresponding resource at which it is stored. Accordingly, systems configured to facilitate the collection and organization of content captured from various locations throughout the internet have been developed.

Many third-party systems that purport to execute such means of content collection may lack functionality with respect to capturing a diverse variety of external content from various networked sources and presenting the collected content within the third-party system in a consistently organized manner within a single user interface that is easily consumable to one or more users. These problems may be exacerbated by the large number of content-hosting external resources with data that is accessible to a user via a networked device, and more specifically, the varying scope of operations and resources exhibited throughout the internet leading to a vast number of fragmented protocols defined by inconsistent data processing platforms. Accordingly, the resultant production of captured external content by such third-party systems is often defined by a piecemeal collective of inconsistent data and/or misrepresented content that leads to inefficiencies in user consumption of the content captured by the third-party system. Accordingly, the inventors have determined it would be desirable and advantageous to create a collaborative content management system that is configured to, based on diverse content captured from one or more captured content sources, programmatically generate content for presentation within a collaborative content interface that may be accessed by one or more authorized users.

Various embodiments of the present disclosure provide apparatuses, systems, computer-implemented methods, and computer program products for generating content for presentation at a collaborative content interface accessible to at least one user based on a captured content source. Various embodiments described herein are directed to collaborative content management systems configured for receiving a collaborative content generation request associated with a captured content source such as, for example, either a source collaborative content document associated with the collaborative content management system or an external networked location associated with an external resource, and generating a collaborative content data object based at least in part on a source content data object associated with the captured content source. A collaborative content management system stores the generated collaborative content data object in a supported format as part of a collaborative content document data structure associated with a collaborative content document identifier at a collaborative content management system repository such that, upon a subsequent user request to access the collaborative content document associated with the collaborative content document identifier, the collaborative content data object generated based on the source content data object may be retrieved and rendered within a structured collaborative content interface. For example, collaborative content management systems described herein are configured to execute a content generation workflow to capture either a collaborative content data object from a source collaborative content document or external content from an external networked location without requiring a user that initiated the collaborative content generation request to be navigated away from the captured content source (e.g., the source collaborative content document or the external networked location).

Collaborative content management systems described herein are particularly preferred when compared to computing systems that lack functionality with respect to capturing external content hosted by an external resource in a format defined by the external resource (e.g., a webpage, PDF, image, text hosted by an external resource in a format that is not native to the third-party system), for storing at the third-party system in a supported format such that the content can be rendered within a system-generated interface according to a uniform collaborative content document structure that is recognizable and thus, easily navigable for a user of the system. Further, various collaborative content management systems described herein overcome operational inefficiencies caused by increased time of user operation that is required by system architectures requiring navigation away from a captured content source in order to execute the capture and/or storage of content from the captured content source, thereby increasing productivity by minimizing interruption of user access to the captured content source. Further, various collaborative content management systems described herein facilitate the capture of content spanning a diverse variety of content types and/or captured content sources, and the subsequent organization of generated collaborative content data objects based on the captured content within a collaborative content interface such that the captured content (e.g., text elements, image elements, webpage elements, collaborative content document elements, and/or the like from one or both of collaborative content documents and external networked locations) is accurately represented as part of a collaborative content document associated with the collaborative content management system in a substantially quick, intuitive, efficient, and seamless manner.

Definitions

In some embodiments, some of the operations above may be modified or further amplified. Furthermore, in some embodiments, additional optional operations may be included. Modifications, amplifications, or additions to the operations above may be performed in any order and in any combination.

"Collaborative content management system" is used to refer to a hardware and software platform for generating content for presentation at a collaborative content interface based on user-identified existing content from one or more networked computing environments. The collaborative content management system comprises an apparatus comprising at least one processor, and at least one non-transitory memory comprising instructions that, with the at least one processor, cause the apparatus to execute one or more content generation operations defining a content generation workflow associated with a collaborative content data object identifier. In some examples, the collaborative content management system may take the form of one or more collaborative content management servers disposed in communication with one or more additional servers running software applications, and having access to one or more databases storing digital content items, application-related data, and/or the like. In certain embodiments, the collaborative content management system is defined by a collection of computing devices including a collaborative content management server, a collaborative content management system repository, and one or more networked devices.

"Collaborative content management server" refers to a software platform and associated hardware that is configured to generate and/or manage collaborative content interface(s) corresponding to collaborative content document(s) in association with the collaborative content management system. The collaborative content server is defined by one or more computing devices associated with a collaborative content management system and configured to receive, store, and otherwise process data in order to execute content generation workflows by interacting with various networked devices and/or external resources. In various embodiments, a collaborative content management server is configured to receive, generate, transmit, store, and/or otherwise process data including data structures, data objects, data elements, and/or the like to be used within the collaborative content management system and/or communicated between the collaborative content management system and an external resource. For example, a collaborative content management server is configured to execute various instructions, actions, and/or the like so as to enable the collaborative content management system to execute at least a portion of a content generation operation. The collaborative content management server is accessible via one or more computing devices, is configured to identify and/or receive collaborative content generation requests, generate a collaborative content data object based on a source content data object, generate a collaborative content interface associated with a collaborative content document, and access one or more data repositories, such as a collaborative content management system repository. The functionality of the collaborative content management server may be provided via a single server or a collection of servers having a common functionality, or the functionality of the collaborative content management server may be segmented among a plurality of servers or collections of servers performing subsets of the described functionality of the collaborative content management server, such as in a cloud networking environment.

A collaborative content management server may update and/or maintain a shared dynamic collaborative content interface that provides for team collaborative work. For example, in some embodiments, the collaborative content management server is configured to enable a plurality of users (e.g., authorized users) to access, display, and/or modify/edit a dynamic collaborative content interface at the same time. Changes made by respective users to a shared dynamic collaborative content interface can be automatically stored/saved and synced between all users in real-time. For example, a first user associated with the collaborative content interface may cause the collaborative content management server to execute a content generation workflow such that a collaborative content data object corresponding to a source content data object (e.g., a text element, an image element, a webpage, a collaborative content document) is generated and appended to an updated dynamic collaborative content interface such that other users associated with the collaborative content interface can view the updated dynamic collaborative content interface comprising the generated collaborative content data object (i.e. at least a portion of the source content data object) in real time, without the first user having to navigate away from a captured content source.

"Collaborative content management system repository" refers to a database or computing location associated with a collaborative content management system where data is stored, accessed, modified and otherwise maintained by the collaborative content management system. The collaborative content management system repository may be used by the collaborative content management system to store data, including supported data structures (e.g., collaborative content document data structures), in order to facilitate at least one operation of the collaborative content management system, such as, for example, a content generation operation. The collaborative content management system repository facilitates storage of various data, including collaborative content document data structures (e.g., collaborative content data objects), in a supported format defined by a data storage protocol that is native to the collaborative content management system. In certain embodiments, the collaborative content management system repository embodies a data storage device or devices, a separate database server or servers, or as a combination of data storage devices and separate database servers. Further, in some embodiments, the collaborative content management system repository may be embodied as a distributed repository such that some of the stored data is stored centrally in a location within the collaborative content management system and other data stored in a single remote location or a plurality of remote locations. Alternatively, in some embodiments, the collaborative content management system repository may be distributed over a plurality of remote storage locations only such as in a cloud storage environment. For example, the collaborative content management system repository includes one or more of collaborative content interface(s), collaborative content document data structures (e.g., collaborative content data objects), collaborative content document identifier(s), user identifier(s), and/or the like. The collaborative content management system repository may be dynamically updated or be static. In some embodiments, the collaborative content management system repository is encrypted in order to limit unauthorized access of such collaborative contextual summary interface data.

"Client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user (e.g., a user identifier). In some embodiments, an association is created by a client device transmitting authentication information associated with a user profile associated with the user (e.g., a user identifier) for a collaborative content document (e.g., a collaborative content document identifier) to a collaborative content management system.

"Authorized client device" refers to a client device associated with a user identifier identified as being associated with a user profile having authorization credentials to access a collaborative content document within the collaborative content management system. In some embodiments, a client device embodies an authorized client device with respect to a particular collaborative content document, such that the authorized client device is associated with a user identifier that is associated with a collaborative content document identifier associated with the particular collaborative content document. For example, an association of a client device with a user identifier associated with an authorized user profile such that the client device embodies an authorized client device with respect to a selected collaborative content document is created by the client device transmitting authentication information (e.g., authorization credentials) associated with the user profile for the selected collaborative content document to an external resource and/or a collaborative content document management system. In such a circumstance, the collaborative content management server ay cause rendering of the particular collaborative content interface at the authorized client device.

"Collaborative content document" refers to a data construct that describes contents of a text-based format file (e.g., a Rich Text Format (RTF) file), where the contents of the text-based format file are configured to be editable/accessible by two or more user profiles. The collaborative content document is stored in a specific format native to a collaborative content management system (e.g., a "supported format") that enables the functionality of the collaborative content document within the collaborative content management system. A collaborative content document stored in the supported format is defined by a collaborative content document data structure that is stored in a storage subsystem of a collaborative content management system comprising the collaborative content management server. As non-limiting examples, a collaborative content document is defined by a collaborative content document data structure stored by a collaborative content management system for operability in systems such as Confluence®, Jira®, Trello®, Opsgenie®, Halp®, Statuspage®, Bitbucket®, Sourcetree®, Bamboo®, Fisheye®, Crucible®, Atlassian Access®, Crowd®, and/or the like, or any other collaborative content management system configured to operate using Atlassian Document Format (ADF), and any other software platforms apparent to one of ordinary skill in the art. An example of a collaborative content document is a Confluence® page. For example, the collaborative content management server may enable a first user profile to share a collaborative content document with one or more other user profiles, where each of the one or more user profiles may be given defined read/write access privileges.

The term "collaborative content document identifier" is used to refer to one or more items of data by which a source collaborative content document is uniquely identified within a collaborative content management system. For example, a collaborative content document identifier may comprise text string(s), numerical character(s), alphabetical character(s), alphanumeric code(s), ASCII character(s), a pointer, an IP address, a MAC address, a memory address, other unique identifier, or a combination thereof.

"Collaborative content document data structure" refers to a collection of data capable of being collectively transmitted, received, and/or stored. For example, a collaborative content document data structure is a collection of data (e.g., one or more collaborative content data objects) defined by a supported data format that is stored and/or used by a collaborative content management system and corresponds to a collaborative content document. A collaborative content document is defined by the collaborative content document data structure associated with the collaborative content document identifier associated with the collaborative content document. A collaborative content document data structure is defined by one or more collaborative content data objects associated with the corresponding collaborative content document identifier, such that at least a portion of the collaborative content document associated therewith is defined by the one or more collaborative content data objects. In various embodiments, each of the one or more collaborative content data objects of a collaborative content document data structure is associated with a common collaborative content document identifier. For example, in various embodiments, a collaborative content document data structure comprises a collection of data (e.g., one or more collaborative content data objects) associated with a common collaborative content document identifier and stored by the collaborative content management system in a supported format such that at least a portion of the data (e.g., the one or more collaborative content data objects) is renderable for display within a collaborative content interface associated with the collaborative content document identifier. In various embodiments, a collaborative content document data structure can include a collaborative content data object generated by the collaborative content management server based at least in part on source content data object received and/or retrieved from a captured content source. For example, a collaborative content document data structure can include a collaborative content data object embodying converted unsupported data received and/or retrieved from an external resource (e.g., external content) by the collaborative content management server that was converted from an unsupported format to a supported format by the collaborative content management server. Further, in certain embodiments, a collaborative content document data structure can include a collaborative content data object that was extracted by the collaborative content management server from another collaborative content document data structure within the collaborative content management system (e.g., a collaborative content document data structure associated with a source collaborative content document identifier) and appended to the collaborative content interface associated with the collaborative content document data structure. Further, a collaborative content document data structure can include a collaborative content data object that was retrieved from one or more systems that are associated with the collaborative content management system such that the data object retrieved from the one or more systems is in a supported format, such as, for example, a data object defined by Atlassian® Document Format (ADF) that is received from, for example, one or more servers associated with Jira®, Trello®, and/or the like.

A collaborative content document data structure is stored within the collaborative content management system repository of the collaborative content management system in a supported format, such that the collaborative content management system is configured to operate with various data (e.g., source content data objects) received from a plurality of different captured content sources—each of which may operate using a respective unsupported format—using a singular format supported by the collaborative content management system. For example, a supported format utilizes stored data storage protocols native to the collaborative content management system under an architecture that is operatively managed by the collaborative content management system. By contrast, an unsupported format is a data storage format that does not embody such a supported format.

In various embodiments, a collaborative content document data structure is selectively associated with at least a portion of a source content data object, such as a source collaborative content data object extracted from a source collaborative content document and/or external content received from an external resource by a collaborative content management system (e.g., a collaborative content management server), in a content generation workflow. The collaborative content management system selectively associates at least a portion of a source content data object received from the captured content source with the collaborative content document data structure associated with the collaborative content document identifier, so as to define an updated collaborative content document data structure configured for storage at the collaborative content management system repository. Such an updated collaborative content document data structure is configured such that an updated collaborative content interface generated by the collaborative content management server based on the updated collaborative content document data structure is configured to display at least a portion of the collaborative content data object generated by the collaborative content management server in the content generation workflow.

"Collaborative content interface" refers to a user interface or sub-user interface associated with the collaborative content management system that is configured for rendering one or more collaborative content data objects associated therewith to a visual display (e.g., at an authorized client device). A collaborative content interface is specially configured to enable a user associated with a user profile that is associated with access credentials corresponding to the collaborative content interface to access, review, create, modify/edit, and/or identify one or more collaborative content data objects provided within a collaborative content document. Exemplary collaborative content interfaces are stored within the collaborative content management system (e.g., at a the collaborative content management system repository) and may be rendered in any desired form including, but not limited to, as a mobile application for display on a mobile computing device (e.g., a smartphone, table computer, etc.), a webpage or website for display on a mobile or non-mobile computing device via the Internet, and the like. In some embodiments, a collaborative content interface sis interactable such that the user may perform various user interaction(s) with the one or more structured interface elements defined within the interface, each of which may correspond to a unique functionality of the collaborative content interface. In particular, it should be appreciated that in various example contexts, a collaborative content interface provides access to particular functionality of a collaborative content management system via one or more computing devices (e.g., initiation of one or more processes, communication with a remote processing server configured to perform particular functionality, and/or updating of renderings to a display). In certain embodiments, a collaborative content interface is configured to render a collaborative content data object that was generated by the collaborative content management server via a content generation workflow and corresponds at least in part to a source content data object accessed by a user at captured content source that is distinct from the collaborative content document associated with the collaborative content interface, so as to facilitate user interaction with the rendered collaborative content data object within the collaborative content management system at the user-identified collaborative content interface.

"Collaborative content data object" refers to a collection of data (e.g., content) and/or instructions that represent an item stored in a supported format by the collaborative content management server so as to be operable within a collaborative content management system for rendering within a collaborative content interface. For example, a collaborative content data object defines a portion of a collaborative content document data structure associated with a collaborative content document identifier and is configured for display within a collaborative content interface corresponding thereto. A collaborative content data object is associated with a collaborative content data object identifier that uniquely identifies the collaborative content data object within the collaborative content management system, and is defined by a content type (defined herein) which describes the category of content to which the collaborative content data object corresponds (e.g., a text content type, an image content type, a webpage type, a collaborative content document type, and/or the like).

In certain circumstances, a collaborative content data object will be generated by a collaborative content management server via a content generation workflow initiated by a collaborative content generation request associated with a source content data object and a collaborative content document identifier. For example, in certain circumstances, a collaborative content data object refers to electronically managed data that represents a copied, appended, mirrored, and/or otherwise at least partially reproduced version of the source content data object accessed by a user at the captured content source that is stored in a supported data format within the collaborative content management system so as to define at least a portion of a collaborative content document and be configured for rendering within a collaborative content interface corresponding to the collaborative content document. A collaborative content data object is assigned a collaborative content data object identifier by a computing device (e.g., collaborative content management server) and can be stored in a supported format at a data repository (e.g., collaborative content management system repository) as the data representation of the source content data object that the user requested be copied, appended, mirrored, and/or otherwise at least partially reproduced in association with a collaborative content document identifier for display within a collaborative content interface associated with the user (e.g., the user identifier).

In certain circumstances, a collaborative content data object embodies converted unsupported data received and/or retrieved from an external resource (e.g., external content) by the collaborative content management server that was converted from an unsupported format to a supported format and associated with a collaborative content document identifier by the collaborative content management server. The collaborative content management server may generate the collaborative content data object by executing one or more data processing operations associated with the external content such that the collaborative content data object corresponding thereto defined by a supported format. Such data processing operations may include, for example, removing javascript elements and/or CSS text elements from the external content.

Further, in certain embodiments, a source content data object may comprise a source collaborative content data object such that a collaborative content data object is extracted by the collaborative content management server from another collaborative content document data structure within the collaborative content management system (e.g., a collaborative content document data structure associated corresponding to the source collaborative content document) and appended to the collaborative content interface associated with the collaborative content document data structure.

Example collaborative content data objects include one or more text elements, one or more image elements, a webpage, a collaborative content document, and/or the like, including collaborative content metadata generated in association therewith. For example, collaborative content metadata associated with a collaborative content data object identifier associated with a collaborative content data object may define at least a portion of the collaborative content data object, and may be generated by the collaborative content management server based at least in part on source content metadata associated with the source content data object. A collaborative content data object may be defined at least in part on collaborative content metadata that is retrieved by the collaborative content management server by parsing the source content data object and/or the captured content source associated therewith. As non-limiting examples, a collaborative content data object may include collaborative content metadata comprising a title identifier, an author identifier, a captured content source identifier, a user identifier, and/or other metadata corresponding to source content metadata associated with the source content data object and/or the captured content source.

The term "collaborative content data object identifier" is used to refer to one or more items of data by which a collaborative content data object is uniquely identified within a collaborative content management system. For example, a collaborative content data object identifier may comprise text string(s), numerical character(s), alphabetical character(s), alphanumeric code(s), ASCII character(s), a pointer, an IP address, a MAC address, a memory address, other unique identifier, or a combination thereof.

"Collaborative content generation request" refers to an electrically generated digital signal created by a computing device (e.g., an authorized client device) indicating that a user has provided a user input comprising a request to copy, mirror, and/or otherwise at least partially reproduce a source content data object accessed by the user at a captured content source for posting, appending, and/or otherwise displaying at least a portion of the source content data object within a collaborative content interface associated with the user (e.g., a user identifier). In certain embodiments of the present disclosure, a collaborative content data object corresponding to (e.g., mirroring) the source content data object of the collaborative content generation request is generated by the collaborative content management server and associated with a collaborative content document identifier such that at least a portion of the source content data object from the captured content source can be shared among and accessed by authorized client devices associated with the collaborative content document identifier via a collaborative content interface.

In certain embodiments, a collaborative content generation request may be represented via a temporary code that is transmitted to a recipient (e.g., a collaborative content management server) as an indication that a user has made the request. To provide further context, in one embodiment, a collaborative content generation request is generated in response to user input (e.g., user engagement) that corresponds to a selection of an interface element (e.g., a user engagement capture content generation element) associated with a source content data object rendered on a user interface corresponding to a captured content source that is being accessed by the user via an authorized client device (e.g., a user clicking on a user engagement capture content generation element associated with a source content data object). A collaborative content generation request embodies a user selection of a source content data object indicating a request by the user to generate a collaborative content data object based on the source content data object and append the collaborative content data object to a collaborative content document associated with the user (e.g., the user identifier) such that at least a portion of the source content data object is rendered within the collaborative content interface corresponding to the collaborative content document. In some embodiments, the collaborative content generation request is associated with a variety of metadata such as one or more of a captured content source identifier, a user identifier, a content type identifier, a timestamp value (e.g., associated with the receipt of the user input initiating the request), and/or other data for use in generating, updating, or otherwise supporting a collaborative content interface as described herein. The collaborative content generation request is configured to trigger the apparatus (e.g., a collaborative content management server) to initiate a content generation workflow that may culminate in the generation or updating of a collaborative content interface that includes a collaborative content data object (e.g., including a text element, an image, a webpage, a collaborative content document, and/or the like, or any combination thereof) corresponding to the source content data object associated with the collaborative content generation request.

"Captured content source" refers to a networked computing environment and/or a specific networked location within a computing environment that can be accessed, via a network connection, by a user through a client device that is in communication with the collaborative content management server. A captured content source is a networked computing environment defined in part by content (e.g., a collaborative content data object and/or external content) associated with the captured content source that is accessible to the user to enable a content generation functionality of the collaborative content management system with respect to the content. For example, a collaborative content generation request is initiated by user input (e.g., engagement) to a computing device (e.g., a client device) that is indicative of a user selection of a data object presented at a networked computing environment that the user accessing the networked computing environment requests be copied, appended, posted, and/or otherwise at least partially reproduced to a collaborative content document via a content generation workflow executed by the collaborative content management server. A captured content source is defined by the networked computing environment from which the source content data object (i.e. the data object selected by the user input) associated with the collaborative content generation request is accessed by the user. For example, a captured content source may comprise an external networked location in certain circumstances wherein a source content data object comprises external content (e.g., wherein a collaborative content generation request is initiated by user input corresponding to a data object comprising external content). Further, a captured content source may comprise a source collaborative content document in certain circumstances wherein a source content data object comprises a source collaborative content data object (e.g., wherein a collaborative content generation request is initiated by user input corresponding to a data object comprising a collaborative content data object displayed within a collaborative content interface).

The term "captured content source identifier" is used to refer to one or more items of data by which a captured content source is uniquely identified within a collaborative content management system. For example, a captured content source identifier may comprise text string(s), numerical character(s), alphabetical character(s), alphanumeric code(s), ASCII character(s), a pointer, an IP address, a MAC address, a memory address, other unique identifier, or a combination thereof.

"Source content data object" refers to a data object provided at a captured content source and presented to a user via a user interface associated with the captured content source and displayed at a client device. The source content data object is a data object provided at a captured content source that a user accessing the captured content source requests be copied, appended, posted, and/or otherwise at least partially reproduced to a collaborative content document within the collaborative content management system such that a collaborative content interface corresponding to the collaborative content document is configured to display at least a portion of the source content data object. For example, the collaborative content management server may execute a content generation workflow to generate a collaborative content data object corresponding at least in part to the source content data object such that updating and/or generating a collaborative content interface to include the generated collaborative content data object comprises displaying content that is at least substantially similar to that of the source content data object within the collaborative content interface. As non-limiting examples, a source content data object may be defined at least in part by one or more text elements, one or more image elements, a webpage, a collaborative content document, and/or the like.

In certain circumstances, wherein a collaborative content generation request is initiated by user input at a client device via a user interface corresponding to an external networked location associated with (e.g., hosted by) an external resource, that source content data object comprises external content associated with the external resource. For example, "external content" that defines a source content data object may be stored by an external resource (e.g., at a repository associated therewith) in an unsupported format. As non-limiting examples, external content defining a source content data object may comprise a webpage accessed by the user via a web-based browser, one or more text elements provided at the webpage, and/or one or more image elements provided at the webpage. In certain circumstances wherein the collaborative content generation request is associated with external content that is provided by an external resource at an external networked location accessed by the user via the client device, the captured content source at which the user accesses the source collaborative content data object comprises the external networked location at which the external content is provided by the external resource and accessed by the user. For example, an "external networked location" may be an externally-hosted computing location (e.g., a page, application, file, and/or the like) that is operated by an external resource and is accessible via a network, such as, for example, the Internet, to a user associated with a computing device (e.g., an authorized client device) in communication with the collaborative content management system (e.g., the collaborative content management server). A non-limiting example of an external networked location is an HTML webpage hosted by an external resource that is accessible to a user via a web-based browser.

Further, in certain circumstances, wherein a collaborative content generation request is initiated by user input at a client device via a collaborative content interface corresponding to a collaborative content document (e.g., a source collaborative content document) associated with the collaborative content management system, that source content data object comprises a source collaborative content data object associated with the collaborative content management system. For example, a source content data object comprising a source collaborative content data object is stored within the collaborative content management system (e.g., at a collaborative content management system repository) in a supported format. In certain circumstances wherein the collaborative content generation request is associated with a source collaborative content data object presented to the user via a collaborative content interface displayed at the client device, the captured content source comprises a "source collaborative content document" that is defined by the collaborative content document corresponding to the collaborative content interface displaying the source collaborative content data object (e.g., the collaborative content document associated with the collaborative content document identifier that is associated with the collaborative content interface). As non-limiting examples, a source collaborative content data object may comprise a collaborative content document corresponding to the collaborative content interface displayed at the client device, one or more text elements provided within the collaborative content document displayed via the collaborative content interface, and/or one or more image elements provided within the collaborative content document displayed via the collaborative content interface.

"Source collaborative content document identifier" refers to one or more items of data by which a source collaborative content document is uniquely identified within a collaborative content management system. For example, a source collaborative content document identifier may comprise text string(s), numerical character(s), alphabetical character(s), alphanumeric code(s), ASCII character(s), a pointer, an IP address, a MAC address, a memory address, other unique identifier, or a combination thereof.

"External resource" refers to one or more computing devices embodied in hardware, software, firmware, and/or a combination thereof, operated by and/or otherwise controlled by an entity that is at least partially distinct from an owner entity that operates the collaborative content management system, such that the external resource is not included within the collaborative content management system. For example, in certain circumstances, an external resource operates on a compiled code base or repository that is separate and distinct from that which supports the collaborative content management system. In some embodiments, an external resource is embodied by one or more computing devices configured to perform and/or facilitate functionalities associated with a content generation workflow. An external resource hosts an external networked location defined by a computing location (e.g., a page, application, file, and/or the like) that is accessible via a network, such as, for example, the Internet, to a user associated with a computing device (e.g., an authorized client device) that is in communication with the collaborative content management system. As a non-limiting example, an external resource may host an external networked location comprising an HTML webpage that is accessible to a user via a web-based browser and defined at least in part by external content that is stored and/or maintained by the external resource, such that the external content is presented to the user associated with the authorized client device to facilitate a content generation workflow associated therewith.

An external resource is configured for authenticated communication with a collaborative content management system to enable a user associated with an authorized client device to utilize the collaborative content generation functionality of the collaborative content management system with respect to external content provided by the external resource at an external network location that is accessed by the user via the authorized client device. For example, the external resource may communicate with the collaborative content management system, and vice versa, through one or more application program interfaces (APIs) (e.g., a REST API). In certain circumstances, an external resource is configured to receive one or more tokens or other authentication credentials that are used to facilitate secure communication of identifiable data between the external resource and the collaborative content management system in view of collaborative content management system network security layers or protocols (e.g., network firewall protocols).

"User profile," "user account," and "user account details" refer to information associated with a user, including, for example, a user identifier, one or more collaborative content document identifiers associated with collaborative content documents that the user has been granted access to, one or more collaborative content data object identifiers, an avatar, an email address, a real name (e.g., John Doe), a username (e.g., jdoe), a password, a time zone, metadata indicating historical user activity within the collaborative content management system, and the like. The user profile can include a subset designation of user credentials, such as, for example, login information for the user including the user's username and password.

"User identifier" refers to one or more items of data by which a user profile associated with a user is uniquely identified within a collaborative content management system. For example, a user identifier may comprise text string(s), numerical character(s), alphabetical character(s), alphanumeric code(s), ASCII character(s), a pointer, an IP address, a MAC address, a memory address, other unique identifier, or a combination thereof.

"Interactive dialog" refers to a user interface element configured to accept user input (e.g., as a selection of one or more of a plurality of available options, as freeform input, and/or the like). The dialog may be presented as a pop-up or an overlaid display element displayed visually over another portion of a user interface (e.g., a collaborative content interface or an external user interface rendered via a web-based browser), or the dialog may be presented as a portion of a larger user interface element. In certain embodiments, an interactive dialog may comprise one or more selectable interface elements, one or more interactive dialog inputs, and/or the like.

"Content generation workflow" refers to a collection of data and instructions that represent the selective generation of a collaborative content data object stored at a collaborative content management system repository as part of a collaborative content document data structure in association with a collaborative content collaborative content document identifier based at least in part on a source content data object retrieved and/or otherwise received by a collaborative content management system from a captured content source in response to the collaborative content management server identifying a collaborative content generation request associated with the collaborative content document identifier. In various embodiments, each content generation workflow is associated with a content generation workflow identifier that uniquely identifies a particular content generation workflow and may be stored at the collaborative content management system repository, in association with a collaborative content document identifier as part of a collaborative content document data structure.

"Proxy endpoint" refers to a data transfer interface, for example, an Application Program Interface (API) between unconnected computing systems via a network. A proxy endpoint embodies a data transfer interface such as an API configured to enable communication between the collaborative content management system and an external resource via the API. For example, a proxy endpoint enables data transfer of one or more data objects (comprising routing data and/or payload data) between a collaborative content management system and an external resource associated with external content (e.g., data corresponding to text elements, images, and/or webpages stored and/or hosted by an external resource). In various embodiments, a proxy endpoint is defined at least in part by a URL accessible to the external resource, wherein the URL may be utilized to direct the external resource to a particular dataset (e.g., one or more data objects) embodying particular external content. As discussed herein, a data retrieval object transmitted between the collaborative content management system and an external resource via a proxy endpoint comprises data formatted to enable and/or request usage by the external resource and/or the collaborative content management system to perform a desired operation and/or provide a requested data object (e.g., a source content data object) and/or the like. In certain embodiments the proxy endpoint enables real-time retrieval of data from the external resource by the collaborative content management system. In various embodiments, the proxy endpoint is configured to enable the collaborative content management system to pull data from the external resource upon the workflow of a trigger event acting to inform the collaborative content management system of the presence of data that is ready for retrieval. Further, in certain embodiments, the proxy endpoint is configured to enable the external resource to transmit data to the collaborative content management system upon the workflow of a trigger event acting to inform the external resource of the presence of data that is ready for transmission.

"Timestamp value" refers to a sequence of characters or encoded information identifying when a certain event occurs. In some embodiments, one or more timestamp values are captured, converted to, and/or stored in a primary time standard. For example, in some embodiments, one or more timestamp values are captured, converted to, and/or stored according to a Coordinated Universal Time (UTC) global standard. In some embodiments, one or more timestamp values are a relative timestamp value such that they identify when a certain event occurs in relation to another event or time (e.g., elapsed time relative to the time at which a content generation workflow was initiated). In certain embodiments, such relative timestamp values are converted to and stored in the UTC global standard, thereby allowing calculations and comparisons to be performed regardless of source. For example, in some embodiments, timestamp values associated with a collaborative content generation request are substantially synchronized with various source content metadata retrieved and/or received by the collaborative content management server in association with a source content data object associated with the collaborative content generation request.

"User engagement capture content generation element" refers to a renderable discrete user interface element (e.g., a selectable button) that is presented to a user as a part of a user interface displayed at a client device (e.g., an authorized client device) in association with a captured content source. For example, in certain embodiments, a user engagement capture content generation element is presented to a user as part of a collaborative content interface rendered by the collaborative content server for display at an authorized client device. Further, in certain embodiments, a user engagement capture content generation element is presented to a user as part of an external user interface rendered by an external resource for display by at a client device via a web-based browser. For example, the user engagement capture content generation element may be included as a selectable element within such an external user interface displayed via a web-based browser at a client device upon an installation of a plug-in for the web-based browser via the client device. A user engagement capture content generation element is associated with at least a portion of the data displayed at a client device within the user interface associated with the captured content source. In certain embodiments, a user engagement capture content generation element may be configured to, upon being selected via user input from the client device, initialize a content generation workflow associated with a source content data object (e.g., one or more text elements, an image, a webpage, a collaborative content document, and/or the like, or any combination thereof) displayed at a client device within the user interface associated with the captured content source. In certain embodiments, a user engagement capture content generation element is selectively presented throughout a user interface (e.g., a collaborative content interface, an external user interface) based at least in part on the content type of the source content data object with which the user engagement capture content generation element is associated. For example, a user engagement capture content generation element corresponding to a source content data object that is a text content type or an image content type may be positioned within the user interface at least substantially proximate the corresponding source content data object associated therewith. Further, as an example, a user engagement capture content generation element corresponding to a source content data object that is a page type may be positioned within the user interface at least substantially proximate the top of the user interface associated with the captured content source (e.g., at the top of the collaborative content interface or the external user interface associated with the collaborative content document or the external networked location, respectively, that defines the source content data object.

The term "section" refers to a data object that describes a defined subset of the text and/or other media within a collaborative content document. A section is defined by one or more collaborative content data objects associated with a collaborative content document, where the one or more collaborative content data objects are generated by a collaborative content management server and stored in a repository (e.g., a collaborative content management system repository) that is associated with the collaborative content management server. Document content data is used to visually demarcate one or more sections of a corresponding collaborative content document within a collaborative content interface that is displayed by the client computing device to an end user of the client computing device. The section demarcation may be performed based on the use of headings, sub-headings, text, images, graphs, and the like to describe the hierarchy of the contents within the collaborative content document. In some embodiments, a section may comprise a set of paragraphs associated with a heading or a sub-heading, such as all paragraphs associated with first-level headings and/or all second-level headings. In some embodiments, a section may comprise a list (e.g. bullet point or numbered list), or it may comprise a table within a document. The contents of each section are configured to be transmitted, received, and/or stored in accordance with embodiments of the present invention. A section defined within a collaborative content document is associated with a unique section identifier configured for association with one or more collaborative content data object stored within a collaborative content document data structure. A "multi-section document" refers to a data object that describes a collaborative content document including two or more sections as defined above.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

"Application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked or remote computing devices, such as, but not limited to, client devices. Non-limiting examples of an application comprise workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates an example collaborative content management system 108 configured to communicate with an external resource 106 and/or two or more client devices 102a-102c in accordance with some example embodiments described herein. Users may access a collaborative content management system 108 via a communications network 104 using one or more of client devices 102a-102c. Collaborative content management system 108 may comprise a collaborative content management server 110 in communication with at least one repository, such as collaborative content management system repository 112. Such repository(ies) may be hosted by the collaborative content management server 110 or otherwise hosted by devices in communication with the collaborative content management server 110. The collaborative content management system 108 (e.g., via the collaborative content management server 110) is, in some embodiments, able to generate a collaborative content interface in association with one or more captured content source identifiers associated with one or more captured content sources, such as, for example, an external resource 106 or a source collaborative content document, as will be described below.

Collaborative content management server 110 may include circuitry, networked processors, or the like configured to perform some or all of the collaborative content management server-based processes described herein (e.g., generate and/or transmit commands and instructions for rendering a collaborative content interface to client devices 102a-102c, using data from a repository in communication therewith, such as, for example, a collaborative content management system repository 112), and may be any suitable network server and/or other type of processing device. In this regard, the collaborative content management server 110 may be embodied by any of a variety of devices, for example, the collaborative content management server 110 may be embodied as a computer or a plurality of computers. For example, collaborative content management server 110 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, collaborative content management server 110 may be located remotely from the collaborative content management system repository 112, although in other embodiments, the collaborative content management server 110 may comprise the collaborative content management system repository 112. The collaborative content management server 110 may, in some embodiments, comprise several servers or computing devices performing interconnected and/or distributed functions. Despite the many arrangements contemplated herein, collaborative content management server 110 is shown and described herein as a single computing device to avoid unnecessarily overcomplicating the disclosure.

Collaborative content management server 110 can communicate with one or more client devices 102a-102c and/or an external resource 106 via communications network 104. Communications network 104 may include any one or more wired and/or wireless communication networks including, for example, a wired or wireless local area network (LAN), a personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the collaborative content management system 108.

Collaborative content management system repository 112 may be stored by any suitable storage device configured to store some or all of the information described herein (e.g., memory 204 of the collaborative content management server 110 or a separate memory system separate from the collaborative content management server 110, such as one or more database systems, backend data servers, network databases, cloud storage devices, or the like provided by another device (e.g., online application or 3rd party provider), such as a Network Attached Storage (NAS) device or devices, or as a separate database server or servers). Collaborative content management system repository 112 may comprise data received from the collaborative content management server 110 (e.g., via a memory 204 and/or processor(s) 202) and/or a client device 102a-102c, and the corresponding storage device may thus store this data. Collaborative content management system repository 112 includes information accessed and stored by the collaborative content management server 110 to facilitate the operations of the collaborative content management system 108. As such, collaborative content management system repository 112 may include, for example, without limitation, collaborative content document data structure(s), captured content source identifier(s), collaborative content document identifier(s), user identifier(s), captured content identifier(s), capture type identifier(s), timestamp value(s), and/or the like.

The client devices 102a-102c may be implemented as any computing device as defined above. That is, the client devices 102a-102c may also include circuitry, networked processors, or the like configured to perform some or all of the apparatus-based processes described herein, and may include a suitable network server and/or other type of processing device (e.g., a controller or computing device of the client devices 102a-102c). Electronic data received by the collaborative content management server 110 from the client devices 102a-102c may be provided in various forms and via various methods. For example, the client devices 102a-102c may include desktop computers, laptop computers, smartphones, netbooks, tablet computers, wearables, and/or other networked device, that may be used for any suitable purpose in addition to presenting the collaborative contextual summary interface to a user and otherwise providing access to the collaborative content management system 108. The depictions in FIG. 1 of "C" client devices are merely for illustration purposes. According to some embodiments, the client devices 102a-102c may be configured to display an interface on a display of the client device for viewing, editing, and/or otherwise interacting with at least one collaborative content interface, which may be provided by the client devices 102a-102c.

In embodiments where a client device 102a-102c is a mobile device, such as a smartphone or tablet, the client device 102a-102c may execute an "app" to interact with the client devices 102a-102c. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 102a-102c may interact with the collaborative content management system 108 via a web browser. As yet another example, the client devices 102a-102c may include various hardware or firmware designed to interface with the collaborative content management system 108. Example embodiments contemplated herein may have various form factors and designs but will nevertheless include at least the components illustrated in FIG. 3 and described in connection therewith.

Figure 2:
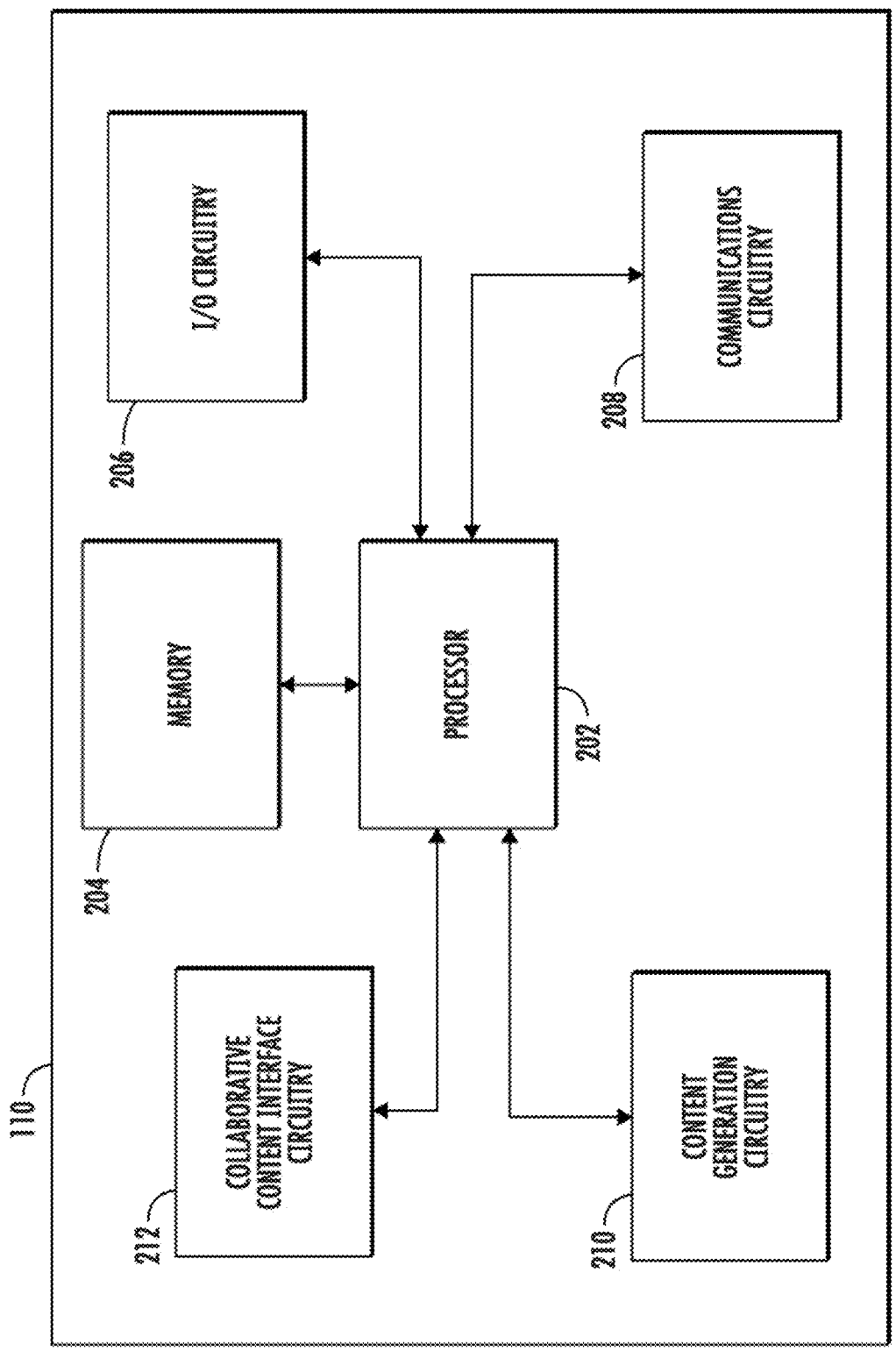
FIG. 2 is a schematic block diagram of example circuitry for use in a collaborative content management server in accordance with some example embodiments described herein.

FIG. 2 shows a schematic block diagram of example circuitry, some or all of which may be included in a collaborative content management server 110. In accordance with some example embodiments, collaborative content management server 110 may include various means, such as memory 204, processor 202, input/output circuitry 206, and/or Communications circuitry 208. Moreover, in some embodiments, one or more of content generation circuitry 210 and collaborative content interface circuitry 212 may also or instead be included in the collaborative content management server 110. For example, where content generation circuitry 210 is included in collaborative content management server 110, content generation circuitry 210 may be configured to facilitate the functionality discussed herein regarding capturing content of one or more capture types from a captured content source and generating, causing storage of, updating, and/or executing one or more data processing operations relating to a collaborative content data object that corresponds at least in part to a source content data object. Further, where collaborative content interface circuitry 212 is included in collaborative content management server 110, collaborative content interface circuitry 212 may be configured to facilitate the functionality discussed herein regarding generating, causing storage of, updating, and/or retrieving collaborative content interface(s) based at least in part on a collaborative content data object generated in response to a collaborative content generation request. An apparatus, such as collaborative content management server 110, may be configured, using one or more of the circuitry 202, 204, 206, 208, 210, and 212, to execute the operations described above with respect to FIG. 1 and below in connection with FIGS. 4A-8B.

Although the use of the term "circuitry" as used herein with respect to components 202-212 are described in some cases using functional language, it should be understood that the particular implementations necessarily include the use of particular hardware configured to perform the functions associated with the respective circuitry as described herein. It should also be understood that certain of these components 202-212 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the collaborative content management server 110 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the collaborative content management server 110 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of, for example, collaborative content management server 110. The memory 204 is non-transitory and may include, for example, one or more volatile and/or non-volatile memories, or some combination thereof. In other words, for example, the memory 204 may be an electronic storage device (e.g., a non-transitory computer readable storage medium). The memory 204 may be configured to store information, data, content, applications, instructions, or the like, for enabling an apparatus, e.g., collaborative content management server 110, to carry out various functions in accordance with example embodiments of the present disclosure.

Although illustrated in FIG. 2 as a single memory, memory 204 may comprise a plurality of memory components. The plurality of memory components may be embodied on a single computing device or distributed across a plurality of computing devices. In various embodiments, memory 204 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 204 may be configured to store information, data, applications, instructions, or the like for enabling collaborative content management server 110 to carry out various functions in accordance with example embodiments discussed herein. For example, in at least some embodiments, memory 204 is configured to buffer data for processing by processor 202. Additionally or alternatively, in at least some embodiments, memory 204 is configured to store program instructions for execution by processor 202. Memory 204 may store information in the form of static and/or dynamic information. This stored information may be stored and/or used by collaborative content management server 110 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multi-threading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as collaborative content management server 110. The plurality of processors may be in operative communication with each other and may be collectively configured to perform one or more functionalities of collaborative content management server 110 as described herein.

In an example embodiment, processor 202 is configured to execute instructions stored in the memory 204 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause collaborative content management server 110 to perform one or more of the functionalities of collaborative content management server 110 as described herein.

In some embodiments, collaborative content management server 110 further includes input/output circuitry 206 that may, in turn, be in communication with processor 202 to provide an audible, visual, mechanical, or other output and/or, in some embodiments, to receive an indication of an input from a user, a client device 102a-102c, external resource 106, or another source. In that sense, input/output circuitry 206 may include means for performing analog-to-digital and/or digital-to-analog data conversions. Input/output circuitry 206 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 206 may comprise a user interface and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 204, and/or the like). In some embodiments, aspects of input/output circuitry 206 may be reduced as compared to embodiments where collaborative content management server 110 may be implemented as an end-user machine or other type of device designed for complex user interactions. In some embodiments (like other components discussed herein), input/output circuitry 206 may even be eliminated from collaborative content management server 110. Input/output circuitry 206 may be in communication with memory 204, communications circuitry 208, and/or any other component(s), such as via a bus. Although more than one input/output circuitry and/or other component can be included in collaborative content management server 110, only one is shown in FIG. 2 to avoid overcomplicating the disclosure (e.g., like the other components discussed herein).

Communications circuitry 208, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with collaborative content management server 110. In this regard, communications circuitry 208 may include, for example, a network interface for enabling communications with a wired or wireless communication network. For example, in some embodiments, communications circuitry 208 is configured to receive and/or transmit any data that may be stored by memory 204 using any protocol that may be used for communications between computing devices. For example, communications circuitry 208 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 208 includes circuitry for interacting with the antenna(s) to cause transmission of signals via the antenna(e) or to handle receipt of signals received via the antenna(e). These signals may be transmitted by collaborative content management server 110 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 208 may additionally or alternatively be in communication with the memory 204, input/output circuitry 206 and/or any other component of collaborative content management server 110, such as via a bus.

In some embodiments, content generation circuitry 210 may also or instead be included and configured to perform the functionality discussed herein related to capturing content of one or more capture types from a captured content source and generating, causing storage of, updating, and/or executing one or more data processing operations relating to a collaborative content data object that corresponds at least in part to a source content data object. In some embodiments, content generation circuitry 210 includes hardware, software, firmware, and/or a combination of such components, configured to support various aspects of such collaborative content generation-related functionality, features, and/or services of the collaborative content management server 110 as described herein (e.g., designed to generate a collaborative content data object based upon at least a source content data object(s)). It should be appreciated that in some embodiments, content generation circuitry 210 performs one or more of such exemplary actions in combination with another set of circuitry of the collaborative content management server 110, such as one or more of memory 204, processor 202, input/output circuitry 206, communications circuitry 208, and collaborative content interface circuitry 212. For example, in some embodiments, content generation circuitry 210 utilizes processing circuitry, such as the processor 202 and/or the like, to perform one or more of its corresponding operations. In some instances, the content generation circuitry 210 may generate a collaborative content data object configured for storage in a supported data format that corresponds to external content stored on an external resource. Further, in some instances, the content generation circuitry 210 may generate a collaborative content data object by at least partially duplicating a source collaborative content data object from a collaborative content document data structure associated with a source collaborative content document such that the collaborative content data object corresponding to the source collaborative content data object is associated with the collaborative content document identifier. In a further example, in some embodiments, some or all of the functionality of content generation circuitry 210 may be performed by processor 202. In this regard, some or all of the example processes and algorithms discussed herein can be performed by at least one processor 202 and/or content generation circuitry 210. It should also be appreciated that, in some embodiments, content generation circuitry 210 may include a separate processor, specially configured field programmable gate array (FPGA), or application specific interface circuit (ASIC) to perform its corresponding functions.

Additionally or alternatively, in some embodiments, content generation circuitry 210 utilizes memory 204 to store collected information. For example, in some implementations, content generation circuitry 210 includes hardware, software, firmware, and/or a combination thereof, that interacts with collaborative content management system repository 112 and/or memory 204 to send, retrieve, update, and/or store data values embodied by and/or associated with collaborative content data structures associated with collaborative content documents, such as, for example, collaborative content generation request(s), user identifier(s), collaborative content document identifier(s), capture type identifier(s), collaborative content metadata, collaborative content data object(s), collaborative content data object identifier(s), and associated data that is configured for association with, for example, generating and/or updating a collaborative content data object and to support the operations of the content generation circuitry 210 and the remaining circuitry. Additionally or alternatively, in some embodiments, content generation circuitry 210 utilizes input/output circuitry 206 to facilitate user output (e.g., causing rendering of at least a portion of one or more user interface(s) such as an interactive dialog within a user interface), and/or to receive user input (e.g., user clicks, user taps, keyboard interactions, user gesture, user selections, and/or the like). Additionally or alternatively still, in some embodiments, the content generation circuitry 210 utilizes communications circuitry 208 to initiate transmissions to another computing device, receive transmissions from another computing device, communicate signals between the various sets of circuitry as depicted, and/or the like.

In some embodiments, collaborative content interface circuitry 212 may also or instead be included and configured to perform the functionality discussed herein related to generating, causing storage of, updating, and/or retrieving collaborative content interface(s) based at least in part on a collaborative content data object generated in response to a collaborative content generation request. In some embodiments, collaborative content interface circuitry 212 includes hardware, software, firmware, and/or a combination of such components, configured to support various aspects of such collaborative content interface-related functionality, features, and/or services of the collaborative content management server 110 as described herein (e.g., designed to generate a collaborative content interface based upon at least a source content data object(s)). It should be appreciated that in some embodiments, collaborative content interface circuitry 212 performs one or more of such exemplary actions in combination with another set of circuitry of the collaborative content management server 110, such as one or more of memory 204, processor 202, input/output circuitry 206, communications circuitry 208, and content generation circuitry 210. For example, in some embodiments, collaborative content interface circuitry 212 utilizes processing circuitry, such as the processor 202 and/or the like, to perform one or more of its corresponding operations. In some instances, the collaborative content interface circuitry 212 may generate an initial interface that is subsequently modified by captured content data object(s) and/or the like. In a further example, in some embodiments, some or all of the functionality of collaborative content interface circuitry 212 may be performed by processor 202. In this regard, some or all of the example processes and algorithms discussed herein can be performed by at least one processor 202 and/or collaborative content interface circuitry 212. It should also be appreciated that, in some embodiments, collaborative content interface circuitry 212 may include a separate processor, specially configured field programmable gate array (FPGA), or application specific interface circuit (ASIC) to perform its corresponding functions.

Additionally or alternatively, in some embodiments, collaborative content interface circuitry 212 utilizes memory 204 to store collected information. For example, in some implementations, collaborative content interface circuitry 212 includes hardware, software, firmware, and/or a combination thereof, that interacts with collaborative content management system repository 112 and/or memory 204 to send, retrieve, update, and/or store data values embodied by and/or associated with collaborative content collaborative content document data structures associated with collaborative content documents, such as, for example, user identifier(s), collaborative content document identifier(s), capture type identifier(s), collaborative content metadata, collaborative content data object(s), collaborative content data object identifier(s), and associated data that is configured for association with, for example, generating and/or updating a collaborative content interface, and to support the operations of the collaborative content interface circuitry 212 and the remaining circuitry. Additionally or alternatively, in some embodiments, collaborative content interface circuitry 212 utilizes I/O circuitry 206 to facilitate user output (e.g., causing rendering of one or more user interface(s) such as a collaborative content interface), and/or to receive user input (e.g., user clicks, user taps, keyboard interactions, user gesture, user selections, and/or the like). Additionally or alternatively still, in some embodiments, the collaborative content interface circuitry 212 utilizes communications circuitry 208 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of collaborative content management server 110 to implement various operations, including the examples shown herein. As such, a series of computer-readable program code portions may be embodied in one or more computer program products and can be used, with a device, collaborative content management server 110, database, and/or other programmable apparatus, to produce the machine-implemented processes discussed herein. It is also noted that all or some of the information discussed herein can be based on data that is received, generated and/or maintained by one or more components of the collaborative content management server 110. In some embodiments, one or more external systems (such as a remote cloud computing and/or data storage system) may also be leveraged to provide at least some of the functionality discussed herein.

Figure 3:
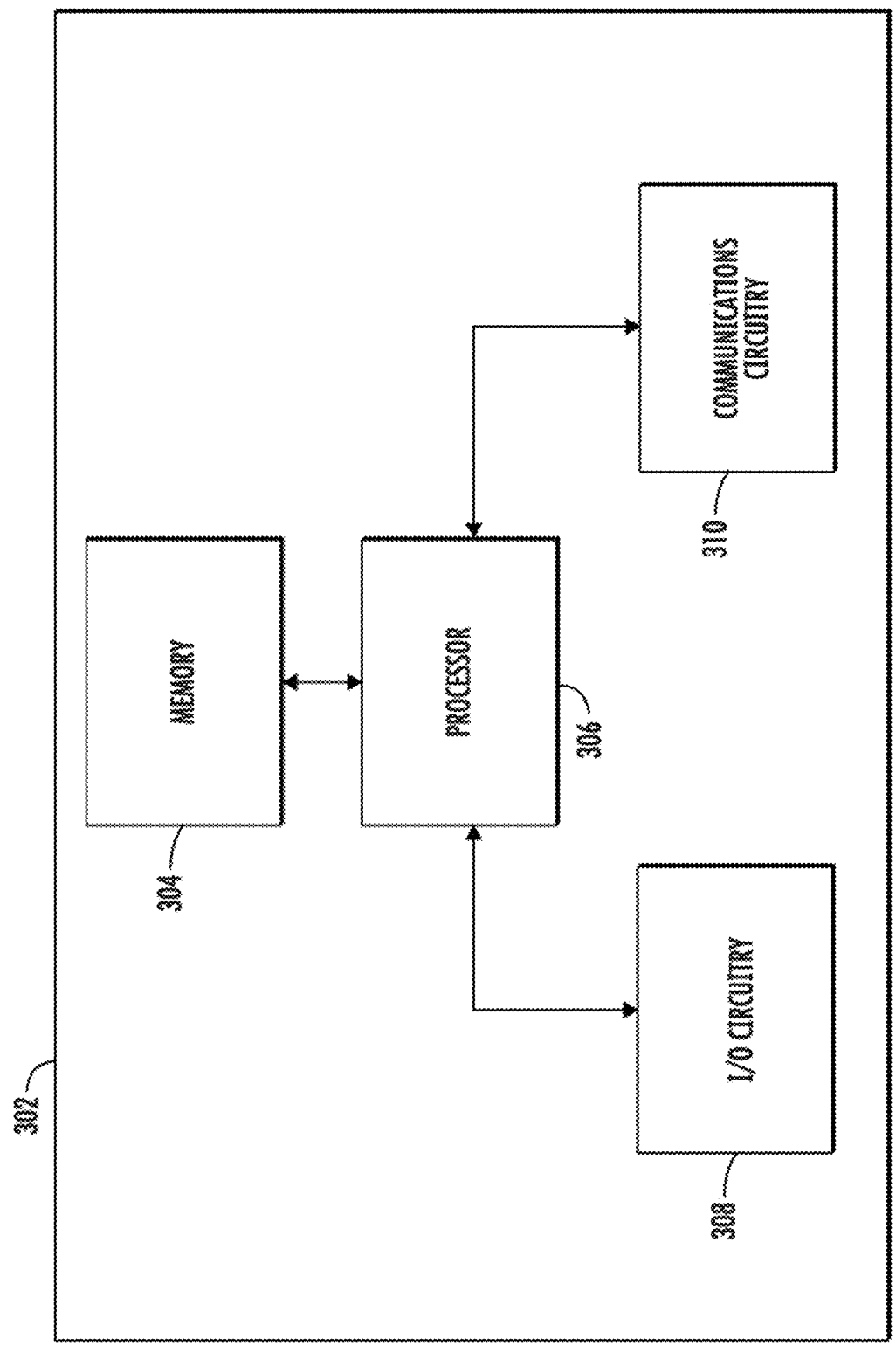
FIG. 3 is a schematic block diagram of example circuitry for use in a client device in accordance with some example embodiments described herein.

Referring now to FIG. 3, the client devices (e.g., client device 102a-102c) or the like, may be embodied by one or more computing systems, such as apparatus 302 shown in FIG. 3. FIG. 3 is a schematic block diagram showing example circuitry, some or all of which may be included in an example Apparatus 302, configured to enable a user to access the collaborative content management system 108 and/or the external resource 106 in accordance with certain embodiments of the present disclosure. Referring now to FIG. 3, the client devices (e.g., client device 102a-102c) or the like, may be embodied by one or more computing systems, such as apparatus 302 shown in FIG. 3. FIG. 3 is a schematic block diagram showing example circuitry, some or all of which may be included in an example apparatus 302, configured to enable a user to access the collaborative contextual summary interface management system 200 and/or the external resource 106 in accordance with certain embodiments of the present disclosure. For example, in some embodiments, the apparatus 302 embodies a client device 102a-102c and is configured to enable a user to interact with the external resource 106 to access an external content that is configured for display to participating client devices and/or the collaborative content management system 108 to capture the selected content for storage at in a supported data format within the collaborative content management system 108 and subsequent on-demand display as a collaborative content data object configured for display to participating the client device via a user-selected collaborative content interface associated with the user. Further, in some embodiments, the apparatus 302 embodies a client device 102a-102c and is configured to enable a user to interact with the collaborative content management server 110 to access one or more collaborative content data objects configured for display to participating client devices to be selected (e.g., identified) by the user for capturing and subsequent on-demand display as a collaborative content data object configured for display to participating the client device via a user-selected collaborative content interface associated with the user.

In accordance with some example embodiments, apparatus 302 may include various means, such as memory 310, processor 306, input/output circuitry 308, and/or communications circuitry 310. Apparatus 302, such as a client device 102a-102c, may be configured, using one or more of the circuitry 310, 306, 308, and 310, to execute the operations described above with respect to FIG. 1 and below in connection with FIGS. 4A-8B.

In some embodiments, apparatus 302 communicates with collaborative content management system 108 (for example, embodied by the collaborative content management server 110 as depicted and described with respect to FIG. 2). It should be appreciated that, in some embodiments, a collaborative content management system 108 communicates with any number of apparatus(es) 302. It should be appreciated that the components 304-310 may be embodied similar to that of the similarly named components described with respect to FIG. 2. For purposes of brevity and length of disclosure, duplicate description of such functionality is omitted. Nevertheless, these device elements, operating together, provide the respective apparatuses with the functionality necessary to facilitate the communication of data (e.g., collaborative content document data structure(s), collaborative content generation request(s), source content data object(s), user identifier(s), collaborative content document identifiers, capture type identifier(s), collaborative content metadata, collaborative content data object identifier(s), collaborative content interface(s), and/or the like) for capturing content and generating (e.g., updating) a collaborative content interface configured to display the captured content. That is, the apparatus 302, in some embodiments, is configured, using one or more sets of circuitry 310, 306, 308, and/or 310, to execute the operations described herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of collaborative content management server 110 and client devices 102a-102c.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device). Information/data generated at the client device (e.g., as a result of the user interaction with an admin device) can be received from the client device (e.g., client device or admin device) at the server.

FIGS. 4A-4D illustrate a lane diagram showing functionality of various components associated with an exemplary collaborative content management system 108 in accordance with various embodiments. In particular, FIGS. 4A-4D illustrate an example signal diagram illustrating data flow interactions between a collaborative content management server, a client device, and a repository, when generating a collaborative content data object configured for display via a collaborative content interface in accordance with various embodiments. More specifically, FIGS. 4A-4D illustrate example various data flow interactions between a collaborative content management server, a client device, and a repository when generating a collaborative content data object configured for display via a collaborative content interface based at least in part on a source content data object that comprises a source collaborative content data object associated with a source collaborative content document identifier. As described herein, FIGS. 4A-4D illustrate exemplary data flows defining various operations described as being performed by a collaborative content management server 110, a collaborative content management system repository 112, and/or a client device 102a. These may be at least substantially similar to those previously discussed with regards to FIG. 1.

In various embodiments, a user of an exemplary collaborative content management system 108 may access a collaborative content document of the collaborative content management system 108 via a client device 102a associated with a user identifier associated with the user. For example, the client device 102a may be configured to display a collaborative content interface associated with a collaborative content document identifier associated with the collaborative content document, such that one or more collaborative content data object defining at least a portion of the collaborative content document may be displayed at the client device 102a via the rendered collaborative content interface. In various embodiments, as described in further detail herein, an exemplary collaborative content management server 110 may cause rendering, at a client device 102a, of a collaborative content interface that is associated with a collaborative content document identifier and configured to display one or more collaborative content data objects associated with the same collaborative content document identifier. For example, in various embodiments, a collaborative content data object displayed within a collaborative content interface associated with a collaborative content document identifier may comprise an image element, one or more text elements, a table element, and/or the like that defines part of a collaborative content document associated with the collaborative content document identifier, and/or may comprise the collaborative content document as a whole, including one or more text elements, images elements, and/or the like, such that at least substantially all of the collaborative content document may be captured as part of a content generation workflow, as described in further detail herein.

In various embodiments, a collaborative content interface may include one or more user engagement capture content generation element associated with at least a portion of the one or more collaborative content data object displayed within the collaborative content interface. A user engagement capture content generation element may comprise a selectable interface element corresponding to a collaborative content data object displayed within the collaborative content interface that is configured to, upon being selected via user input from the client device 102*a*, initialize a content generation workflow associated with the collaborative content data object corresponding thereto (e.g., one or more text elements, an image, a collaborative content document, and/or the like, or any combination thereof) displayed at the client device 102*a* via the collaborative content interface as part of the collaborative content document.

As shown at Block 402, a selection of a user engagement capture content generation element may be received by client device 102*a* via user input at a collaborative content interface displayed at the client device 102*a*. In various embodiments, an exemplary collaborative content interface may be configured such that the client device 102*a* receives a selection of a user engagement capture content generation element comprising a distinct, selectable interface element arranged within the collaborative content interface. Alternatively, or additionally, receiving a selection of a user engagement capture content generation element associated with a particular collaborative content data object displayed within the collaborative content interface may comprise receiving a user indication of the particular collaborative content data object, such as, for example, the user highlighting a text element and/or clicking (e.g., "right-clicking") on an image element displayed within the collaborative content interface. In various embodiments, in association with a collaborative content data object, a user associated with a user identifier associated with the client device 102*a* may interact with the client device 102*a* by selecting a user engagement capture content generation element provided within the collaborative content interface to indicate an intent to capture content (e.g., a collaborative content data object) from the collaborative content document that is accessed via the collaborative content interface displayed at the client device 102*a* and corresponds to the user engagement capture content generation element.

In various embodiments, in response to receiving a selection of a user engagement capture content generation element associated with a collaborative content data object and/or a collaborative content document identifier at a collaborative content interface displayed on the client device 102*a*, client device 102*a* may transmit an initial collaborative content generation request, as described herein, associated with the user identifier associated with the client device 102*a* to a collaborative content management server 110, as shown at Block 404. In various embodiments, an initial collaborative content generation request may comprise a collection of data transmitted by the client device 102*a* to the collaborative content management server 110 that is representative of a user's request to capture content (e.g., one or more collaborative content data object) from a collaborative content document that is accessed at least in part by the user via a collaborative content interface as part of a content generation workflow. For example, an initial collaborative content generation request may include and/or be associated with a user identifier associated with the client device 102*a*, such that an initial collaborative content generation request is transmitted from client device 102*a* to the collaborative content management server 110 as a means of indicating to the collaborative content management server 110 that a particular user (e.g., the user associated with the user identifier associated with the client device 102*a*) has initiated a content generation workflow.

As shown at Block 406, the collaborative content management server 110 may be configured to receive the initial collaborative content generation request from the client device 102*a*. As described in further detail herein, upon receiving an initial collaborative content generation request associated with a user identifier indicating that the particular user associated with the user identifier has requested that a content generation workflow be initiated, the collaborative content management server 110 may execute one or more operations in order to facilitate an identification and/or determination of a particular collaborative content document associated with the user identifier (e.g., a collaborative content document that the user is authorized to access) that the user requests be updated to include the captured content such that the particular collaborative content document is defined at least in part by the collaborative content data object that is associated with the user engagement capture content generation element selected by the user. For example, as illustrated at Block 408, upon receipt of the initial collaborative content generation request, the collaborative content management server 110 may retrieve, from a collaborative content management system repository 112, user profile data associated with the user identifier associated with the initial collaborative content generation request. As described herein, the user profile data associated with a user identifier may comprise user credentials associated with one or more collaborative content document identifiers that are indicative of an authorization for the user to access each of the one or more collaborative content documents respectively associated with one or more collaborative content document identifiers. User profile data associated with a user identifier may be retrieved by the collaborative content management server 110 and used to determine that a client device associated with the user identifier associated with the user profile is authorized to update, edit, and/or otherwise access one the one or more collaborative content documents, such as, for example, as part of a content generation workflow.

As shown at Block 410, the collaborative content management server 110 may generate an interactive dialog based at least in part on the user profile data associated with the user identifier associated with the initial collaborative content generation request. In various embodiments, the interactive dialog may comprise one or more interactive dialog input elements configured to receive user input from the user corresponding to a collaborative content document identifier associated with one of the one or more collaborative content documents that the user is authorized to update, edit, and/or otherwise access, as described herein. The interactive dialog generated by the collaborative content management server 110 may include a menu, list, and/or like of one or more selectable elements corresponding respectively to one or more collaborative content document identifiers. For example, generating the interactive dialog based at least in part on the user profile data associated with the user identifier may comprise populating a menu, list, and/or like within the interactive dialog using one or more selectable elements corresponding respectively to the one or more collaborative content document identifiers associated with the user identifier associated with the initial collaborative content generation request, each of the collaborative content document identifiers being selectable via the interactive dialog and corresponding to a respective collaborative content document for which the user profile associated with the user identifier has access authorization, as described herein. In various embodiments, the interactive dialog may comprise one or more elements similar to the exemplary interactive dialog shown in FIG. 5B (e.g., interactive dialog 516).

As shown at Block 412 and Block 414, the collaborative content management server 110 may transmit the interactive dialog associated with the user identifier to the client device 102*a*, so as to cause rendering of the interactive dialog at the client device 102*a*, such as, for example, within the collaborative content interface comprising the collaborative content data object associated with the user engagement capture content generation element (e.g., the collaborative content interface from which the user engagement capture content generation element was accessed). The client device 102*a* may display the interactive dialog to facilitate the receipt of user input comprising a collaborative content document selection corresponding to one of the collaborative content document identifiers associated with the user identifier, as shown in Block 416. In various embodiments, the interactive dialog may be configured such that the user input received by the interactive dialog via from the client device 102*a* comprises a selection of one of the collaborative content document identifiers provided within the interactive dialog, wherein the selection functions to identify a particular collaborative content document (e.g., of the one or more collaborative content documents that the user is authorized to access) to which the user intends to add the collaborative content data object (e.g., the captured content) associated with the user engagement capture content generation element, such that the particular collaborative content document, upon being subsequently accessed and rendered via a collaborative content interface at a client device 102*a*, includes the collaborative content data object displayed within the collaborative content interface.

In various embodiments, as shown at Block 418, in response to receiving a collaborative content document selection associated with a collaborative content document identifier at the interactive dialog displayed on the client device 102*a*, client device 102*a* may transmit a collaborative content generation request to the collaborative content management server 110. As described herein, an exemplary content generation workflow may be executed by a collaborative content management server 110 at least in part based on a collaborative content generation request received by the collaborative content management server 110. In various embodiments, a collaborative content generation request is representative of a user's request to capture content (e.g., a source content data object) from a captured content source, such as, for example, one of a source collaborative content document and an external networked location, and generate a collaborative content data object that is at least substantially similar to the source content data object (e.g., by copying, appending, mirroring, and/or otherwise at least partially reproducing the source content data object) in association with the collaborative content document identifier associated with the collaborative content document selected by the user via the interactive dialog. As an illustrative example, using the example data flows described in reference to Blocks 402-416, the captured content source may comprise a source collaborative content document that corresponds to the collaborative content interface via which the identified collaborative content data object (e.g., the source content data object) associated with the user-selected user engagement capture content generation element was accessed by the client device 102*a*. For example, upon execution of an exemplary content generation workflow, as described herein, the collaborative content management server 110 causing rendering of a collaborative content interface associated with the collaborative content document identifier associated with the user-selected collaborative content document (e.g., selected via the interactive dialog) may comprise causing the collaborative content data object generated based at least in part on the source content data object to be rendered within the collaborative content interface displayed at the client device 102*a*.

In various embodiments, a collaborative content generation request may comprise a collection of data transmitted by the client device 102*a* to the collaborative content management server 110 that is representative of a user's request to capture content comprising a source content data object (e.g., one or more source collaborative content data object) from a captured content source (e.g., a source collaborative content document) that is accessed by the user via a user interface displayed at the client device 102*a* (e.g., a collaborative content interface corresponding to a source collaborative content document) as part of a content generation workflow. For example, a collaborative content generation request may include and/or be associated with the collaborative content document identifier selected by the user via the interactive dialog and a captured content source identifier associated with the captured content source from which a source content data object was accessed by the user via the client device 102*a* (e.g., a source collaborative content document identifier associated with the source collaborative content document defined at least in part by the source collaborative content data object). Further, in various embodiments, the collaborative content generation request may be further associated with a source content data object identifier (e.g., the collaborative content data object identifier associated with the source collaborative content data object). Further still, in various embodiments, the collaborative content generation request may be further associated with a user identifier (e.g., the user identifier associated with the client device 102*a*). A collaborative content generation request is transmitted from client device 102*a* to the collaborative content management server 110 as a means of indicating to the collaborative content management server 110 that the user associated with the user identifier associated with the client device 102*a* (e.g., and/or the initial collaborative content generation request) has requested that a collaborative content data object corresponding to a source content data object be generated by the collaborative content management server 110 for storage by the collaborative content management system 108 and subsequent, on-demand display at a collaborative content interface corresponding to the user-selected collaborative content document that is distinct from the captured content source. As shown at Block 420, the collaborative content management server 110 may be configured to receive the collaborative content generation request from the client device 102*a*. In various embodiments, although described herein as distinct data communicated via separate data transmissions between the client device 102*a* and the collaborative content management server 110, the collaborative content generation request and the initial collaborative content generation request, described herein in reference to Blocks 418 and 420, may each be included in a single data transmission that is communicated from the client device 102a to the collaborative content management server 110.

Figure 4A:
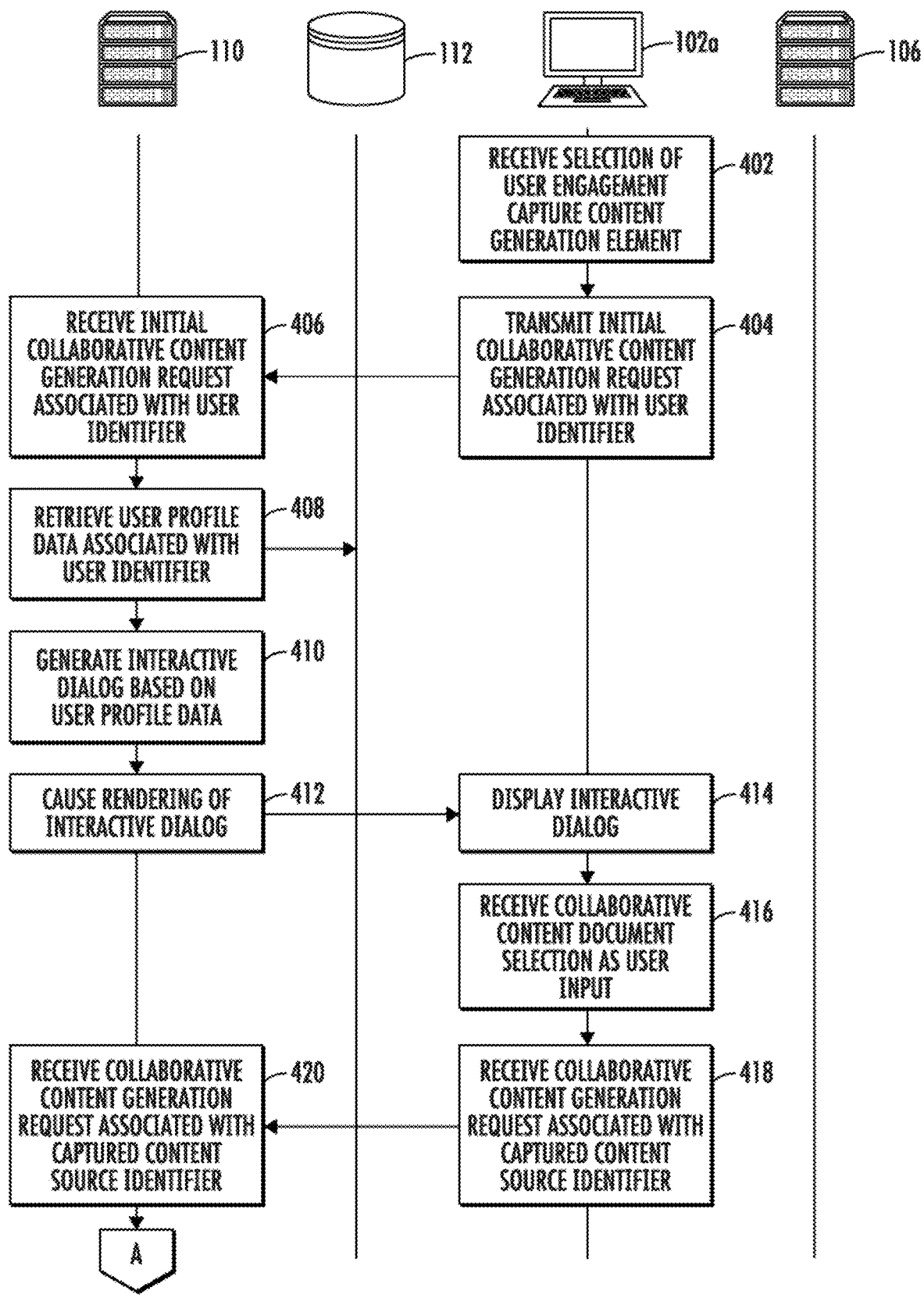
FIGS. 4A-4D illustrate a signal diagram of an example data flow in accordance with various aspects and embodiments of the subject disclosure.
Figure 4B:
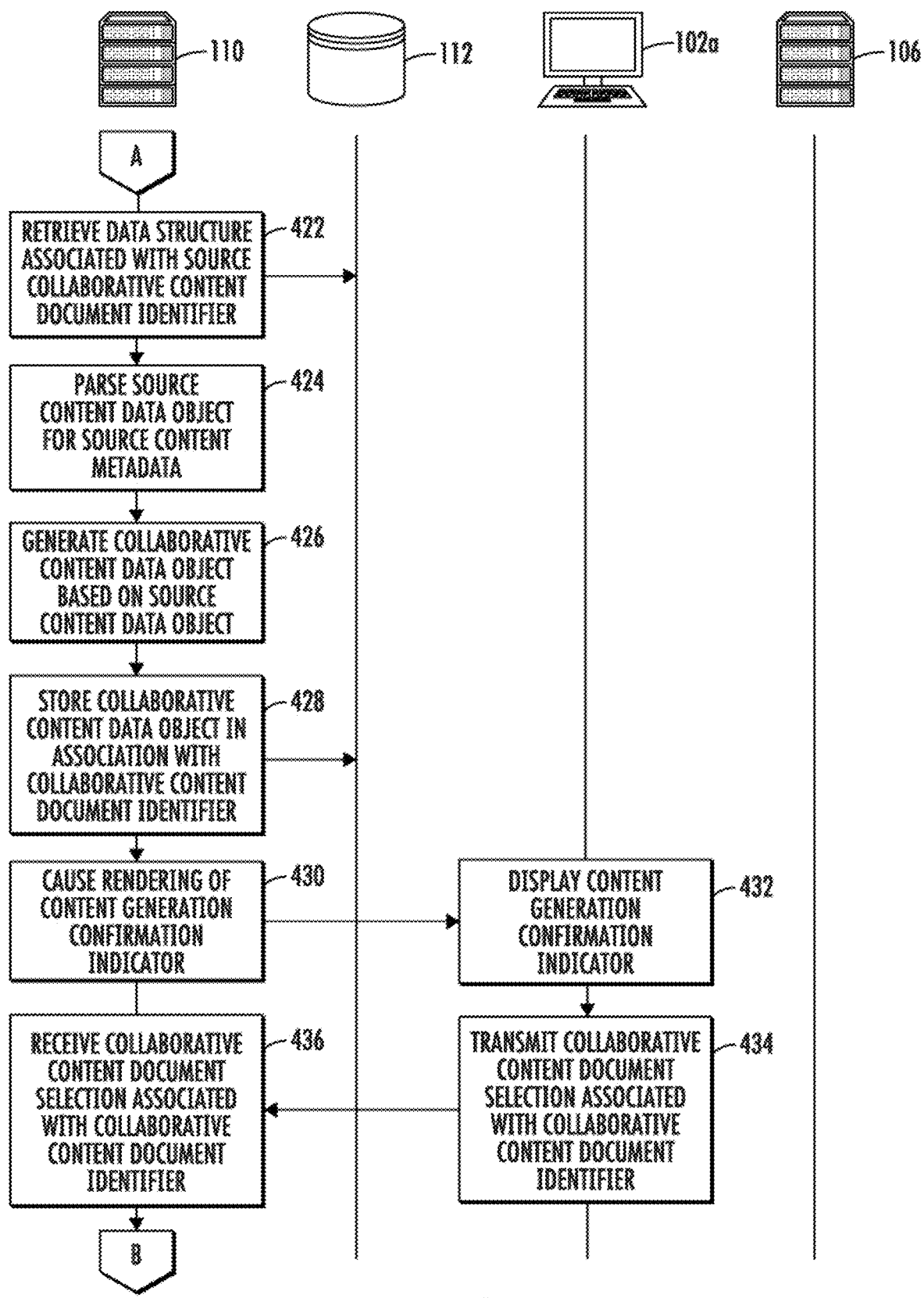

In various embodiments, upon receipt of the collaborative content generation request, in an exemplary circumstance wherein the captured content source comprises a source collaborative content document defined within the collaborative content management system 108, the exemplary illustrated operation(s) may proceeds to Block 422, as illustrated in FIG. 4B, at which the collaborative content management server 110 may retrieve, from a collaborative content management system repository 112, a collaborative content document data structure associated with and/or defined at least in part by the captured content source identifier associated with the collaborative content generation request, such as, for example, a source collaborative content document identifier associated with a source collaborative content document.

As described herein, a collaborative content document data structure retrieved by the collaborative content management server 110 may comprise a collection of data capable of being collectively transmitted, received, and/or stored, and configured for operability within a collaborative content management system 108. In various embodiments, a collaborative content document data structure is a collection of data associated with a collaborative content document identifier that collectively defines at least a portion of the functionality of a collaborative content document associated with the collaborative content document identifier, such as, for example, a collaborative content document structure, collaborative content document contents, collaborative content document operability, collaborative content document accessibility, and/or the like. In various embodiments, a collaborative content document data structure may comprise one or more collaborative content data objects associated with the corresponding collaborative content document identifier, such that at least a portion of the collaborative content document associated therewith is defined by the one or more collaborative content data objects. For example, in various embodiments, a collaborative content document data structure comprises a collection of data, such as, for example, one or more collaborative content data objects, associated with a common collaborative content document identifier and stored by the collaborative content management system 108 in a supported format such that at least a portion of the collaborative content document data structure (e.g., the one or more collaborative content data objects) is renderable for display within a collaborative content interface associated with the collaborative content document identifier.

In the exemplary embodiment illustrated in FIGS. 4A-4D, the collaborative content management server 110 may retrieve from the collaborative content management system repository 112 a stored collaborative content document data structure associated with the captured content source identifier (e.g., the source collaborative content document identifier). For example, the retrieved collaborative content document data structure associated with the captured content source identifier may comprise one or more collaborative content data objects, including the source content data object, as described herein. In various embodiments, the collaborative content management server 110 may identify at least a portion of the collaborative content document data structure as the source content data object based at least in part on a source content data object identifier associated with the collaborative content generation request received from the client device 102a, such as, for example, by executing a comparison of the source content data object identifier associated with the collaborative content generation request to the one or more collaborative content data object identifiers associated with each of the collaborative content data objects within the retrieved collaborative content document data structure.

As shown at Block 424, the collaborative content management server 110 may parse a source content data object retrieved from the collaborative content management system repository 112 as part of the retrieved collaborative content document data structure associated with the captured content source identifier (e.g., the source collaborative content document identifier) to determine source content metadata. For example, source content metadata associated with a source content data object identifier associated with a source content data object may define at least a portion of a source content data object, as described herein. As non-limiting examples, a source content data object may include source content metadata comprising a title identifier, an author identifier, a captured content source identifier, one or more user identifiers, one or more timestamp values, and/or other metadata associated with the source content data object and/or the captured content source.

As shown in Block 426, a collaborative content data object associated with the collaborative content document identifier may be generated by the collaborative content management server 110 based at least in part on the source content data object accessed based on the captured content source identifier. As described herein, the collaborative content management server 110 may generate a collaborative content data object in association with a content generation workflow based at least in part on the source content data object retrieved from the collaborative content management system repository 112 as part of the collaborative content document data structure associated with the captured content source identifier (e.g., the source collaborative content document identifier). For example, in various embodiments, collaborative content data object generated by the collaborative content management server 110 during a content generation workflow initiated by a user may comprise electronic data that is generated, stored, and/or otherwise managed by a collaborative content management system 108 that represents a copied, appended, mirrored, and/or otherwise at least partially reproduced representation of the source content data object associated with a collaborative content generation request. A collaborative content data object generated by the collaborative content management server 110, as described herein, may embody a functional content equivalent of the source content data object such that the collaborative content data object is configured to, upon rendering of a collaborative content interface corresponding to the collaborative content document defined at least in part by the collaborative content data object, cause at least substantially the same content to be displayed within the collaborative content interface as was displayed at the captured content source associated with the source content data object. In various embodiments, generating the collaborative content data object associated with the collaborative content document identifier, as described herein, comprises appending at least a portion of the source content data object to the collaborative content document data structure associated with the collaborative content document identifier associated with the collaborative content document to which the generated collaborative content data object is being incorporated.

Further, in various embodiments, the generated collaborative content data object may comprise collaborative content metadata generated in association therewith. For example, collaborative content metadata associated with a collaborative content data object identifier associated with a collaborative content data object may define at least a portion of the collaborative content data object, and may be generated by the collaborative content management server 110 based at least in part on the source content metadata associated with the source content data object. For example, the generated collaborative content data object may be defined at least in part on collaborative content metadata that is retrieved by the collaborative content management server via the aforementioned parsing operation executed by the collaborative content management server 110 with respect to the source content data object and/or the captured content source associated therewith.

As shown at Block 428, upon generating a collaborative content data object based at least in part on a source content data object associated with a collaborative content generation request, the collaborative content management server 110 may store the generated collaborative content data object at the collaborative content management system repository 112 in association with the collaborative content document identifier associated with the user-selected collaborative content document (e.g., selected via the interactive dialog) and/or the collaborative content generation request. As non-limiting examples, in various embodiments, a collaborative content data object may be stored in association with one or more of the collaborative content document identifier associated with the user-selected collaborative content document (e.g., selected via the interactive dialog), the source content data object identifier, the captured content source identifier, the user identifier associated with the collaborative content generation request, and a content generation workflow identifier. In various embodiments, the collaborative content data object generated by the collaborative content management server 110 during a content generation workflow may be stored within the collaborative content management system 108, such as, for example, at the collaborative content management system repository 112, in a supported data format such that the generated collaborative content data object defines at least a portion of a collaborative content document data structure defining the collaborative content document associated with the collaborative content document identifier, and is configured for rendering within the collaborative content interface corresponding to the collaborative content document. In various embodiments, storing a generated collaborative content data object in a supported data format may comprise assigning the collaborative content data object, by the collaborative content management server 110, a collaborative content data object identifier. Further, in various embodiments, as described herein, storing a generated collaborative content data object in association with the collaborative content document identifier may comprise updating the collaborative content document data structure associated with the collaborative content document identifier to include the generated collaborative content data object. For example, the collaborative content data object may be stored in a supported data format at a data repository (e.g., the collaborative content management system repository 112) as a data representation and/or a functional content equivalent of the source content data object that the user requested be copied, appended, mirrored, and/or otherwise at least partially reproduced for presentation within a distinct collaborative content interface as part of a corresponding collaborative content document. In various embodiments, the collaborative content management server 110 executing the storage operation described herein with respect to the generated collaborative content data object may represent the end of the content generation workflow associated with the content generation workflow identifier that was initiated by the user at the captured content source (e.g., a source collaborative content document) being accessed by the user via the client device 102a.

As shown at Block 430, upon storing the generated collaborative content data object at the collaborative content management system repository 112 in a supported data format in association with the collaborative content document identifier, the collaborative content management server 110 may generate a content generation confirmation indicator and cause rendering of the generated content generation confirmation indicator within a user interface being displayed at the client device 102a, such as, for example, the collaborative content interface corresponding to the source collaborative content document from which the collaborative content generation request was initiated by the user. In various embodiments, a content generation confirmation indicator generated by the collaborative content management server 110 may comprise data associated with a content generation workflow identifier and/or the collaborative content data object identifier associated with the generated collaborative content data object that indicates that each of the workflow steps of a content generation workflow have been completed. In various embodiments, the content generation confirmation indicator may comprise a textual or graphical statement generated as a representation that a collaborative content data object corresponding to the user-identified source content data object from the captured content source has been generated in association with the user-selected collaborative content document for subsequent rendering within a collaborative content interface corresponding thereto, and thus, that the corresponding content generation workflow has completed in its entirety. Further, in various embodiments, the content generation confirmation indicator may be further associated with the client device 102a and the captured content source identifier, such that the content generation confirmation indicator may be transmitted to the client device 102a from which the content generation workflow was initiated by the user associated therewith.

As shown at Block 432, the client device 102a receives the content generation confirmation indicator and displays the content generation confirmation indicator at the user interface of the client device 102a. For example, in various embodiments, various operations of an exemplary content generation workflow initiated by a user at a captured content source being displayed at the client device 102a, as described herein, may be executed by the collaborative content management system 108 (e.g., at least in part by a collaborative content management server 110) while the user interface displayed at the client device 102a remains at the captured content source. For example, the collaborative content management system 108 may be configured to execute a content generation workflow, as described herein, without interrupting user access to the captured content source displayed at the client device 102a. That is, in various embodiments, the collaborative content management system 108 may execute an exemplary content generation workflow such that the client device 102a from which the exemplary content generation workflow is initiated may at least substantially display a user interface including the captured content source throughout at least substantially the entirety of the duration of the content generation workflow. In such an exemplary circumstance, the content generation confirmation indicator received by the client device 102a may be rendered within the captured content source being at least substantially continuously displayed at the user interface of the client device 102a throughout the execution of the content generation workflow. In various embodiments, the content generation confirmation indicator displayed at the client device 102a via a user interface defined at least in part by the captured content source may comprise one or more elements similar to the exemplary content generation confirmation indicator shown in FIG. 5C (e.g., content generation confirmation indicator 524).

In various embodiments, such as, for example, at an instance subsequent to the execution of an exemplary content generation workflow (e.g., a first content generation workflow) by the collaborative content management system 108, as described herein in reference to Blocks 402-432, the collaborative content document associated with the collaborative content document identifier and defined by the collaborative content document data structure comprising the collaborative content data object generated as a result of the executed content generation workflow may be accessed by a user via user input provided at a client device 102a. For example, as shown at Block 434, in response to receiving user input embodying a collaborative content document selection of a selectable interface element that is rendered within the user interface displayed by the client device 102a and associated with the collaborative content document identifier associated with the collaborative content document, data associated with the collaborative content document selection associated with the collaborative content document identifier may be transmitted by the client device 102a to the collaborative content management server 110. In various embodiments, the user input embodying the collaborative content document selection associated with the collaborative content document identifier associated with the collaborative content document may be indicative of a user's request that the collaborative content interface associated with the collaborative content document identifier that is associated with the generated collaborative content data object corresponding to the source content data object, as described herein, be rendered for display at the client device 102a. As shown at Block 436, the collaborative content management server 110 may receive, from the client device 102a, the data corresponding to the collaborative content document selection associated with the collaborative content document identifier.

Figure 4C:
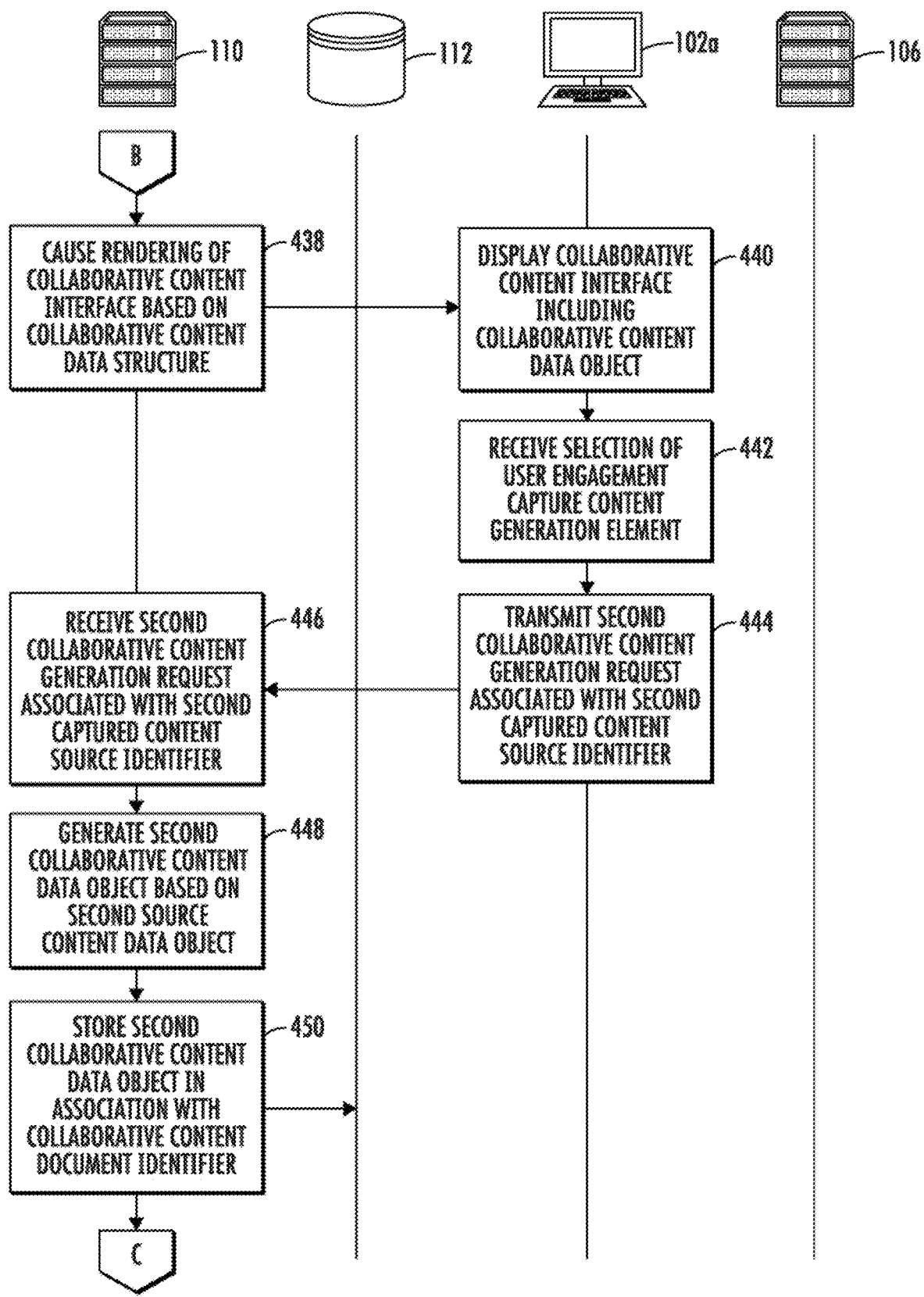

As shown at Block 438 of FIG. 4C, upon receiving data indicative of the collaborative content document selection associated with the collaborative content document identifier, the collaborative content management server 110 may cause rendering of the collaborative content interface corresponding to the collaborative content document associated with the collaborative content document identifier based at least in part on the collaborative content document data structure associated therewith. For example, in some embodiments, the collaborative content management server 110, upon confirming that the user profile associated with the client device 102a includes authorization credentials to access the collaborative content document associated with the collaborative content document identifier, may transmit an instruction to the client device 102a to render the collaborative content interface associated with the collaborative content document identifier for viewing by at least the user associated with the client device 102a from which the collaborative content document selection associated with the collaborative content document identifier was received, as shown at Block 440. Additionally, in still further embodiments, the collaborative content management server 110 may transmit further instructions to one or more additional authorized client devices (e.g., Client Devices 102b, 102c) other than the client device 102a to render the collaborative content interface for viewing by one or more users other than the requesting user associated with the client device 102a, such that the collaborative content interface comprising the collaborative content data object generated via the content generation workflow executed by the collaborative content management server 110, as described herein, is then shared among at least a portion of the one or more additional authorized client devices via the collaborative content management server 110.

In some embodiments, wherein a content generation workflow has been executed to generate a collaborative content data object based on a source content data object such that the generated collaborative content data object is stored (e.g., at a collaborative content management system repository 112) in a supported format as part of an updated collaborative content document data structure that defines the collaborative content document, in causing rendering of the collaborative content interface associated with the collaborative content document identifier for display at the client device 102a, the generated collaborative content data object is displayed to the collaborative content interface such that the collaborative content document, as displayed at the client device 102a, includes the collaborative content data object associated with the content generation workflow identifier (e.g., the collaborative content document is defined at least in part by content that is at least substantially similar to that of a source content data object associated with the captured content source).

In various embodiments a collaborative content management system 108, as described herein, may be configured such that a plurality of collaborative content data objects that are each associated with a collaborative content document identifier and each correspond, respectively, to a plurality of source content data objects accessed by a user, via a client device 102a, at a plurality of captured content sources such that each of the plurality of collaborative content data object generated (e.g., via respective content generation workflows) based on a respective source content data objects is incorporated into the collaborative content document associated with the collaborative content document identifier for display at a corresponding collaborative content interface. For example, as described herein with reference to FIGS. 8A-8B, in various embodiments wherein a user serially accesses, via a client device 102a, a plurality of captured content sources, from which the user initiates a respective plurality of content generation workflows (e.g., based on user input comprising a selection of a user engagement capture content generation element associated with the source content data object), each being associated with the collaborative content document identifier, in order to generate a plurality collaborative content data objects corresponding respectively to a plurality of source content data objects, each source content data object being associated with a respective captured content sources of the plurality, the collaborative content interface corresponding to the collaborative content document associated with the collaborative content document identifier may be iteratively updated upon execution of each of the respective content generation workflows. For example, the collaborative content interface corresponding to the collaborative content document associated with the collaborative content document identifier may be iteratively updated by, upon generation thereof via each of the respective content generation workflows, storing each of the generated collaborative content data objects at the collaborative content management system repository 112 as part of the collaborative content document data structure in association with the collaborative content document identifier such that each of the collaborative content data objects generated as a result of the plurality of respective content generation workflows are included in the collaborative content document and may be rendered within the corresponding collaborative content interface for display at the client device 102a.

As described herein, in various embodiments, collaborative content management system 108 may execute a plurality of content generation workflows associated with the same collaborative content document identifier such that, for example, a first generated collaborative content data object corresponding to a first source content data object associated with a first captured content source and a second generated collaborative content data object corresponding to a second source content data object associated with a second captured content source may each be stored in a supported format as part of the collaborative content document data structure associated with the collaborative content document identifier associated with the collaborative content document. In such an exemplary circumstance, for example, the second captured content source comprises a distinct content source relative to the first captured content source. As an illustrative example, the operations described herein with respect to Blocks 442-462 are at least substantially similar to at least a portion of the operations described herein with respect to the content generation workflow executed as described above with respect to Blocks 402-440. For example, the operations shown between Block 442 and Block 458 correspond to a second content generation workflow executed by the collaborative content management system 108 in order to generate a second collaborative content data object associated with the same collaborative content document identifier as described herein with respect to the first content generation workflow described in reference to Blocks 402-440, such that the collaborative content document data structure associated with the collaborative content document identifier may be updated to include both the first and second generated collaborative content data objects. As described herein, in such an exemplary circumstance, the collaborative content interface corresponding to the collaborative content document associated with the collaborative content document identifier may be updated to include both the first and second generated collaborative content data objects such that causing rendering of the collaborative content interface corresponding to the collaborative content document for display at the client device 102a, as described herein, includes both the first and second generated collaborative content data objects being displayed at the client device 102a within the collaborative content interface.

As an illustrative example, as shown in Block 442 of FIG. 4C, the client device 102a may receive user input comprising a selection of a second user engagement capture content generation element associated with a second source content data object. For example, in various embodiments, the second user engagement capture content generation element and the second source content data object may be provided in an interface associated with a second capture content source, such as, for example, a second source collaborative content document. As described herein, the second user engagement capture content generation element may be configured such that the user input received by the client device 102a comprises an indication of the second source content data object to be captured from the second captured content source and a collaborative content document identifier associated with the collaborative content document to which the user intends to incorporate the second source content data object (e.g., a collaborative content document selection). As an illustrative example, the second user engagement capture content generation element and the second source content data object may be provided at a second captured content source comprising a second source collaborative content document, such that the second source content data object comprises a second collaborative content data object.

In various embodiments, as shown at Block 444, the client device 102a may transmit a second collaborative content generation request associated with a second captured content source identifier associated with the second captured content source to the collaborative content management server 110. In various embodiments, the second collaborative content generation request may be further associated with the second source content data object (e.g., the second collaborative content data object) and/or the collaborative content document identifier associated with the collaborative content document (e.g., the destination collaborative content document to which the second source content data object is to be incorporated). In various embodiments, a second collaborative content generation request is representative of a user's request to capture a second content element (e.g., a second source content data object) from a second captured content source (e.g., a second collaborative content document) that is different than the first captured content source relating to the first content generation workflow described herein in reference to Blocks 402-440. The collaborative content management server 110 may be configured to receive the second collaborative content generation request from the client device 102a, as shown at Block 446.

As described herein, the collaborative content management server 110 may be configured for executing a second content generation workflow at least partially based on the second collaborative content generation request received from the client device 102a. For example, as shown in Block 448, a second collaborative content data object may be generated by the collaborative content management server 110 based at least in part on the second source content data object accessed based on the second captured content source identifier associated with the second collaborative content generation request. As described herein at least in reference to the operations of a first content generation workflow represented at Block 426, the collaborative content management server 110 may generate a second collaborative content data object in association with a second content generation workflow based at least in part on the second source content data object retrieved from the collaborative content management system repository 112 as part of a second collaborative content document data structure associated with the second captured content source identifier (e.g., the second source collaborative content document identifier). For example, in various embodiments, the second collaborative content data object generated by the collaborative content management server 110 during a second content generation workflow initiated by the user may comprise electronic data that is generated, stored, and/or otherwise managed by the collaborative content management system 108 that represents a copied, appended, mirrored, and/or otherwise at least partially reproduced representation of the second source content data object associated with the second captured content source identifier and/or the second collaborative content generation request.

As shown at Block 450 and as described herein at least in reference to the operations of the first content generation workflow represented at Block 428, upon generating the second collaborative content data object based at least in part on the second source content data object associated with the second collaborative content generation request, the collaborative content management server 110 may store the generated second collaborative content data object at the collaborative content management system repository 112 in association with the collaborative content document identifier associated with the user-selected collaborative content document (e.g., selected via an interactive dialog at the second captured content source). In various embodiments, as described herein, storing a second generated collaborative content data object in association with the collaborative content document identifier may comprise updating the collaborative content document data structure associated with the collaborative content document identifier to include the second generated collaborative content data object corresponding to the second source content data object. For example, the second collaborative content data object may be stored in a supported data format at a data repository (e.g., the collaborative content management system repository 112) as a data representation and/or a functional content equivalent of the second source content data object that the user requested (e.g., via a second captured content source associated with the second source content data object) be copied, appended, mirrored, and/or otherwise at least partially reproduced for incorporation into the same collaborative content document to which the first generated collaborative content data object (e.g., generated as a result of the first content generation workflow) is incorporated such that the second collaborative content data object is rendered for display as part of the corresponding collaborative content interface. In various embodiments, the execution of the storage operation directed to the second generated collaborative content data object and the collaborative content document data structure by the collaborative content management server 110 may represent the completion of the second content generation workflow associated with a second content generation workflow identifier that was initiated by the user at the second captured content source (e.g., the second source collaborative content document).

In various embodiments, such as, for example, at an instance subsequent to the execution of the second content generation workflow by the collaborative content management system 108, the collaborative content document associated with the collaborative content document identifier and defined by the collaborative content document data structure comprising the collaborative content data object generated as a result of the executed content generation workflow may be accessed by the user via user input provided at the client device 102a. For example, as shown at Block 452 of FIG. 4D, in response to receiving user input embodying a second collaborative content document selection of a selectable interface element associated with the collaborative content document identifier associated with the collaborative content document that is rendered within the user interface displayed by the client device 102a, data associated with the second collaborative content document selection associated with the collaborative content document identifier may be transmitted by the client device 102a to the collaborative content management server 110. In various embodiments, the user input embodying the second collaborative content document selection associated with the collaborative content document identifier associated with the collaborative content document may be indicative of a user's request that the collaborative content interface associated with the collaborative content document identifier that is associated with the second generated collaborative content data object corresponding to the second source content data object, as described herein, be rendered for display at the client device 102a. As shown at Block 454, the collaborative content management server 110 may receive, from the client device 102a, the data corresponding to the second collaborative content document selection associated with the collaborative content document identifier.

As shown at Block 456, upon receiving data indicative of the second collaborative content document selection associated with the collaborative content document identifier, the collaborative content management server 110 may cause rendering of the collaborative content interface corresponding to the collaborative content document associated with the collaborative content document identifier based at least in part on the collaborative content document data structure associated therewith. For example, in some embodiments, upon confirming that the user profile associated with the client device 102a includes authorization credentials to access the collaborative content document associated with the collaborative content document identifier, the collaborative content management server 110 may transmit an instruction to the client device 102a to render the collaborative content interface associated with the collaborative content document identifier for viewing by at least the user associated with the client device 102a from which the second collaborative content document selection associated with the collaborative content document identifier was received, as shown at Block 458. In various embodiments, at least in part based on the execution of the first content generation workflow and the second content generation workflow, the collaborative content interface may embody an updated interface comprising both the first and second generated collaborative content data objects. For example, causing rendering of the collaborative content interface corresponding to the collaborative content document for display at the client device 102a, as described herein, includes both the first and second generated collaborative content data objects being displayed at the client device 102a within the collaborative content interface.

Figure 5A:
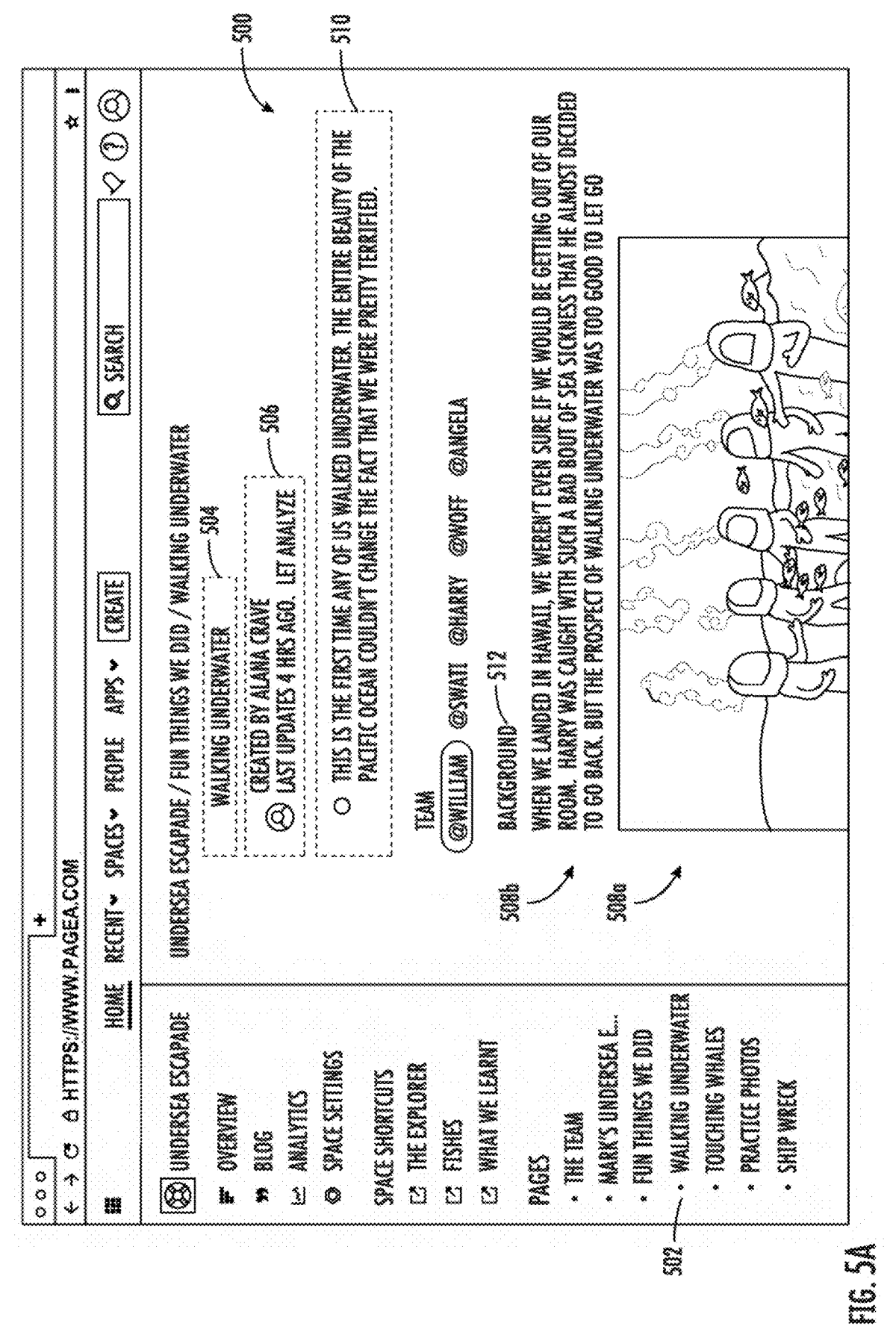
Figure 5B:
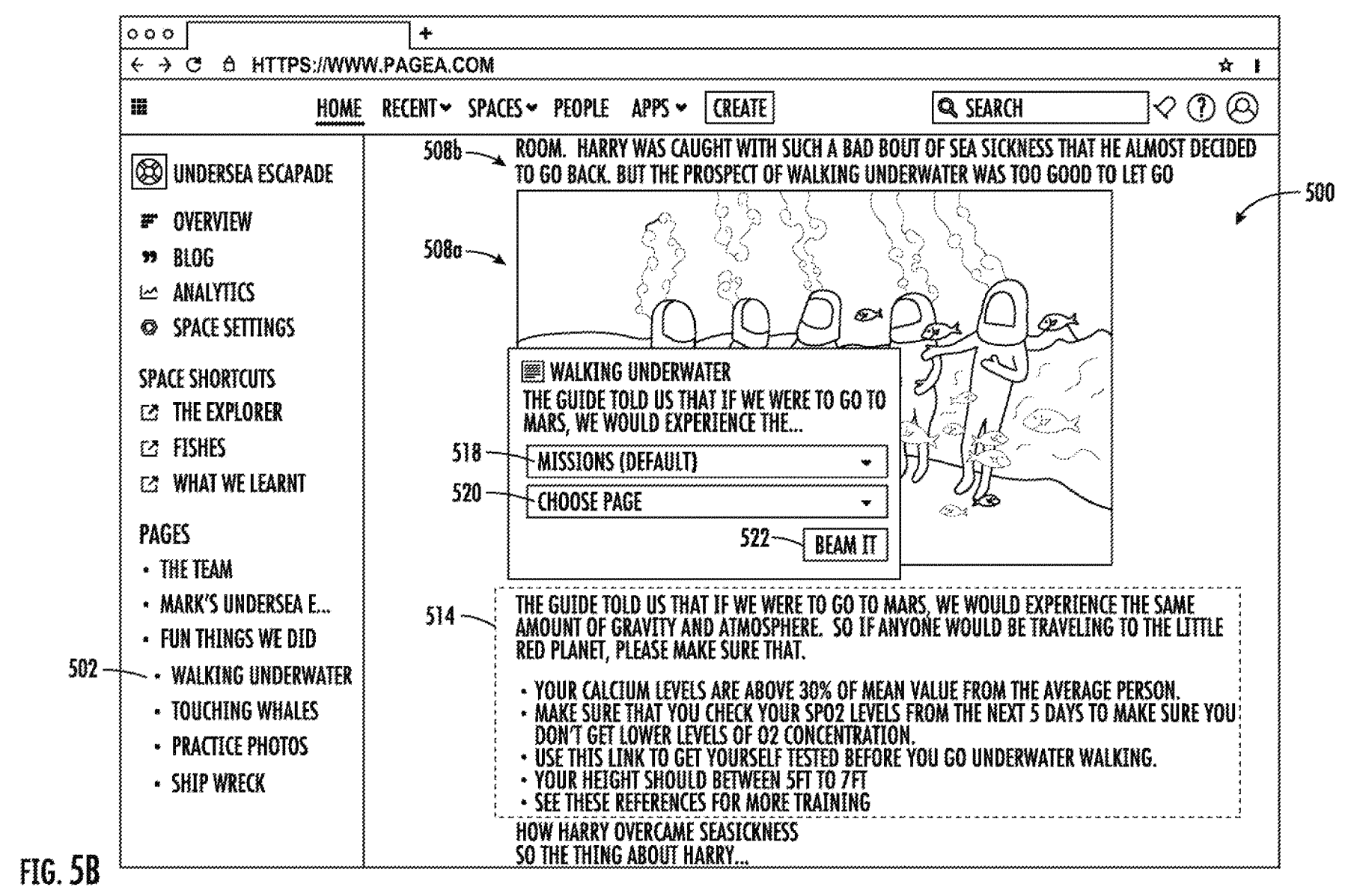
Figure 5C:
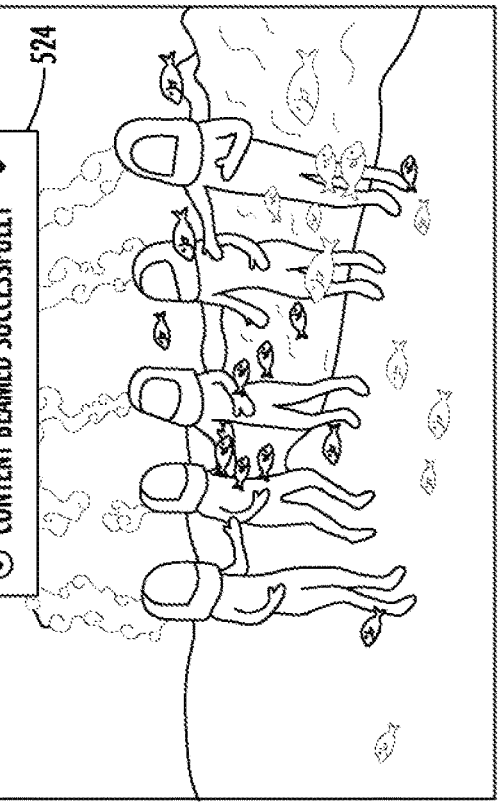

In various embodiments of the present disclosure, an apparatus (e.g., collaborative content management server 110) is configured to generate content for presentation at a collaborative content interface based on a source content data object associated with a captured content source. FIGS. 5A-5C illustrate an example collaborative content interface 500 in accordance with various example embodiments of the present disclosure. It should be appreciated that the information depicted in the example collaborative content interface 500 is exemplary, and that similar and/or alternative data, parameters, data values, data objects, and/or the like may be provided. Additionally or alternatively, in some embodiments, the layout of the various interface elements, and/or sub-interfaces of the depicted collaborative content interface 500 may differ without deviating from scope of this disclosure. As such, the depicted example collaborative content interface 500, sub-interfaces, interface elements, and data objects depicted therein are provided for descriptive and illustrative purposes and are not to limit the scope or spirit of the disclosure herein.

FIG. 5A illustrates an exemplary collaborative content interface 500 structured in accordance with various embodiments of the present disclosure. In some embodiments, the collaborative content interface 500 is configured for rendering to at least one client device. For example, in various embodiments, the collaborative content interface 500 may correspond to a collaborative content document, wherein the collaborative content interface 500 is associated with a collaborative content document identifier associated with the collaborative content document and configured to display the content (e.g., one or more collaborative content data objects) included in the collaborative content document. Additionally, or alternatively, in some embodiments, the collaborative content interface 500 is configured for rendering to a client device 102a associated with a user identifier associated with a user profile defined at least in part by access credentials indicative of a user associated with the user identifier being authorized to access the collaborative content document corresponding to the collaborative content interface 500. In various embodiments, a collaborative content interface 500 may be configured to present a collaborative content document corresponding thereto based at least in part on a collaborative content document data structure associated with the collaborative content document identifier associated with the corresponding collaborative content document. For example, in various embodiments, the collaborative content management server 110 may cause rendering of the collaborative content interface 500 such that at least a portion of the collaborative content document data structure defining the corresponding collaborative content document is displayed at the client device 102a according to a specific format for a collaborative content document, such as the Atlassian® Document Format (ADF).

As an illustrative example, an exemplary collaborative content interface 500 corresponding to a collaborative content document may be structured such that the collaborative content interface 500 comprises one or more of a selectable collaborative content document identifier element 502, a collaborative content document title element 504, a collaborative content document contextual data element 506 comprising contextual data associated with the collaborative content document identifier associated with the collaborative content interface 500, such as, for example, a user identifier associated with a creator user of the collaborative content document, a timestamp value (e.g., a document creation timestamp, a document edit timestamp) and/or the like, a document summarization user interface element 510 configured to depict at least a portion of an abstractive summary generated in association with the collaborative content document, and a collaborative content document section title element 512, and/or any combination thereof. Various apparatuses, methods, and systems for generating one or more abstractive summaries of a collaborative content document in accordance with various embodiments may be configured as described in co-pending U.S. application Ser. No. 17/385,572, filed Jul. 26, 2021, which is incorporated herein by reference in its entirety. Further, in various embodiments, the collaborative content interface 500 may include one or more document recommendation user interface elements, each comprising a selectable link to another collaborative content document within the collaborative content document management system 108 that is recommended to a user accessing the collaborative content document corresponding to the collaborative content interface 500. For example, an exemplary collaborative content interface 500 may include at least one document recommendation user interface element, each comprising a link to another collaborative content document that includes a collaborative content data object that is similar to the collaborative content data object generated by a collaborative content generation workflow and/or another collaborative content document that includes a collaborative content data object that was generated based on source content from the same external networked location. That is, one document recommendation user interface element displayed at the collaborative content interface 500 may comprise a link to another collaborative content document that includes a collaborative content data object associated with the same source content data object identifier (e.g., the same external networked location identifier) as one or more of the collaborative content data objects included in the collaborative content document corresponding to the collaborative content interface 500. Various apparatuses, methods, and systems for enabling effective and efficient predictive document recommendation in collaborative content document management systems in accordance with various embodiments may be configured as described in co-pending U.S. application Ser. No. 17/218,980, filed Mar. 31, 2021, which is incorporated herein by reference in its entirety.

In various embodiments, an exemplary collaborative content interface 500 may comprise at least one collaborative content data object (e.g., collaborative content data objects 508a, 508b) embodying content displayed at client device 102a within the collaborative content interface 500. As described herein, a collaborative content data object provided within an exemplary collaborative content interface 500 may define at least a portion of a collaborative content document data structure that defines the collaborative content document corresponding to the collaborative content interface 500. A collaborative content data object may be associated with a collaborative content data object identifier that uniquely identifies the collaborative content data object within the collaborative content management system. As non-limiting examples, an exemplary collaborative content data object configured for rendering as part of a collaborative content interface 500 may include one or more text elements, one or more image elements, a collaborative content document, and/or the like. For example, each collaborative content data object stored by the collaborative content management system 108 may be defined at least in part by a content type that describes the category of content to which the collaborative content data object corresponds (e.g., a text content type, an image content type, a collaborative content document type, and/or the like).

As illustrated in FIG. 5A, the exemplary collaborative content interface 500 comprises both a first collaborative content data object 508a and a second collaborative content data object 508b rendered within the collaborative content interface 500 for display at a client device (e.g., in response to the collaborative content management server 110 receiving a user request to access the collaborative content document corresponding to the collaborative content interface 500 via the client device). As illustrated, the first collaborative content data object 508a comprises an image element. For example, the first collaborative content data object 508a may be associated with a content type that is an image content type. Further, the second collaborative content data object 508b comprises at least one text element represented as a collection of text data structured to define a paragraph of text arranged within the collaborative content interface 500. For example, the second collaborative content data object 508b may be associated with a content type that is a text content type. The first and second collaborative content data objects 508a, 508b may each be stored in a supported data format as a part of the collaborative content document data structure that defines the collaborative content document corresponding to the collaborative content interface 500, as described herein.

In various embodiments, an exemplary collaborative content interface may be organized into one or more sections comprising a subset of the text and/or other media within a document. For example a section defined within a collaborative content interface may be dedicated to a particular a post comprising content (e.g., collaborative content data object) incorporated into the collaborative content document by a user associated with the collaborative content document identifier. As described herein, a collaborative content interface organized into a plurality of section may correspond to a multi-section document. In various embodiments, one or more sections defined within a collaborative content document maybe visually demarcated within a collaborative content interface that is displayed by the client computing device to an end user of the client computing device. The section demarcation may be performed based on the use of headings, sub-headings, text, images, graphs, and the like to describe the hierarchy of the content within the collaborative content document.

As described herein, a collaborative content management system 108 may be configured to facilitate execution of a content generation workflow based on a collaborative content generation request associated with a source content data object comprising a source collaborative content data object. For example, a content generation workflow may be executed by the collaborative content management system 108 (e.g., the collaborative content management server 110) in order to capture a first collaborative content data object displayed within a first collaborative content interface such that at least a portion of the content defined by the first collaborative content data object may be associated with a second collaborative content document for selective rendering within a corresponding second collaborative content interface that is different than the first collaborative content interface. For example, the collaborative content management server 110 may generate a second collaborative content data object that is representative of an at least partial reproduction of a first collaborative content data object rendered in a first collaborative content interface such that the second collaborative content data object may be incorporated into the second collaborative content document for rendering within the second collaborative content interface. As described in further detail herein in reference to the exemplary operations described at Blocks 402-406 of FIG. 4A, such an exemplary content generation workflow may be initiated by user input received at a client device that comprises a selection of a user engagement capture content generation element arranged within a collaborative content interface.

FIG. 5B illustrates an exemplary collaborative content interface 500 structured in accordance with various embodiments of the present disclosure. In particular, FIG. 5B illustrates an exemplary collaborative content interface 500 that corresponds to the same collaborative content document as the exemplary collaborative content interface shown in FIG. 5A. For example, the collaborative content interface 500 as shown in FIG. 5B represents a different portion of the corresponding collaborative content document being displayed at a client device than was illustrated in FIG. 5A. In various embodiments, a collaborative content interface 500 may be configured such that a collaborative content data object provided therein, such as, for example, a first collaborative content data object 508*a*, a second collaborative content data object 508*b*, and/or a third collaborative content data object 514 may be selected, highlighted, and/or otherwise designated by a user via user input at a client device displaying the collaborative content interface 500. For example, as illustrated, the third collaborative content data object 514 comprises a text element defined by two paragraphs of text that have been selected (e.g., highlighted) by a user as an indication of the user requesting that a content generation workflow be executed to capture the third collaborative content data object 514, as described herein.

As described herein, a collaborative content management server 110 may be configured to generate an interactive dialog 516 for rendering within a collaborative content interface 500 in response to receiving data (e.g., an initial collaborative content generation request) corresponding to a user selection of a collaborative content data object (e.g., the third collaborative content data object 514) provided within the collaborative content interface 500. For example, the interactive dialog 516 is generated by the collaborative content management server 110 to be rendered within a collaborative content interface 500 displayed at a client device associated with the user identifier associated with the initial collaborative content generation request, as described herein. In various embodiments, the interactive dialog 516 may render at least one interactive dialog input element configured to receive user input at the client device configured to display the collaborative content interface 500. For example, the interactive dialog 516 may include one or more interactive dialog input elements configured to facilitate user selection of a collaborative content document to which the selected third collaborative content data object 514 is to be incorporated. As illustrated in FIG. 5B, an interactive dialog 516 may comprise a first interactive dialog input element 518 and a second interactive dialog input element 518. In the exemplary interactive dialog 516, the first interactive dialog input element 518 comprises a drop-down menu comprising a plurality of pre-defined selectable options, each option corresponding to a respective group of collaborative content documents to which the user associated with the client device is authorized to update, edit, and/or otherwise access, as described herein. As organized according to user profile data associated with the user identifier associated with the user. In such an exemplary circumstance, the first interactive dialog input element 518 may be configured to receive user input from the user corresponding to a selection of an identifier associated with a particular grouping, subsection, portion, and/or the like of the collaborative content documents of the collaborative content management system 108 to which the user has access credentials. Further, as illustrated, the second interactive dialog input element 520 of the exemplary interactive dialog 516 comprises a drop-down menu comprising a one or more pre-defined selectable options, each option corresponding respectively to the one or more collaborative content document identifiers associated with the user identifier associated with the client device (e.g., the user identifier associated with the initial collaborative content generation request). For example, each of the selectable elements provided in the drop-down menu of the second interactive dialog input element 520 may comprise a collaborative content document identifier associated with a collaborative content document that is included in the particular group of collaborative content documents selected by the user at the first interactive dialog input element 518. As described herein, each of the collaborative content document identifiers provided as selectable elements arranged in the drop-down menu of the second interactive dialog input element 520 may be associated with a collaborative content document for which the user profile associated with the user identifier has access authorization. The user may provide user input at the client device comprising a selection of one of the collaborative content document identifiers listed within the second interactive dialog input element 520, the user selection being indicative of a desired collaborative content document to which the third collaborative content data object 514 selected by the user is to be incorporated (e.g., for subsequent rending in the collaborative content interface corresponding thereto).

In various embodiments, the interactive dialog 516 rendered within the collaborative content interface 500 may further comprise a selectable content generation workflow initiation element 522 configured to receive user selection thereof as confirmation of the desire of the user to capture user-selected collaborative content data object rendered within the collaborative content interface 500 (e.g., the third collaborative content data object 514, as illustrated) and update a collaborative content document associated with the collaborative content document identifier selected via user input received at the second interactive dialog input element 520 such that at least a portion of the collaborative content document is defined by a collaborative content data object that is at least substantially similar to the user-selected collaborative content data object rendered within the collaborative content interface 500. In various embodiments, the selection of a collaborative content document identifier at the second interactive dialog input element 520 and subsequent selection of content generation workflow initiation element 522 may cause a collaborative content generation request to be transmitted to the collaborative content management server 110, as described herein in further detail in reference to Blocks 418 and 420 of FIG. 4A. As an illustrative example, in such an exemplary circumstance wherein a content generation workflow is initiated by a user selection of a user engagement capture content generation element associated with the user-selected third collaborative content data object 514 rendered within the collaborative content interface 500 is initiated, the third collaborative content data object 514 embodies is the source content data object (e.g., a source collaborative content data object) and the collaborative content document corresponding to the collaborative content interface 500 comprises the captured content source (e.g., a source collaborative content document).

Although the exemplary embodiment illustrated in FIG. 5B shows the source collaborative content data object (e.g., the collaborative content data object selected by user input for capture and incorporation into another collaborative content document) as the third collaborative content data object 514 comprising a textual element (e.g., defined by a content type parameter that is a text content type), various embodiments of the present invention include executing content generation workflows based on source collaborative content data objects that are defined by a variety of content types, such as, for example, a source collaborative content data object comprising an image element (e.g., the first collaborative content data object 508a). Further, in various embodiments, as described herein, a source collaborative content data object may comprise the entire collaborative content document corresponding to the collaborative content interface 500, such that the collaborative content management server 110 executes a content generation workflow to incorporate each of the collaborative content data objects provided within the source collaborative content document into the user-selected destination collaborative content document, such that the collaborative content document data structure associated with the destination collaborative content document identifier is updated to include data corresponding to at least a portion of the collaborative content document data structure that defines the source collaborative content document corresponding to the collaborative content interface 500. In such an exemplary circumstance, as described in further detail herein, upon rendering of the collaborative content interface corresponding to the destination collaborative content document, the generated collaborative content data object corresponding to at least a portion of the source content data object defined by the collaborative content document type (e.g., the entirety of the collaborative content document and/or a document summarization user interface element configured to depict at least a portion of an abstractive summary generated in association with the collaborative content document) may be rendered within one section of a multi-section collaborative content document.

As described herein, based at least in part on the collaborative content generation request received from the client device, the collaborative content management server 110 may facilitate execution of a content generation workflow, whereby the a source content data object (e.g., a source collaborative content data object) rendered within a captured content source (e.g., a source collaborative content document) is captured for rendering at a separate collaborative content interface within the collaborative content management system 108 by generating a collaborative content data object that is at least substantially similar to the source content data object and storing the generated collaborative content data object as part of a collaborative content document data structure defining a collaborative content document corresponding to the separate collaborative content interface. As described herein in reference to Block 430 of FIG. 4B, upon storing the generated collaborative content data object in a supported data format in association with the collaborative content document identifier, the collaborative content management server 110 may generate a content generation confirmation indicator and cause rendering of the content generation confirmation indicator for display at the client device associated with the collaborative content generation request associated with the content generation workflow identifier (e.g., the client device from which the content generation workflow was initiated).

FIG. 5C illustrates an exemplary collaborative content interface 500 structured in accordance with various embodiments of the present disclosure. In particular, FIG. 5C illustrates an exemplary collaborative content interface 500 that corresponds to the same collaborative content document as the exemplary collaborative content interfaces shown in FIGS. 5A and 5B. As described herein, a collaborative content management server 110 may be configured to generate a content generation confirmation indicator 524 for rendering within a collaborative content interface 500 upon determining that each of the workflow steps (e.g., content generation operations) of the content generation workflow associated with the content generation workflow has been executed. As illustrated, in various embodiments, the collaborative content management server 110 may generate the content generation confirmation indicator 524 for rendering within the collaborative content interface 500 corresponding to the source collaborative content document. That is, upon a user initiating a content generation workflow from the collaborative content interface 500 based at least in part on a user selection of a source collaborative content data object rendered within the collaborative content interface 500, the collaborative content management server 110 may execute a content generation workflow and, subsequently, cause rendering of the content generation confirmation indicator 524 within the collaborative content interface 500 corresponding to the source collaborative content document without requiring the user associated with the client device to navigate away from the captured content source (e.g., the source collaborative content document) or access the destination collaborative content document to which the generated collaborative content data object has been appended. The collaborative content management system 108 may execute a content generation workflow initiated by a user from a client device (e.g., via user input at a collaborative content interface 500 corresponding to the source collaborative content document), as described herein, while the user interface rendered at the client device remains at the collaborative content interface 500 corresponding to the source collaborative content document at least substantially continuously throughout the entirety of the execution of the content generation workflow. In such an exemplary circumstance, as described in further detail herein, the collaborative content management server 110 may be configured such that the collaborative content interface corresponding to the destination collaborative content document that was updated to incorporate the generated collaborative content data object as a result of the content generation workflow may not be rendered for display at the client device until the collaborative content management server 110 receives a selection of a selectable interface element corresponding to the collaborative content document identifier associated with the destination collaborative content document.

Figure 6A:
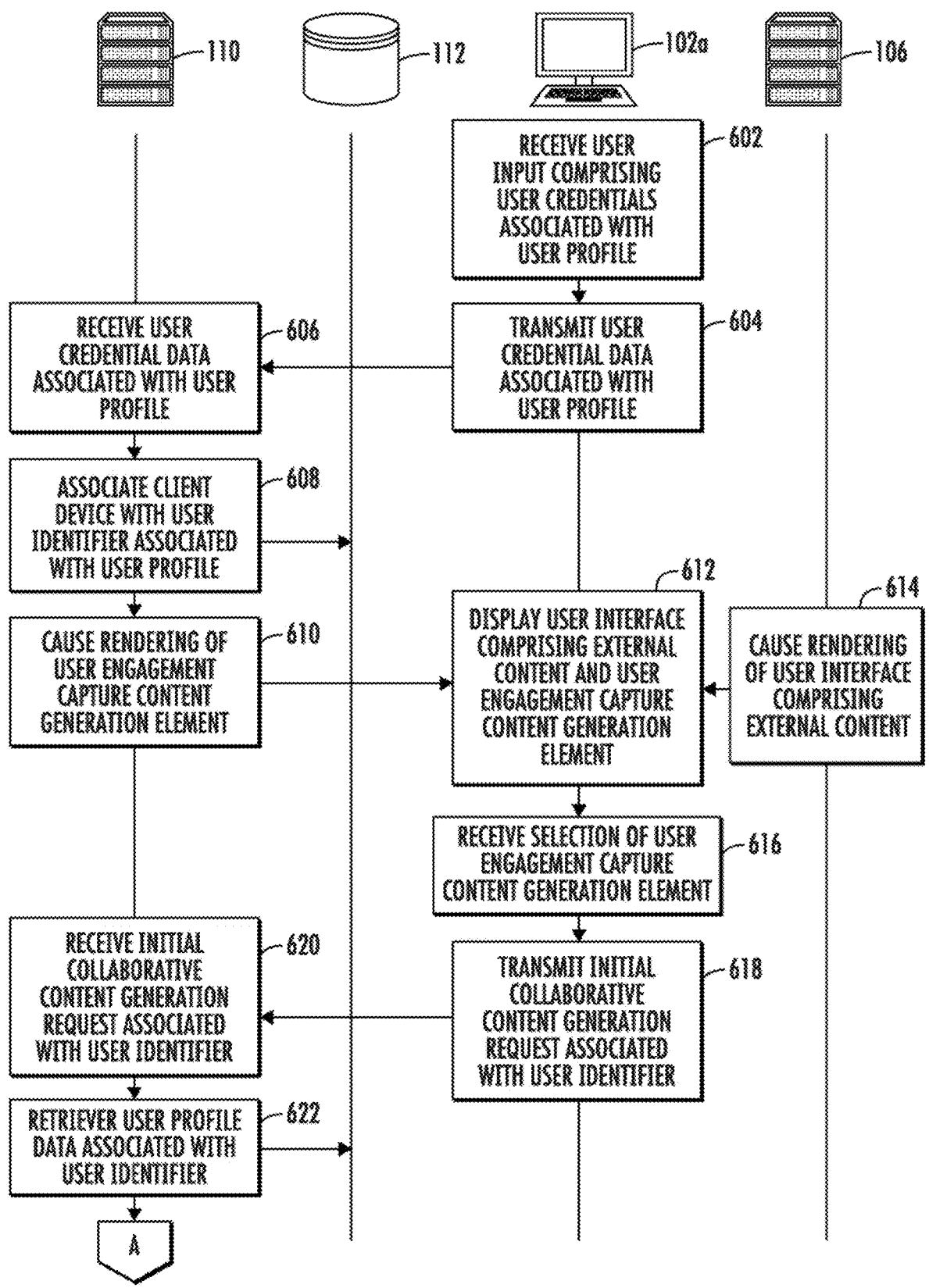
FIGS. 6A-6C illustrate a signal diagram of an example data flow in accordance with various aspects and embodiments of the subject disclosure.
Figure 6B:
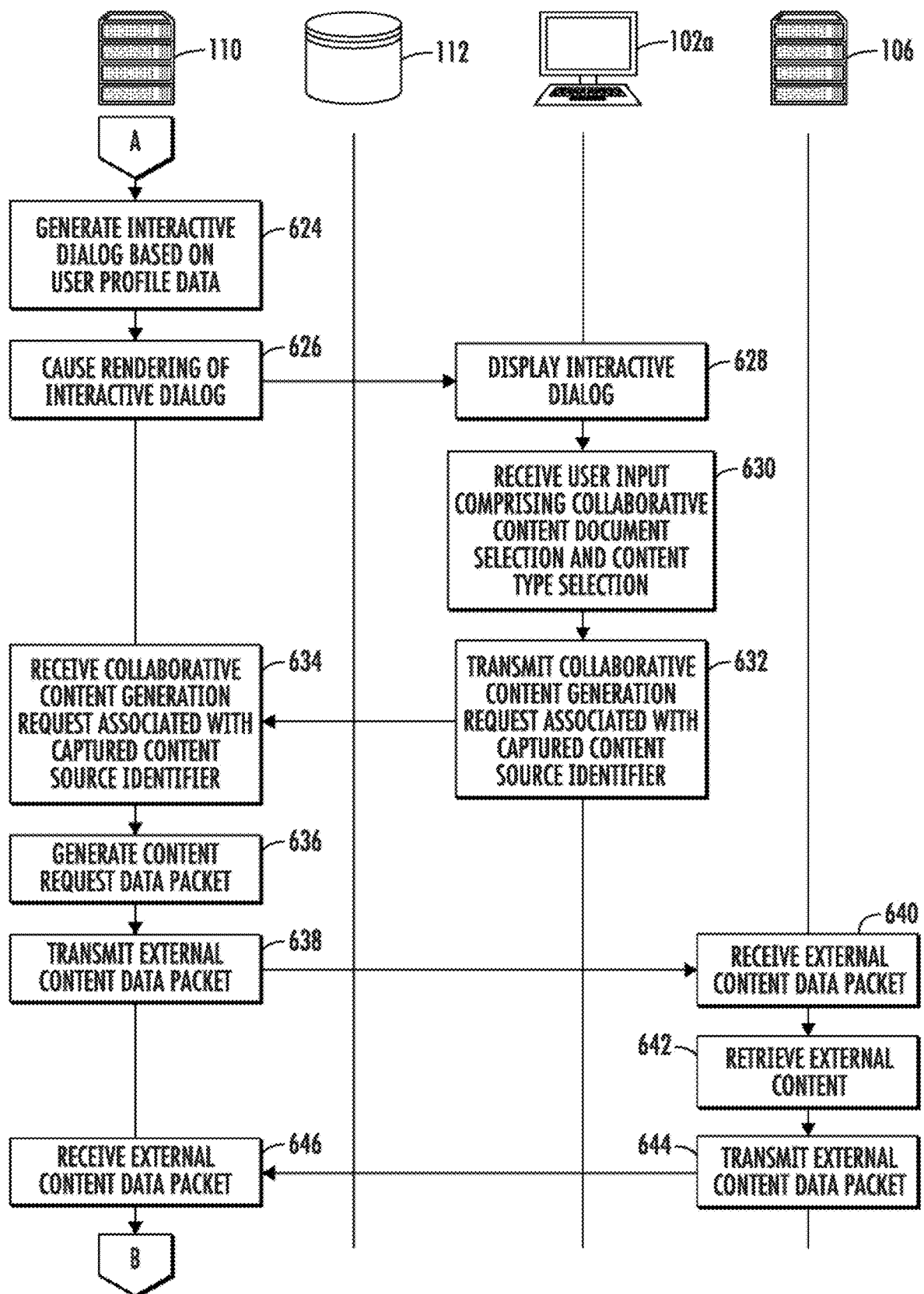
Figure 6C:
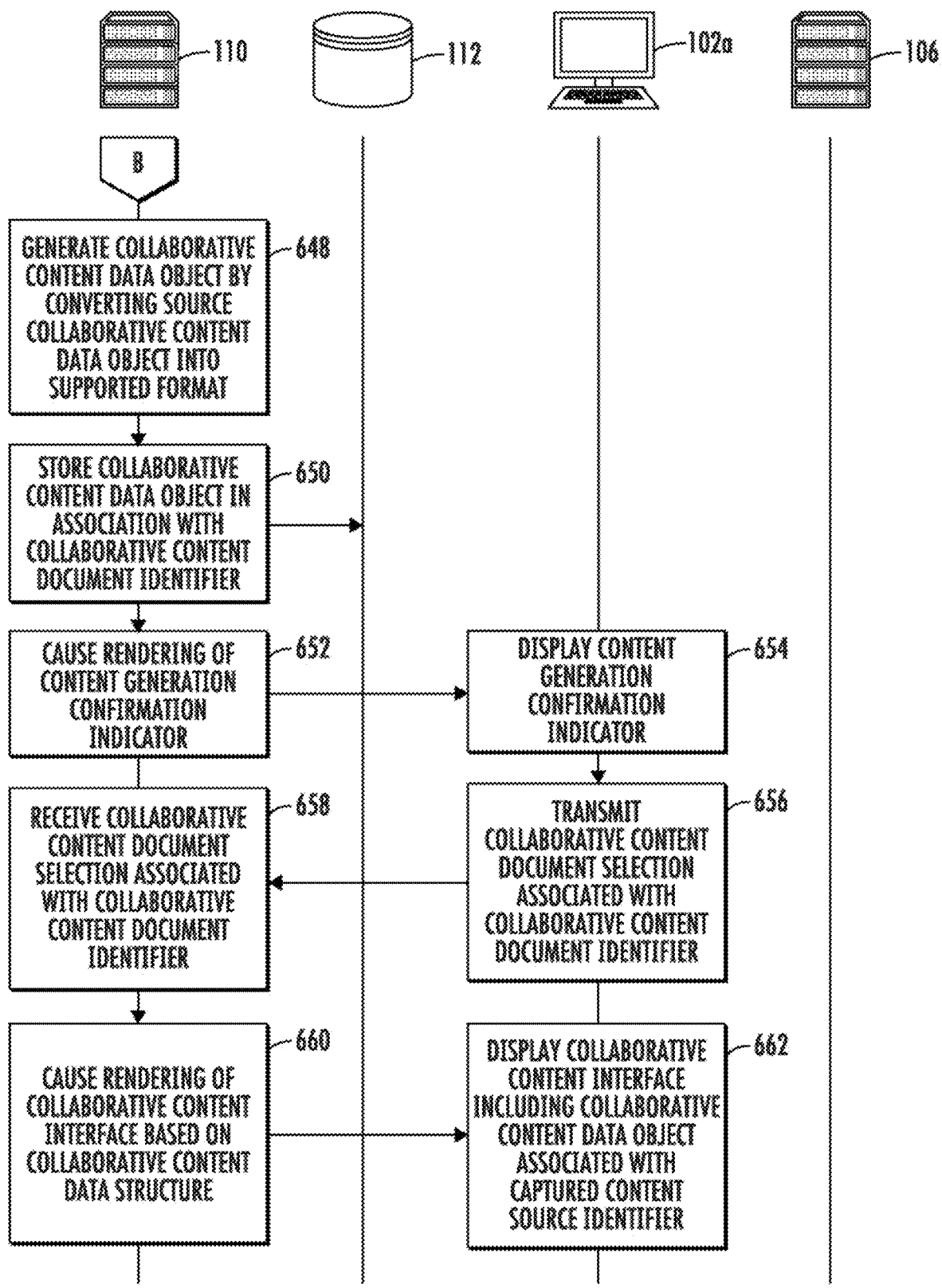

FIGS. 6A-6C illustrate a lane diagram showing functionality of various components associated with an exemplary collaborative content management system 108 in accordance with various embodiments. In particular, FIGS. 6A-6C illustrate an example signal diagram illustrating data flow interactions between a collaborative content management server, a client device, a repository, and an external resource, when generating a collaborative content data object configured for display via a collaborative content interface in accordance with various embodiments. More specifically, FIGS. 6A-6C illustrate example various data flow interactions between a collaborative content management server, a client device, a repository, and an external resource when generating a collaborative content data object configured for display via a collaborative content interface based at least in part on a source content data object that comprises external content associated with an external resource (e.g., associated with an external resource identifier). As described herein, FIGS. 6A-6C illustrate exemplary data flows defining various operations described as being performed by a collaborative content management server 110, a collaborative content management system repository 112, a client device 102a, and/or an external resource 106. These may be at least substantially similar to those previously discussed with regards to FIG. 1 and/or FIGS. 4A-4D.

In various embodiments, a collaborative content management system 108 may be accessed by a user via a client device 102a. For example, based at least in part on user credential data associated with a user profile corresponding to the user, the collaborative content management server 110 may communicate with the client device 102a so as to facilitate user access to at least a portion of the functionalities of the collaborative content management system 108 via the client device 102a. As an illustrative example, as shown in Block 602 of FIG. 6A, the client device 102a may receive user input comprising user credentials associated with a user profile associated with a user identifier associated with the user. Upon receiving the user input comprising the user credentials, the client device 102a may transmit the user credential data to the collaborative content management server 110, which may be configured to receive the user credential data, as shown at Blocks 604 and 606. In various embodiments, upon receiving the user credential data corresponding to the user profile associated with the user identifier, the collaborative content management server 110 may associate the user identifier with the client device 102a, such that the client device 102a embodies an authorized client device with respect to each of the collaborative content documents associated with a collaborative content document identifier that is associated with the user identifier. For example, upon associating the client device 102a with the user identifier associated with the user profile corresponding to the user credentials received from the client device 102a, the collaborative content management server 110 may enable the user to access, review, create, and/or modify/edit one or more collaborative content documents associated with a collaborative content document identifier that is associated with the user identifier via a corresponding collaborative content interface rendered for display at the client device 102a. In various embodiments, such an exemplary configuration, wherein authorization based on the user credential data is provided by the collaborative content management server 110, may enable a collaborative content generation workflow to be executed by a collaborative content management system 108 (e.g., via the collaborative content management server 110) without the user credential data being stored and/or accessed by a web-based browser service (e.g., a web-based plug-in, application, extension, and/or the like), thereby minimizing dispersion and/or transmission of the user credential data outside of the collaborative content management system 108.

In some embodiments, the collaborative content management server 110 may transmit an instruction to the client device 102a to render a user engagement capture content generation element within a user interface displayed at the client device 102a, as shown at Block 610. For example, in various embodiments, the user interface displayed at the client device 102a may be defined at least in part by a web-based browser service configured to facilitate user access to one or more external networked locations, such as, for example, a webpage from the client device 102a. As an illustrative example, in various embodiments, the user may utilize the client device 102a to access (e.g., via a web-based browser) an external networked location hosted by an external resource 106 such that the user interface displayed at the client device 102a is defined at least in part by external content associated with and/or stored by the external resource 106 (e.g., at a repository associated therewith).

As shown at Block 614, the external resource 106 may cause rendering of at least a portion of the user interface, including rendering external content configured for presentation within the user interface to be displayed at the client device 102a. In various embodiments, as described herein, external content provided by (e.g., stored at) an external resource 106 may comprise a webpage accessed by the user via a web-based browser, one or more text elements provided at the webpage, and/or one or more image elements provided at the webpage. In such an exemplary circumstance, a user interface may be displayed at the client device 102a such that both the user engagement capture content generation element associated with the collaborative content management server 110 and the external content provided at the external networked location associated with the external resource 106 are accessible to the user via the client device 102*a*, as shown at Block 612. As non-limiting examples, external content accessible to a user via a user interface displayed at a client device 102*a* may comprise a webpage accessed by the user via a web-based browser, one or more text elements provided at the webpage, and/or one or more image elements provided at the webpage. As described herein, external content associated with the external resource 106 may be provided at an external networked location that comprises an externally-hosted computing location (e.g., a page, application, file, and/or the like) that is operated by the external resource 106 and is accessible to the user via the client device 102*a*. A non-limiting example of an external networked location is an HTML webpage hosted by an external resource 106 that is accessible to the user via a web-based browser.

As shown at Block 616, a selection of the user engagement capture content generation element may be received by client device 102*a* via user input at the user interface displayed at the client device 102*a*. For example, in various embodiments, the user selection of the user engagement capture content generation element provided within the user interface displaying external content provided at an external networked location associated with an external resource 106 to indicate an intent to capture at least a portion of the external content from the external networked location being accessed by the user via the user interface displayed at the client device 102*a*. In various embodiments, in response to receiving a selection of a user engagement capture content generation element presented within a user interface defined at least in part by external content hosted by an external resource 106, the client device 102*a* may transmit an initial collaborative content generation request, as described herein, associated with the user identifier associated with the client device 102*a* to a collaborative content management server 110, as shown at Block 618. In such an exemplary circumstance, the initial collaborative content generation request may comprise a collection of data transmitted by the client device 102*a* to the collaborative content management server 110 that is representative of the user's request to capture content (e.g., external content) from an external networked location that is being accessed by the user via a user interface. For example, an initial collaborative content generation request may include and/or be associated with a user identifier associated with the client device 102*a* and/or an external resource identifier, such that the initial collaborative content generation request is transmitted from client device 102*a* to the collaborative content management server 110 as a means of indicating to the collaborative content management server 110 that a particular user (e.g., the user associated with the user identifier associated with the client device 102*a*) has initiated a content generation workflow in association with external content that is not stored within the collaborative content management system 108.

At Blocks 620 and 622, as described herein in further detail in reference to Blocks 406 and 408, respectively, of FIG. 4A, the collaborative content management server 110 may be configured to receive the initial collaborative content generation request from the client device 102*a* and, upon receipt of the initial collaborative content generation request, may retrieve user profile data associated with the user identifier associated with the initial collaborative content generation request from a collaborative content management system repository 112 of the collaborative content management system 108.

As shown at Block 624, the collaborative content management server 110 may generate an interactive dialog based at least in part on the user profile data associated with the user identifier associated with the initial collaborative content generation request. In various embodiments, the interactive dialog may comprise one or more dialog inputs configured to receive user input from the user corresponding to a collaborative content document identifier associated with one of the one or more collaborative content documents that the user is authorized to update, edit, and/or otherwise access, as described herein. The interactive dialog generated by the collaborative content management server 110 may include a menu, list, and/or like of one or more selectable elements corresponding respectively to one or more collaborative content document identifiers. For example, generating the interactive dialog based at least in part on the user profile data associated with the user identifier may comprise populating a menu, list, and/or like within the interactive dialog using one or more selectable elements corresponding respectively to the one or more collaborative content document identifiers associated with the user identifier associated with the initial collaborative content generation request, each of the collaborative content document identifiers being selectable via the interactive dialog and corresponding to a respective collaborative content document for which the user profile associated with the user identifier has access authorization, as described herein. Further, in various embodiments wherein the initial collaborative content generation request is associated with an external content identifier, the interactive dialog may comprise one or more dialog inputs configured to receive user input from the user corresponding to a content type of the collaborative content data object to be generated (e.g., a content capture mode). For example, the interactive dialog generated by the collaborative content management server 110 may include a menu, list, and/or like of one or more selectable elements corresponding respectively to one or more content type identifiers, each of the content type identifiers being selectable via the interactive dialog and corresponding to a respective content type that may define the collaborative content data object generated by the collaborative content management server 110 (e.g., as a result of the content generation workflow initiated by the initial collaborative content generation request). In particular, the interactive dialog generated by the collaborative content management server 110 may facilitate a user selection of a content type that is indicative of the user's intent to capture external content from the external networked location displayed at the client device 102*a* and cause the collaborative content management server 110 to generate a corresponding collaborative content data object (e.g., based on the external content) that is defined at least in part by the content type selected by the user via the interactive dialog. In various embodiments, the interactive dialog may comprise one or more elements similar to the exemplary interactive dialog shown in FIG. 7B (e.g., interactive dialog 712).

As shown at Block 626 and Block 628, the collaborative content management server 110 may transmit the interactive dialog associated with the user identifier to the client device 102*a*, so as to cause rendering of the interactive dialog at the client device 102*a*. For example, the interactive dialog may be rendered for display at the client device 102*a* within the user interface displaying the external content provided external networked location associated with the external resource 106 (e.g., the same user interface from which the user engagement capture content generation element was accessed, as described above in reference to Block 616). The client device 102*a* may display the interactive dialog to facilitate the receipt of user input comprising a collaborative content document selection and a content type selection, as shown in Block 630. In various embodiments, the interactive dialog may be configured such that the user input received by the interactive dialog from the client device 102a comprises a selection of one of the collaborative content document identifiers provided within the interactive dialog, wherein the collaborative content document selection functions to identify a particular collaborative content document (e.g., of the one or more collaborative content documents that the user is authorized to access) to which the user intends to incorporate a collaborative content data object corresponding to at least a portion of the external content rendered within the user interface displayed at the client device 102a (e.g., the captured content), such that the particular collaborative content document, upon being subsequently accessed and rendered via a collaborative content interface at a client device 102a, includes the generated collaborative content data object corresponding to the external content.

Further, the interactive dialog may be configured such that the user input received by the interactive dialog from the client device 102a comprises a selection of one of the content type identifiers provided within the interactive dialog, wherein the content type selection functions to identify a particular content type by which the collaborative content data object to be generated by the collaborative content management server 110 based on the external content from the external networked location is to be defined. For example, in various embodiments, the interactive dialog may provide a list of content types that may be embodied by exemplary collaborative content data objects generated based on external content associated with an external resource 106, such that the user may select how the external content from the external networked location is captured and/or subsequently represented within the collaborative content interface corresponding to the selected collaborative content document. As described herein, the scope of the external content rendered within the user interface that is to be identified as the source content data object for capture as the user-identified subject content of a content generation workflow may vary depending on the content type selection received by the client device 102a. As a non-limiting example, the content type selection may be indicative of a user's request to capture external content from the external networked location as an image that includes a representation of the user interface rendered for display at the client device 102a (e.g., a "screenshot" of the at least a portion of the external networked location presented at the user interface) taken at a particular instance corresponding to the generation of the collaborative content generation request. In such an exemplary circumstance, the source content data object may be defined at least in part by an image element. As a further non-limiting example, the content type selection may be indicative of a user's request to capture a particular portion of external content presented at the external networked location displayed at the client device 102a within the user interface, such as, for example, a text element, image element, and/or the like rendered for display at the client device 102a. In such an exemplary circumstance, the content type selection may include a user indication of the particular external content to be captured from the external networked location, such as, for example, by the user highlighting and/or clicking (e.g., "right-clicking") on a text element, an image element, and/or the like displayed within the user interface, such that the source content data object is defined as the particular portion of the external content selected by the user.

In various embodiments, as shown at Block 632, the client device 102a may transmit a collaborative content generation request associated with a captured content source identifier to the collaborative content management server 110. As described herein, an exemplary content generation workflow may be executed by a collaborative content management server 110 based on a collaborative content generation request that is received by the collaborative content management server 110 and associated with a captured content source identifier that is associated with an external resource (e.g., an external networked location associated with an external resource). In various embodiments, a collaborative content generation request that is associated with a captured content source identifier corresponding to an external networked location hosted by an external resource 106 is representative of a user's request to capture external content (e.g., a source content data object) from a captured content source defined at least in part by the external networked location (e.g., a website) and generate a collaborative content data object that is at least substantially similar to at least a portion of the external content (e.g., by copying, appending, mirroring, and/or otherwise at least partially reproducing the source content data object) in association with the collaborative content document identifier associated with the collaborative content document selected by the user via the interactive dialog. In various embodiments wherein a user initiates a content generation workflow (e.g., via selection of a user engagement capture content generation element presented within a user interface of the client device 102a) while a user interface comprising external content defining an external networked location is displayed at the client device 102a, the source content data object may be defined at least in part based on the content type selection received by the client device 102a via the interactive dialog, as described above in reference to Block 630.

As an illustrative example, using the example data flows described in reference to Blocks 602-630, the captured content source may comprise an external networked location rendered at a user interface of the client device 102a via which at least a portion of the user-identified external content provided at the external networked location (e.g., the source content data object) was accessed by the client device 102a. For example, upon execution of an exemplary content generation workflow, as described herein, the collaborative content management server 110 causing rendering of a collaborative content interface associated with the collaborative content document identifier associated with the user-selected collaborative content document (e.g., selected via the interactive dialog) may comprise causing the collaborative content data object generated based at least in part on the external content from the external networked location to be at least partially rendered within the collaborative content interface displayed at the client device 102a.

In various embodiments, a collaborative content generation request associated with an external resource identifier may comprise a collection of data transmitted by the client device 102a to the collaborative content management server 110 that is representative of a user's request to capture content comprising a source content data object (e.g., external content) from a captured content source (e.g., a source collaborative content document) that is accessed by the user via a user interface displayed at the client device 102a (e.g., a user interface corresponding to an external networked location) as part of a content generation workflow. For example, a collaborative content generation request may include and/or be associated with the collaborative content document identifier selected by the user via the interactive dialog and a captured content source identifier associated with the captured content source from which a source content data object was accessed by the user via the client device 102a (e.g., an external resource identifier associated with the external networked location defined at least in part by the external content). Further, in various embodiments, the collaborative content generation request may be further associated with a source content data object identifier (e.g., an external content identifier associated with the external content identified by the user). Further still, in various embodiments, the collaborative content generation request may be further associated with a user identifier (e.g., the user identifier associated with the client device 102a). Further still, in various embodiments, the collaborative content generation request may be further associated with a content type identifier, such as, for example, the content type identifier selected by a user via user input provided at the interactive dialog rendered at the client device 102a (e.g., the content type selection).

A collaborative content generation request associated with a captured content source identifier comprising an external resource identifier may be transmitted from client device 102a to the collaborative content management server 110 as a means of indicating to the collaborative content management server 110 that the user associated with the user identifier associated with the client device 102a (e.g., and/or the initial collaborative content generation request) has requested that a collaborative content data object corresponding to a source content data object (e.g., external content provided at an external networked location) be generated by the collaborative content management server 110 for storage by the collaborative content management system 108 and subsequent, on-demand display at a collaborative content interface corresponding to the user-selected collaborative content document. As shown at Block 634, the collaborative content management server 110 may be configured to receive the collaborative content generation request associated with the captured content source identifier from the client device 102a.

As shown at Block 636, the collaborative content management server 110 may generate an external content data packet comprising at least a portion of the data structure associated with the data structure identifier associated with the detected verification trigger event. As described herein, the generated external content data packet may be configured to be transmitted to an external resource 106 in response to receiving a collaborative content generation request associated with a captured content source identifier associated with the external resource 106. For example, in various embodiments, an external content data packet may comprise external content routing data and payload data. In various embodiments, external content routing data may be utilized by the collaborative content management server 110 to identify and/or appropriately route the external content data packet to an appropriate proxy endpoint to trigger an external resource to perform one or more actions to facilitate the execution of a content generation workflow, as described herein. In various embodiments, the collaborative content management server 110 may configure the external content data packet in accordance with one or more formatting and/or content requirements of a particular external resource 106. In various embodiments, the collaborative content management server 110 may assemble routing data for the external content data packet to comprise (1) one or more captured content tokens, (2) a source content data object identifier, (3) a captured content source identifier, (4) a content generation workflow identifier, (5) a timestamp indicating when the external content is requested, and/or the like.

In various embodiments, external content routing data included in an external content data packet may identify the one or more actions to be performed by the external resource 106 on behalf of the collaborative content management server 110, such as, for example, the retrieval and subsequent transmittal to the collaborative content management system 108 of various data (e.g., external content) stored (e.g., hosted) by the external resource 106 based at least in part on the payload data provided within the data packet in order to facilitate the execution of the content generation workflow. For example, the payload data may at least identify a particular subset of data stored by the external resource 106 that corresponds to the external content being requested by the collaborative content management system 108, such as, for example, a source content data object identifier, an external networked location identifier, and/or the like. For example, the external content data packet may be configured for transmission to the external resource 106 associated with the external networked location (e.g., the captured content source) defined at least in part by the external content designated for capture by the user (e.g., the source content data object) such that the payload data may provide, for example, a source content data identifier that identifies particular external content (e.g., a text element, an image element, a webpage, and/or the like) hosted by the external resource 106 at the external networked location, and the external content routing data may provide instructions to the external resource 106 to provide the external content (e.g., data associated with the source content data object identifier) hosted and/or stored by the external resource 106. In various embodiments, an external content data packet may comprise at least one captured content token associated with the collaborative content management server 110, a captured content source identifier associated with the external resource 106, a content generation workflow identifier, and a source content data object identifier (e.g., corresponding to the external content). In various embodiments, the external content data packet may be generated by the collaborative content management server 110 based at least in part on the content type identifier associated with the collaborative content generation request. For example, the external content routing data included in an external content data packet may be generated based at least in part on the content type identifier associated with the collaborative content generation request received by the collaborative content management server 110. As a non-limiting illustrative example, in an exemplary circumstance in which a first content type selection associated with a first collaborative content generation request relates to a text content type, the external content routing data included in an external content data packet generated by the by the collaborative content management server 110 may be at least substantially different than the external content routing data included in an external content data packet that is generated in response to a second collaborative content generation request associated with a second content type selection relating to an image content type or a screenshot content type.

As shown at Blocks 638 and 640, the collaborative content management server 110 may transmit the external content data packet to the external resource 106 associated with the captured content source identifier associated with the collaborative content generation request, which may be configured to receive the transmitted data packet from the collaborative content management server 110. For example, the collaborative content management server 110 may provide the external content data packet to the external resource 106 via a proxy endpoint, which may be identified by the routing data included in the external content data packet. In various embodiments a proxy endpoint may provide an API for passing the external content data packet from the collaborative content management server 110 to the external resource 106, thereby enabling the external resource 106 to consume the routing data and/or the payload data provided within the data packet. The data included within the external content data packet, including a captured content token associated with the content generation workflow identifier is passed to the external resource 106, for example, using the API to provide the data to the external resource 106 in a format that may be consumed by the external resource 106.

In various embodiments, transmitting an external content data packet to the external resource 106 causes the external resource 106 to identify and retrieve various data (e.g., external content) that is stored by the external resource 106 (e.g., at repository associated therewith) and corresponds to at least a portion of the data included in the external content data packet (e.g., the payload data defined at least in part by a source content data object identifier), as shown at Block 642.

Upon retrieving the data corresponding to the external content based at least in part on the payload data provided with the external content data packet, the external resource 106 may transmit an external content data packet comprising external content and/or data defining the user-identified external content hosted by the external resource 106 to the collaborative content management server 110, which may receive the external content data packet, as shown at Blocks 644 and 646. For example, in various embodiments, the external resource 106 may transmit the external content data packet to the collaborative content management server 110 via a proxy endpoint identified by the external content routing data and/or the captured content token included in the transmitted data packet. In various embodiments, an external content data packet may comprise various data retrieved from the external resource 106 (e.g., a repository associated therewith) relating to the external content that was identified by the source content data object identifier provided with the external content data packet. In various embodiments, the external content data packet received by the collaborative content management server 110 may further include a captured content source identifier associated with the external resource 106 that uniquely identifies the captured content source (e.g., the external networked location) associated with the external resource 106. Further, in various embodiments, the external content data packet transmitted to the verification system 110 by the external resource 106 may further include source content metadata associated with the source content data object (e.g., the external content) and/or the captured content source (e.g., the external networked location). For example, source content metadata associated with a source content data object identifier associated with a source content data object may define at least a portion of a source content data object, as described herein. As non-limiting examples, a source content data object may include source content metadata comprising a title identifier, an author identifier, a URL address associated with the external networked location, a captured content source identifier, one or more user identifiers, one or more timestamp values, and/or other metadata associated with the source content data object and/or the captured content source.

In various embodiments, the external content data packet transmitted to the verification system 110 by the external resource 106 may be further accompanied by a captured content token associated with the captured content source identifier, the source content data object identifier, and the content generation workflow identifier. Based at least in part on the captured content token received in conjunction with the external content data packet, the collaborative content management server 110 may associate at least a portion of the external content data packet (e.g., the external content retrieved by the external resource 106) with the content generation workflow identifier and/or the collaborative content document identifier, as described herein.

Further, in various embodiments, the collaborative content management server 110 may facilitate capture of external content associated with an external networked location hosted by an external resource by parsing user-selected content and/or the external networked location associated therewith to extract at least a portion of the source content metadata associated with the external content. For example, in various embodiments, at least a portion of a collaborative content management system 108 may be configured to operate as a portion of a web-based browser service (e.g., plug-in, add-on, extension, etc.) such that the collaborative content management server 110 may communicate (e.g., transmit and/or receive data) with a client device utilizing the web-based browser service to access external content hosted at an external networked location by an external resource. As described herein, in such an exemplary circumstance, such as, for example, wherein external content is rendered for display within an external user interface using a web-based browser associated with a web-based plug-in, application, extension, and/or the like associated with the collaborative content management system 108, at least a portion of the external content rendered within the external user interface 700 may be selectively engaged by a user via user input at the client device. As non-limiting example, the collaborative content management server 110 may interact with the identified external content rendered within an external user interface displayed at a client device by extracting at least a portion of the inline-HTML component of the external content defined throughout the external networked location and/or defined within a user-selected external content object. In such an exemplary circumstance, for example, the collaborative content management server 110 may add or append the extracted inline-HTML component of the external content to a collaborative content document and/or corresponding collaborative content interface through one or more REST API calls executed by the collaborative content management server 110, such that the collaborative content document data structure associated with the collaborative content document identifier includes the extracted inline-HTML component of the external content. As a further example, in various embodiments, the collaborative content management server 110 may directly scrape (e.g., parse) the external networked location to retrieve at least a portion of the inline-HTML component of the external content. In such an exemplary configuration, for example, the collaborative content management server 110 may be configured such that, upon executing a predetermined number of API call attempts, the collaborative content management server 110 may scrape the external networked location using one or more HTML/XML libraries, such as, for example, BeautifulSoup.

As described herein, the source content data object (e.g., the external content) transmitted from the external resource 106 may be received by the collaborative content management server 110 in an unsupported format. For example, in various embodiments, based at least in part on the hardware and software platform utilized by the external resource 106, external content stored and retrieved by the external resource 106 may be defined by a format that is incompatible, inappropriate, and/or not utilized by the collaborative content management server 110 in the context of a content generation workflow and/or for rendering within a collaborative content interface, as described herein. Accordingly, in such an exemplary circumstance, the external content received by the collaborative content management server 110 may be received in a format that is different than the format of the collaborative content document data structures, collaborative content data objects, and/or the like stored at the collaborative content management system repository 112, (e.g., an "unsupported" format). As shown at Block 648, of FIG. 6C the collaborative content management server 110 may generate a collaborative content data object associated with the collaborative content document identifier based at least in part on the source content data object (e.g., the external content) accessed based on the captured content source identifier. As described herein, the collaborative content management server 110 may generate a collaborative content data object in association with a content generation workflow based at least in part on the source content data object received from the external resource 106 associated with the captured content source identifier (e.g., the external networked location identifier). For example, in various embodiments, a collaborative content data object generated by the collaborative content management server 110 based on external content hosted by an external resource 106 (e.g., in response to a collaborative content generation request associated with an external networked location identifier) may comprise electronic data that is generated, stored, and/or otherwise managed by the collaborative content management system 108 that is defined by a supported data format, as described herein, and represents a copied, appended, mirrored, and/or otherwise at least partially reproduced representation of the external content associated with a collaborative content generation request. A collaborative content data object generated by the collaborative content management server 110 based on a source content data object comprising external content, as described herein, may embody a functional content equivalent of the source content data object (e.g., at least a portion of the external content, as indicated by the content type selection received as user input to the interactive dialog) such that the generated collaborative content data object is configured to, upon rendering of a collaborative content interface corresponding to the collaborative content document defined at least in part by the generated collaborative content data object, cause at least substantially the same content to be displayed within the collaborative content interface as was displayed at the external networked location (e.g., the captured content source). In various embodiments, generating the collaborative content data object associated with the collaborative content document identifier, as described herein, comprises appending at least a portion of the generated collaborative content data object corresponding to the external content received from the external resource 106 (e.g., the source content data object) to the collaborative content document data structure associated with the collaborative content document identifier associated with the collaborative content document to which the generated collaborative content data object is being incorporated.

In various embodiments, generating a collaborative content data object based on external content accessed by the user at an external networked location associated with the external resource 106 as part of a content generation workflow may comprise converting, by the collaborative content management server 110, the unsupported source content data object (e.g., the external content) received from the external resource 106 into a supported data format. In various embodiments, upon receiving an unsupported source content data object comprising external content defined by an unsupported data format, the collaborative content management server 110 may execute one or more data processing operations associated with the external content such that a generated collaborative content data object corresponding to the external content is defined at least in part by a data format that is supported by the collaborative content management server 110. For example, in various embodiments, the collaborative content management server 110 may execute one or more validation rules (e.g., executable instructions, data mapping functions, other schema, and/or the like) to facilitate conversion of an unsupported source content data object to a supported data format, such as, for example, executing the capture of an image (e.g., "a screenshot") of at least a portion of the external networked location including the source content data object as rendered for display at the client device 102a, generating a selectable link to the external networked location associated with the source content data object (e.g., a link that reads as the text "Read more . . . " and redirects the user to the external networked location) for rendering at the collaborative content interface with the generated collaborative content data object corresponding to the source content data object, and/or the like.

The collaborative content management server 110 may be configured to facilitate execution of various data processing operations such as, for example, removing javascript elements, CSS text elements, and/or the like from the external content. As a non-limiting illustrative example, converting the unsupported source content data object (e.g., the external content) received from the external resource 106 into a supported data format may comprise a collaborative content management server 110 retrieving, receiving, and/or otherwise identifying an HTML and/or CSS form associated with an external content, external networked location, and/or external resource. In various embodiments, the collaborative content management server 110 may parse the HTML data to identify one or more core data components (e.g., core tags) present in the external content that are to be copied, recreated, and/or otherwise reproduced as part of the collaborative content generation workflow in order to generate a collaborative content data object that corresponds to the external content. For example, in an exemplary circumstance wherein the collaborative content management server 110 determines that the external content comprises bullet point text, the collaborative content management server 110 will identify and/or group each of the <ul>, <li> tags and convert them to a corresponding format as defined by the supported format (e.g., such that the converted data is compatible with Atlassian® Document Format (ADF)). In such an exemplary circumstance, the <ul> tag may be converted to "bulletList" and the <li> may be converted to "listItem" in order to facilitate incorporation of the data associated with the external content into a collaborative content data structure that may be stored and/or functional within the collaborative content management system 108. As a further non-limiting illustrative example, converting the unsupported source content data object (e.g., the external content) received from the external resource 106 into a supported data format may further comprise a collaborative content management server 110 converting an external networked location (e.g., a webpage) and/or at least a portion thereof into a supported format by capturing an image and executing one or more validation rules to generate corresponding data elements that are compatible with the supported format such that the data corresponding to the captured image may be stored by the collaborative content management server 110. As described herein, the collaborative content management server 110 may execute one or more validation rules (e.g., executable instructions, data mapping functions, other schema, and/or the like) relating an exemplary HTML tag and/or captured image data to a corresponding supported format in order to facilitate a low-latency conversion operation characterized by minimized processing time.

For example, upon being converted to a supported format by the collaborative content management server 110, the source content data object may define a supported collaborative content data object configured for storage at the collaborative content management system repository 112 as part of a collaborative content document data structure, so as to be configured for rendering within a collaborative content interface associated with the collaborative content document data structure. As described herein, the supported format utilized by the collaborative content management server 110 may enable the collaborative content management system 108 to execute content generation workflows in association with external content provided at various external networked locations hosted by a plurality of different external resources—each of which may be configured to operate using a respective unsupported format—that has been converted into a singular format supported by the collaborative content management server 110 such that the generated collaborative content data object corresponding to the external content may define at least a portion of a collaborative content document and may be displayed at the client device 102a according to a specific format for a collaborative content document, such as the Atlassian® Document Format (ADF). In various embodiments, upon converting the source content data object from an unsupported data format associated with the external networked location to the supported format, the collaborative content management server 110 may determine whether the any supported data stored at the collaborative content management system repository 112 had been previously generated by the collaborative content management server 110 based on external content from the same external networked location within the current access session (e.g., within a predetermined amount of time prior to the collaborative content generation workflow). In an exemplary circumstance wherein the collaborative content management server 110 determines that such data is already present in the collaborative content data structure associated with the collaborative content document identifier, the collaborative content management server 110 may append at least a portion of the newly converted data to the existing supported data. Alternatively, an exemplary circumstance wherein the collaborative content management server 110 determines that such data from the same external networked location is not present in the collaborative content data structure associated with the collaborative content document identifier, the collaborative content management server 110 may append the newly converted data to the end of the collaborative content document.

As shown at Block 650 and as described herein at least in reference to the exemplary operations of the collaborative content management system 108 represented at Block 428 of FIG. 4B, upon generating the collaborative content data object based at least in part on the external content as designated in association with the content generation request associated with the content generation workflow identifier, the collaborative content management server 110 may store the generated collaborative content data object at the collaborative content management system repository 112 in association with the collaborative content document identifier associated with the user-selected collaborative content document (e.g., as indicated by the collaborative content document selection received by the client device 102a via the interactive dialog at the user interface defined at least in part by the external networked location). In various embodiments, as described herein, storing the generated collaborative content data object in association with the collaborative content document identifier may comprise updating the collaborative content document data structure associated with the collaborative content document identifier to include the generated collaborative content data object corresponding to the user-designated external content (e.g., the source content data object). As described herein, the generated collaborative content data object may be stored in a supported data format at the collaborative content management system repository 112 as a data representation and/or a functional content equivalent of the external content (e.g., the source content data object) that the user requested be copied, appended, mirrored, and/or otherwise at least partially reproduced for incorporation into the user-selected collaborative content document. For example, upon an authorized user accessing the collaborative content document via a client device, the generated collaborative content data object may be rendered for display at the client device as part of the corresponding collaborative content interface. In various embodiments, the execution of the storage operation directed to the generated collaborative content data object and the collaborative content document data structure by the collaborative content management server 110 may represent the completion of the content generation workflow that was initiated by the user at the external networked location hosted by the external resource 106 (e.g., the captured content source).

As shown at Block 652, upon storing the generated collaborative content data object at the collaborative content management system repository 112 in a supported data format in association with the collaborative content document identifier, the collaborative content management server 110 may generate a content generation confirmation indicator and cause rendering of the generated content generation confirmation indicator within a user interface being displayed at the client device 102a, such as, for example, an external user interface corresponding to the external networked location from which the collaborative content generation request was initiated by the user. As shown at Block 654, the client device 102a receives the content generation confirmation indicator and displays the content generation confirmation indicator at the user interface (e.g., an external user interface) of the client device 102a. For example, in various embodiments, various operations of an exemplary content generation workflow initiated by a user at a captured content source being displayed at the client device 102a, as described herein, may be executed by the collaborative content management system 108 (e.g., at least in part by a collaborative content management server 110) while the external user interface remains at the external networked location.

As shown at Blocks 656, 658, and 660, upon receiving data indicative of a collaborative content document selection associated with the collaborative content document identifier being received at the client device 102a, the collaborative content management server 110 may cause rendering of the collaborative content interface corresponding to the collaborative content document associated with the collaborative content document identifier based at least in part on the collaborative content document data structure associated therewith. For example, in some embodiments, the collaborative content management server 110, upon confirming that the user profile associated with the client device 102a includes authorization credentials to access the collaborative content document associated with the collaborative content document identifier, may transmit an instruction to the client device 102a to render the collaborative content interface associated with the collaborative content document identifier for viewing by at least the user associated with the client device 102a from which the collaborative content document selection associated with the collaborative content document identifier was received, as shown at Block 662. Additionally, in still further embodiments, the collaborative content management server 110 may transmit further instructions to one or more additional authorized client devices (e.g., Client Devices 102b, 102c) other than the client device 102a to render the collaborative content interface for viewing by one or more users other than the requesting user associated with the client device 102a, such that the collaborative content interface comprising the collaborative content data object generated via the content generation workflow executed by the collaborative content management server 110, as described herein, is then shared among at least a portion of the one or more additional authorized client devices via the collaborative content management server 110.

Figure 7A:
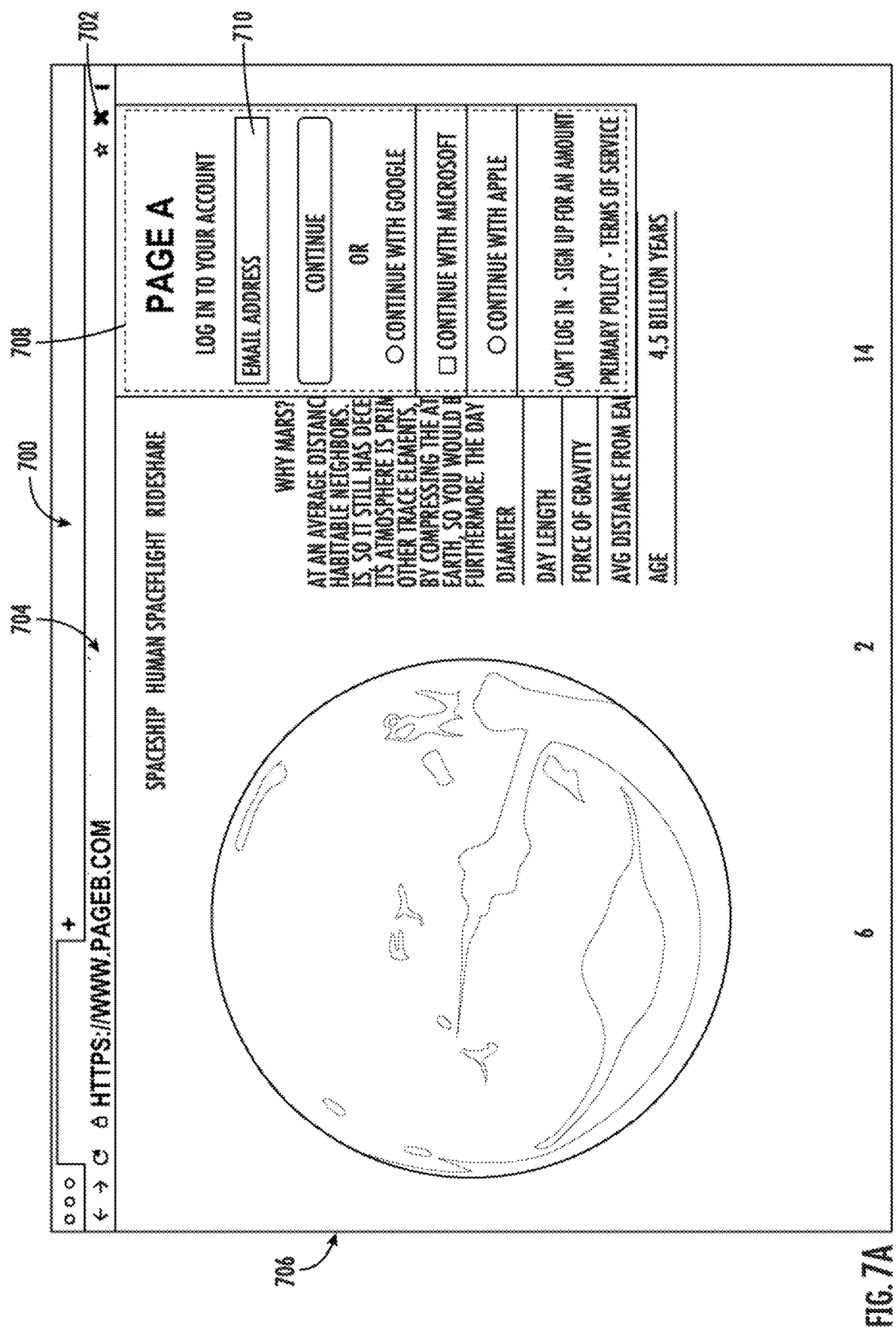
FIGS. 7A-7B illustrate an example user interface structured to include external content and an interactive dialog in accordance with some example embodiments described herein.
Figure 7B:
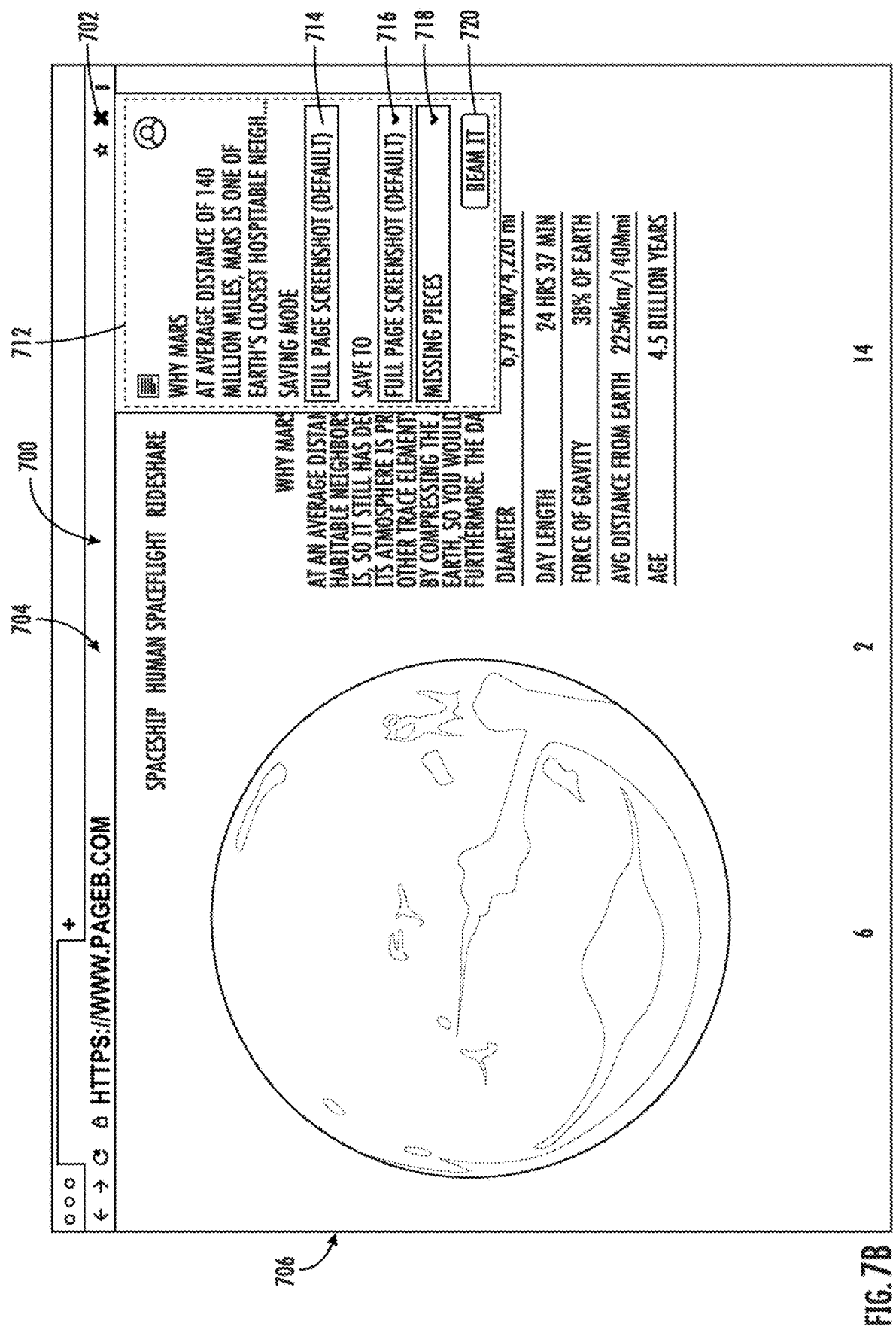

As described herein, in various embodiments of the present disclosure, an apparatus (e.g., collaborative content management server 110) is configured to generate content for presentation at a collaborative content interface based on external content (e.g., a source content data object) associated with an external networked location (e.g., a captured content source) that is hosted by an external resource and rendered within a user interface accessed by a user via a client device. FIGS. 7A-7B illustrate an example external user interface 700 displaying external content provided at an external networked location associated with an external resource in accordance with various example embodiments of the present disclosure. It should be appreciated that the information depicted in the example external user interface 700 is exemplary, and that similar and/or alternative data, parameters, data values, data objects, and/or the like may be provided. Additionally or alternatively, in some embodiments, the layout of the various interface elements, and/or sub-interfaces of the depicted external user interface 700 may differ without deviating from scope of this disclosure. As such, the depicted example external user interface 700, sub-interfaces, interface elements, and data objects depicted therein are provided for descriptive and illustrative purposes and are not to limit the scope or spirit of the disclosure herein.

FIG. 7A illustrates an exemplary external user interface 700 structured in accordance with various embodiments of the present disclosure. The external user interface 700 is configured for rendering to a client device such that an exemplary external networked location displayed at the external user interface 700 is accessible to the user via the client device. For example, at least a portion of an external networked location may be rendered within the external user interface 700 for display at the client device such that external content hosted by the external resource and provided at the external networked location may be displayed within the external user interface 700 at the client device. As illustrated, the external user interface 700 may be defined at least in part by an external networked location comprising an HTML webpage that is hosted by an exemplary external resource and accessed by the user associated with the client device via a web-based browser. The external user interface 700 comprises external content (e.g., image elements, text elements, webpage elements, and/or the like) that is stored and/or maintained by the external resource, such that the external content is presented to the user associated with the client device via the external content interface 700. For example, in various embodiments, the external resource may cause rendering of the external user interface 700 such that external content stored by the external resource in an unsupported format, as described herein, may be presented to the user associated with the client device via the external user interface 700.

An exemplary external user interface 700 may defined at least in part by a web-based browser configured to facilitate access to an external networked location hosted by the external resource. As an illustrative example, the external user interface 700 may comprise a user engagement capture content generation element 702, an address bar 704 comprising a fillable field configured to receive user input corresponding to an external networked location identifier (e.g., a URL address associated with the external networked location), and an external content pane 706 within which external content provided at an external networked location is arranged for display and/or user interaction at the client device. In various embodiments, a collaborative content management server 110 may transmit an instruction to the client device to render a user engagement capture content generation element 702 within the external user interface 700 displayed at the client device. For example, in various embodiments, at least a portion of a collaborative content management system 108 may be configured to operate as a portion (e.g., plug-in, add-on, extension, etc.) of a web-based browser service such that the collaborative content management server 110 may communicate (e.g., transmit and/or receive data) with a client device configured to utilize the web-based browser service to access external content hosted at an external networked location by an external resource and/or the external resource associated with the external content rendered within the external user interface 700. In such an exemplary circumstance, such as, for example, wherein the exemplary external user interface 700 is rendered for display at a client device using a web-based browser associated with a web-based plug-in, application, extension, and/or the like associated with the collaborative content management system 108, at least a portion of the external content rendered within the external user interface 700 may be selectively engaged by a user via user input at the client device. Further, as illustrated in FIG. 7A, the collaborative content management server 110 may transmit an instruction to the client device 102a to render a user engagement capture content generation element associated with the collaborative content management system 108 within the external user interface 700 to enable user access to one or more functionalities of the collaborative content management system 108 via the external user interface 700, such as, for example, enabling a content generation workflow to be initiated by user input at the external user interface 700 by facilitating the communication of collaborative content generation requests associated with a captured content source identifier associated with an external resource to be communicated from the client device displaying the external user interface 700 to the collaborative content management server 110.

In various embodiments, upon receiving a selection of a user engagement capture content generation element 702 rendered within an external user interface 700 from a client device, the collaborative content management server 110 may determine that the client device is not associated with user identifier associated a user profile associated with the collaborative content management system 108. As illustrated in FIG. 7A, the collaborative content management server 110 may cause rendering of an interactive dialog 708 within the external user interface 700 displayed at the unauthorized client device. For example, the interactive dialog 708 is generated by the collaborative content management server 110 to be rendered within the external user interface 700 displayed at the client device from which the selection of the user engagement capture content generation element 702 was received. As illustrated, the interactive dialog 708 may render at least one interactive dialog input element 710 comprising a fillable field configured to receive user input corresponding to user credential data (e.g., username, password, and/or the like) associated with a user profile associated with the collaborative content management system 108. As described in further detail herein in reference to Blocks 602-608 of FIG. 6A, upon verifying that the user input received at the interactive dialog 708 (e.g., the interactive dialog input element 710) comprises user credential data associated with a user profile, the collaborative content management server 110 may associate the client device with the corresponding user identifier associated with the user profile.

In various embodiments, such as, for example, wherein a client device displaying an exemplary external user interface 700 is associated with a user identifier, the collaborative content management server 110 may transmit an instruction to the client device to configure the user engagement capture content generation element 702 such that a user selection of thereof may initiate one or more operations of a content generation workflow. Further, as described herein in further detail in reference to Block 614 of FIG. 6A, an external user interface 700 may comprise external content from an external networked location provided within the external content pane 706 of the external user interface 700 and rendered for display at the client device by an external resource. In such an exemplary circumstance, the external user interface 700 rendered for display at the client device may comprise both the user engagement capture content generation element associated with the collaborative content management server 110 and the external content associated with the external resource such that a content generation workflow associated with a captured content source identifier comprising an external resource identifier associated with the external resource may be initiated by a user at the external user interface 700 defined at least in part by an external networked location. That is, in various embodiments, a content generation workflow may be initiated from an exemplary external user interface 700 defined at least in part by an external networked location such that the collaborative content management system 108 may execute a content generation workflow wherein the source content data object comprises external content hosted by an external resource, as described herein.

As described herein, user input comprising a selection of a user engagement capture content generation element 702 provided within an external user interface 700 and/or a designation of at least a portion of the external content provided within the external user interface 700 may be received at the client device associated with the user identifier that is displaying external user interface 700. For example, in various embodiments, the user selection of the user engagement capture content generation element 702 provided within the external user interface 700 displaying external content provided at an external networked location associated with an external resource 106 may indicate an intent of the user associated with the user identifier associated with the client device to capture at least a portion of the external content rendered within the external content pane 706 of the external user interface 700, such as, for example, a webpage element corresponding to the collective external networked location as a whole and/or one or more external content objects defined therein, such that a collaborative content data object corresponding thereto may be generated in association with a collaborative content document of the collaborative content management system 108 for subsequent rendering within a corresponding collaborative content interface. Further, in various embodiments, an external user interface 700 may be configured such that a user selection of the user engagement capture content generation element 702 may be accompanied by further user input comprising a specific designation of at least a portion of the external content provided within the external user interface 700 (e.g., at the external content pane 706), such as, for example, one or more text elements, one or more image elements, a webpage element corresponding to the external networked location, and/or the like may be selected, highlighted, and/or otherwise designated via user input at the client device so as to indicate an intent of the user associated with the user identifier associated with the client device to capture the specifically designated (e.g., selected, highlighted, and/or the like) external content rendered within the external content pane 706 of the external user interface 700.

In various embodiments, as illustrated in FIG. 7B, a collaborative content management server 110 may be configured to generate an interactive dialog 712 for rendering within the external user interface 700 comprising the user engagement capture content generation element 702 in response to receiving data from the client device that is indicative of a user selection of the user engagement capture content generation element 702 associated with the collaborative content management system 108, such as, for example, an initial collaborative content generation request, as described herein. FIG. 7B illustrates an exemplary external user interface 700 structured in accordance with various embodiments of the present disclosure. In particular, FIG. 7B illustrates an external user interface 700 that corresponds to the same external networked location as the exemplary external user interface 700 shown in FIG. 7A. As illustrated, the collaborative content management server 110 may cause rendering of an interactive dialog 712 within the external user interface 700 displayed at a client device associated with the user identifier associated with the initial collaborative content generation request, as described herein. In various embodiments, the interactive dialog 712 rendered within an external user interface 700 may comprise a plurality of interactive dialog input elements configured to facilitate the receipt of user input comprising a collaborative content document selection and a content type selection, as described herein. For example, as described in further detail herein in reference to Block 630 of FIG. 6B, an interactive dialog 712 may include one or more interactive dialog input elements configured to facilitate a collaborative content document selection defined by a user selection of a collaborative content document (e.g., a destination document) to which a generated collaborative content data object corresponding to captured external content, as designated by a user selection received at the external content interface 700, is to be incorporated, such as, for example, a first interactive dialog input element 716 and a second interactive dialog input element 718. Further, the interactive dialog 712 may include one or more interactive dialog input elements configured to facilitate a content type selection defined by a user selection of a particular content type identifier corresponding to a content type by which a generated collaborative content data object corresponding to the captured external content, as designated by a user selection received at the external content interface 700, is to be defined, such as, for example, a third interactive dialog input element 714. Alternatively, or additionally, an exemplary interactive dialog 712 may render an interactive dialog input element 710 comprising a fillable field configured to receive user input embodying textual data representing user commentary (e.g., notes) relating to the user-identified external content that may be stored by the collaborative content management server 110 in association with the generated collaborative content data object as part of the collaborative content document data structure defining the collaborative content document such that the user input may be rendered within the collaborative content interface along with the generated collaborative content data object corresponding to the external content.

In various embodiments, the interactive dialog 712 rendered within the external user interface 700 may further comprise a selectable content generation workflow initiation element 720 configured to receive user selection thereof as confirmation of the desire of the user to capture user-identified external content rendered within the external content pane 706 of the external user interface 700 and generate a collaborative content data object in association with a collaborative content document associated with the collaborative content document identifier selected via user input received at the second interactive dialog input element 718 such that at least a portion of the collaborative content document includes a collaborative content data object defined by a supported data format that represents an at least partial reproduction of the external content associated with the external resource, as rendered within the external user interface 700. In various embodiments, the collaborative content document selection of a collaborative content document identifier at the second interactive dialog input element 718, the content type selection of a content type identifier at the third interactive dialog input element 714 and subsequent selection of the content generation workflow initiation element 720 may cause a collaborative content generation request associated with a captured content source identifier (e.g., an external resource identifier associated with the external resource) to be transmitted to the collaborative content management server 110, as described herein in further detail in reference to Blocks 632 and 634 of FIG. 6B.

Figure 8B:
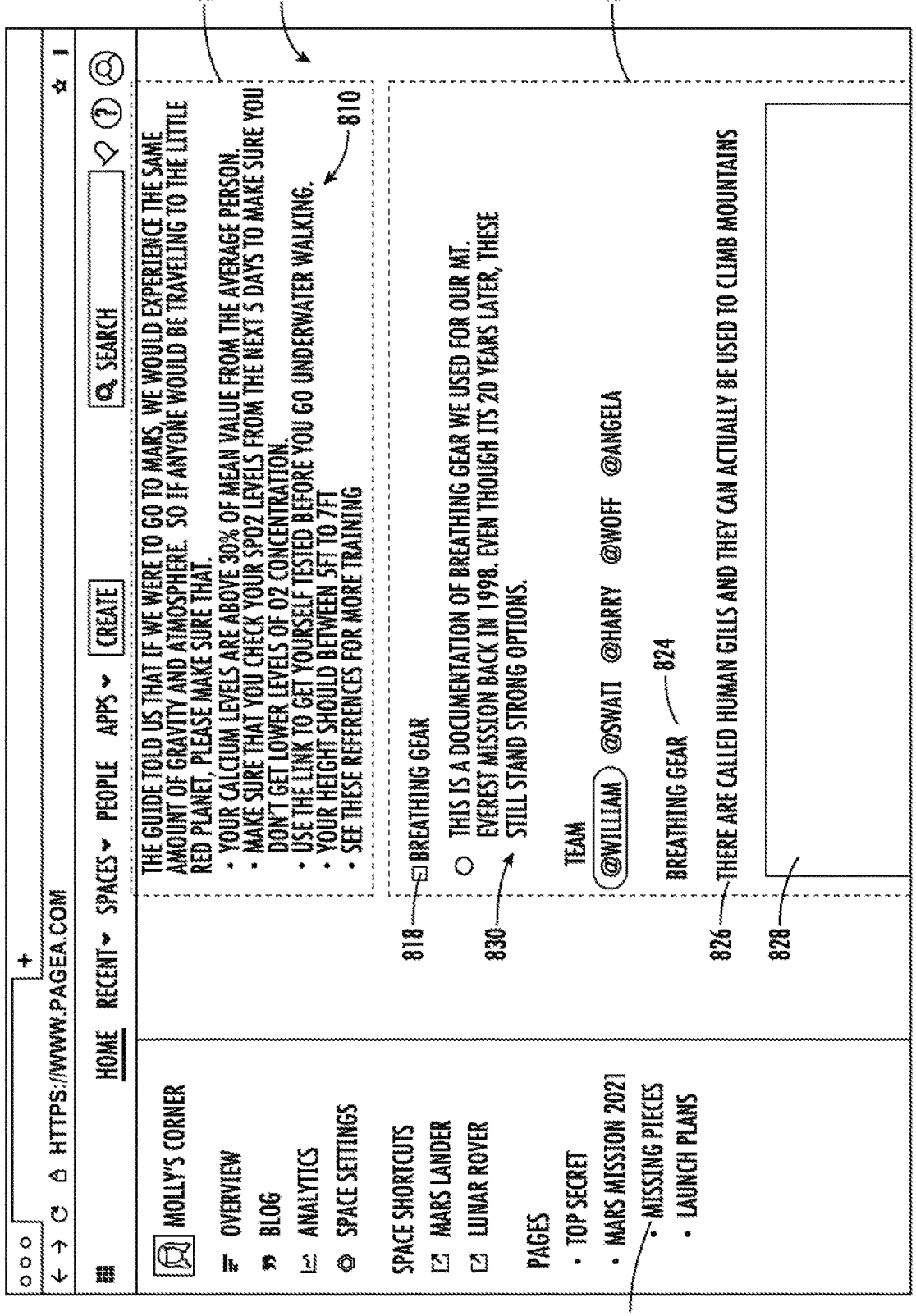

FIGS. 8A and 8B illustrate an exemplary collaborative content interface 800 structured in accordance with various embodiments of the present disclosure. In some embodiments, the collaborative content interface 800 is configured for rendering to at least one client device. For example, as described herein, in various embodiments, the collaborative content management server 110 may cause rendering of the collaborative content interface 800 such that at least a portion of a collaborative content document data structure defining the corresponding collaborative content document is displayed at a client device according to a specific format for a collaborative content document of the collaborative content management system 108, such as the Atlassian® Document Format (ADF). In particular, FIGS. 8A and 8B illustrate an exemplary collaborative content interface 800 corresponding to a collaborative content document that is defined by a plurality of collaborative content data objects generated by the collaborative content management server 110 as the result of a respective plurality of content generation workflows executed by the collaborative content management system 108.

As described herein, the collaborative content management system 108 may execute a plurality of content generation workflows that are each associated with the same collaborative content document identifier such that a plurality of collaborative content data objects are generated, each corresponding to a respective source content data object (e.g., a source collaborative content data object or external content associated with an external resource), and stored at the collaborative content management system repository 112 in association with the collaborative content document identifier such that the collaborative content document data structure associated with the collaborative content document identifier is updated to include each of the plurality of generated collaborative content data objects. In such an exemplary circumstance, each of the plurality of generated collaborative content data objects associated with the collaborative content document identifier embody a respective portion of the collaborative content document defined by the collaborative content document data structure. As described herein, the collaborative content management server 110 may execute the aforementioned plurality of content generation workflows and respective storage operations such that each of the plurality of generated collaborative content data objects may be incorporated into the collaborative content document without requiring the corresponding collaborative content interface to be rendered in order for the collaborative content document data structure that defines the collaborative content document to be updated. As such, each of the plurality of content generation workflows described above may be executed by the collaborative content management system 108 without requiring a user associated with the client device to navigate away from the respective captured content sources.

Figure 4D:
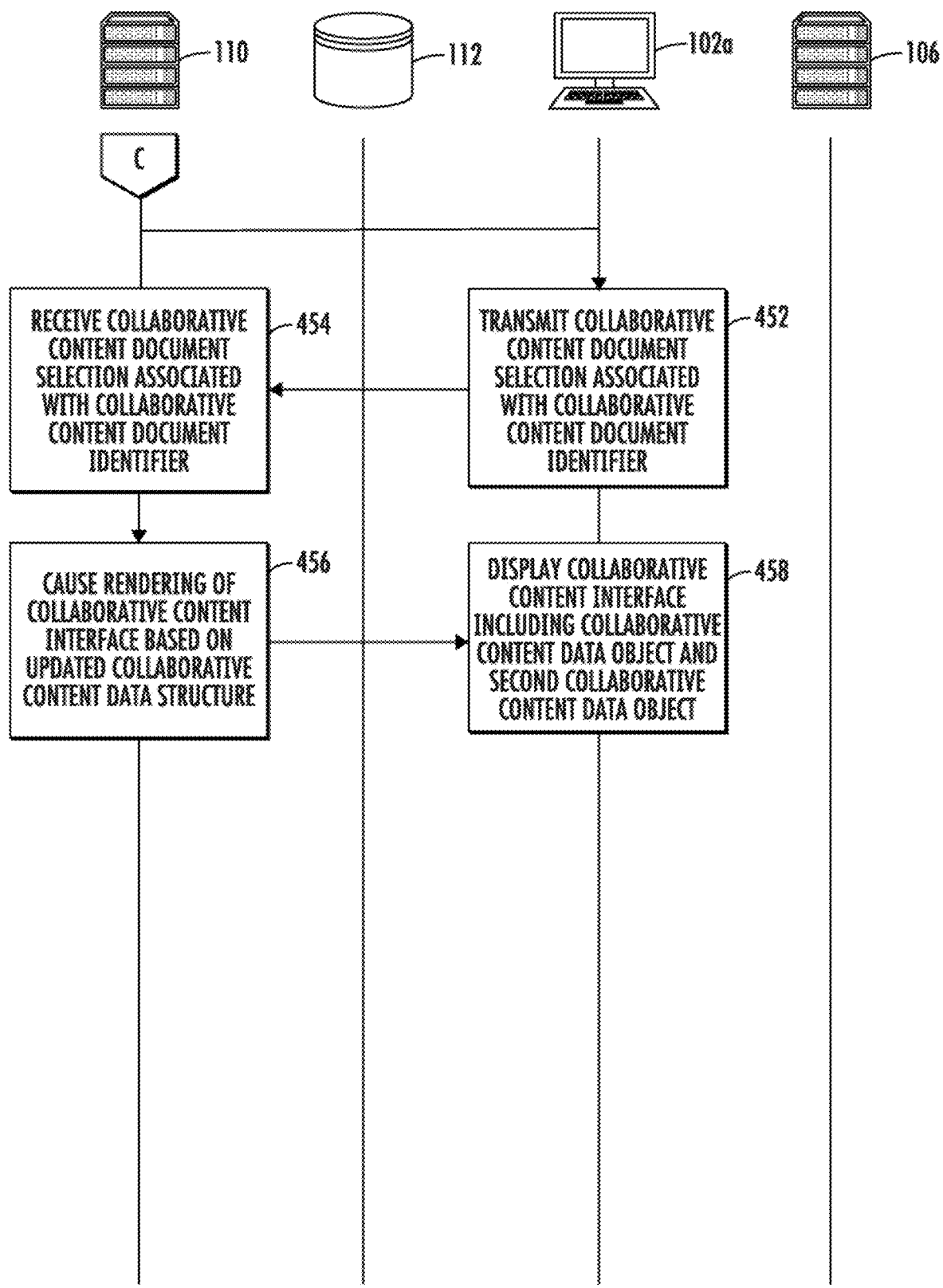

As described in further detail herein in reference to Blocks 438, 458, and 658 of FIGS. 4C, 4D, and 6C, respectively, upon receipt of a user selection of a selectable collaborative content document identifier element associated with the collaborative content document, the collaborative content management server 110 may cause rendering of the collaborative content interface corresponding to the collaborative content document associated with the collaborative content document identifier based at least in part on the collaborative content document data structure associated therewith. For example, as illustrated in FIGS. 8A and 8B, the selectable collaborative content document identifier element 802 associated with the collaborative content document identifier associated with the collaborative content document may rendered within a user interface for display at a client device such that a user, via the client device, may access the selectable collaborative content document identifier element 802 and provide user input comprising a selection thereof so as to cause the collaborative content management server 110 to render the collaborative content interface (e.g., collaborative content interface 800) associated therewith for display at the client device. In the exemplary circumstance describe above, wherein a plurality of content generation workflows associated with the collaborative content document identifier are executed such that the respective plurality of generated collaborative content data objects are incorporated into the collaborative content document, upon rendering of a collaborative content interface corresponding to the collaborative content document, the corresponding collaborative content interface comprises each of the plurality of generated collaborative content data objects rendered therein for display at a client device. For example, as described herein, each of the plurality of generated collaborative content data objects corresponding to a respective source content data object may be presented within the collaborative content interface corresponding to the collaborative content document according to a specific supported data format that defines each collaborative content document of the collaborative content management system 108, such as the Atlassian® Document Format (ADF).

As an illustrative example, the exemplary collaborative content interface 800 illustrated in FIGS. 8A and 8B corresponds to a collaborative content document that is defined by a plurality of collaborative content data objects generated by the collaborative content management server 110 as the result of a respective plurality of content generation workflows, wherein each of the plurality of collaborative content data objects corresponds to a respective source content data object from a respective plurality of captured content sources. As illustrated, the exemplary collaborative content interface 800 associated with the collaborative content document identifier may comprise one or more of a selectable collaborative content document identifier element 802, a collaborative content document title element 804, a collaborative content document contextual data element 806 comprising contextual data associated with the collaborative content document identifier associated with the collaborative content interface 800, as described herein, one or more document summarization user interface elements (e.g., a first document summarization user interface element 812 and a second document summarization user interface element 814) each configured to depict at least a portion of an abstractive summary generated in association with the collaborative content document, at least one collaborative content document section title element 816, and at least one captured content source identifier interface elements 820 associated with each of the collaborative content data objects incorporated at the collaborative content interface 800 as the result of a content generation workflow (e.g., a selectable link corresponding to the captured content source associated with the source content data object corresponding to the generated collaborative content data object), and/or any combination thereof.

As illustrated, the exemplary collaborative content interface 800 comprises a plurality of collaborative content data objects generated by the collaborative content management server 110 as the result of a respective plurality of content generation workflows associated with the collaborative content document identifier associated with the collaborative content interface 800, including the first generated collaborative content data object 806 and the second generated collaborative content data object 822. For example, in various embodiments, the collaborative content document data structure defining the collaborative content document corresponding to the collaborative content interface 800 may be configured to structure the collaborative content document as a multi-section document configured to structure a plurality of generated collaborative content data objects defined within the collaborative content document into a plurality of distinct sections, each of which comprises a defined subset of the text and/or other content within a collaborative content document. In various embodiments wherein a collaborative content document corresponding to an exemplary collaborative content interface 800 comprises a multi-section document, each of the plurality of generated collaborative content data objects incorporated into the collaborative content document may be stored as part of the collaborative content document data structure defining the collaborative content document, and may each be associated with a respective section identifier associated with the respective plurality of sections defined within the collaborative content document. In such an exemplary circumstance, the collaborative content interface 800 corresponding to the collaborative content multi-section document may be organized upon rendering thereof such that the collaborative content interface 800 is segmented into a plurality of sections, each corresponding to a respective generated collaborative content data object associated with a corresponding content generation workflow identifier. For example, in the exemplary embodiment illustrated in FIGS. 8A-8B, the collaborative content interface 800 is structured such that the first generated collaborative content data object 806 is arranged within a first section of the collaborative content document and the second generated collaborative content data object 822 is arranged within a second section of the collaborative content document.

The first generated collaborative content data object 806 rendered within the collaborative content interface 800 comprises a text element 810 that was generated by the collaborative content management server 110 based on a source content data object comprising a source collaborative content data object provided within the collaborative content management system 108 at a source collaborative content document. For example, the first generated collaborative content data object 806 was generated by the collaborative content management server 110 as a result of a content generation workflow initiated by a collaborative content generation request associated with a captured content source identifier that was a collaborative content document identifier. As such, as described in further detail herein in reference to Blocks 426 and 428 of FIG. 4B, as well as FIGS. 5B and 5C, generating the first generated collaborative content data object 806 may include the collaborative content management server 110 at least substantially copying the source collaborative content data object associated with the text element 810 and storing the first generated collaborative content data object 806 in association with the collaborative content document data structure defining the collaborative content document corresponding to the collaborative content interface 800. Further, the first generated collaborative content data object 806 rendered within the collaborative content interface 800 comprises a collaborative content document identifier section title element 816 that was generated by the collaborative content management server 110 by parsing the source collaborative content document to detect source content metadata associated with the source collaborative content document and generating collaborative content metadata associated with the first generated collaborative content data object 806 based at least in part on the source content metadata associated with the source collaborative content document. Further still, the first generated collaborative content data object 806 rendered within the collaborative content interface 800 may further comprise a captured content source identifier interface element 820 associated with the captured content source identifier associated with the captured content source from which the first generated collaborative content data object 806 was captured. For example, the captured content source identifier interface element 820 may be associated with the first generated collaborative content data object 806 such that the captured content source identifier interface element 820 comprises a selectable link to the captured content source (e.g., a link to an external networked location or a link to a source collaborative content document associated with the source content data object corresponding to the first generated collaborative content data object 806). In various embodiments, a collaborative content management server 110 may generate a captured content source identifier interface element (e.g., 820) to be rendered in association with each generated collaborative content data object incorporated into the collaborative content document as the result of a content generation workflow.

In various embodiments, an exemplary collaborative content interface 800 comprises a first document summarization user interface element 812 configured to depict at least a portion of an abstractive summary generated in association with the collaborative content document, as described herein. For example, the collaborative content interface 800 may be configured such that the first document summarization user interface element 812 is not associated with a section identifier corresponding to a section of the plurality defined by the multi-section document and the first document summarization user interface element 812 is arranged at an at least substantially top portion of the collaborative content interface 800. the Further, as illustrated, an exemplary collaborative content interface 800 comprises a second document summarization user interface element 814 configured to provide one or more captured content source identifier interface elements arranged therein, each corresponding to a respective generated collaborative content data object included in the collaborative content document and being associated with the captured content source identifier associated with the captured content source from which the respective generated collaborative content data object was captured. For example, a collaborative content interface 800 comprising a plurality of generated collaborative content data objects, as described herein, may comprise a second document summarization user interface element 814 that includes a plurality of selectable links (e.g., captured content source identifier interface elements) to each of the captured content sources associated, respectively, with the plurality of generated collaborative content data objects included in the collaborative content document. For example, as a non-limiting example illustrated in the exemplary collaborative content interface 800 shown in FIG. 8A, the second document summarization user interface element 814 comprises a first selectable captured content source identifier interface element associated with a source collaborative content document corresponding to the first generated collaborative content data object 806, a second selectable captured content source identifier interface element associated with a source collaborative content document corresponding to the second generated collaborative content data object 805, and a third selectable captured content source identifier interface element associated with an external networked location corresponding to a third generated collaborative content data object included in the collaborative content document. In various embodiments, the collaborative content interface 800 may be configured such that the second document summarization user interface element 814 is not associated with a section identifier corresponding to a section of the plurality defined by the multi-section document and the second document summarization user interface element 814 is arranged at an at least substantially top portion of the collaborative content interface 800.

As illustrated in FIG. 8B, the second generated collaborative content data object 822 rendered within the collaborative content interface 800 embodies an exemplary collaborative content data object generated as a result of a content generation workflow corresponding to a source content data object that is a collaborative content document. As illustrated, the second generated collaborative content data object 822 may be rendered in a second collaborative content document section of the multi-section collaborative content document, the second collaborative content document section being at least substantially proximate the first collaborative content document section within which the first generated collaborative content document 806 is rendered. For example, the source collaborative content data object corresponding to the second collaborative content data object 822 may comprise an entire collaborative content document from which a content generation workflow was initiated, such that the second generated collaborative content data object 822 comprises each of the collaborative content data objects provided within the source collaborative content document. For example, as illustrated, the second generated collaborative content data object 822 may comprise a plurality of content elements corresponding to the plurality of collaborative content data objects provided within the source collaborative content document. As shown the second generated collaborative content data object 822 comprises a text element 826, an image element 828, and a document summarization user interface element 830, corresponding to a plurality of corresponding collaborative content data objects defined as a text content type, an image content type, and a document summarization user interface element content type, respectively, from the source collaborative content document. That is, in an exemplary circumstance wherein a generated collaborative content data object rendered at an exemplary collaborative content interface 800 corresponds to a source content data object comprising a collaborative content document associated with the collaborative content management system 108, the collaborative content document may be defined by a collaborative content document data structure comprising one or more collaborative content data objects stored in a supported data format such that executing a content generation workflow to generate a collaborative content data object based on an entire source collaborative content document includes the collaborative content management server 110 copying, duplicating, and/or appending at least a portion of the collaborative content document data structure associated with the source collaborative content document for incorporation into the collaborative content document data structure defining the generated collaborative content document.

In various embodiments, as illustrated, the second generated collaborative content data object 822 rendered within the collaborative content interface 800 comprises a collaborative content document identifier section title element 824 that was generated by the collaborative content management server 110 by parsing the source collaborative content document to detect source content metadata associated with the source collaborative content document and generating collaborative content metadata associated with the second generated collaborative content data object 822 based at least in part on the source content metadata associated with the source collaborative content document. Further still, the second generated collaborative content data object 822 rendered within the collaborative content interface 800 may further comprise a captured content source identifier interface element 818 associated with the captured content source identifier associated with the captured content source defining the second generated collaborative content data object 822. For example, the captured content source identifier interface element 818 may be associated with the second generated collaborative content data object 822 such that the captured content source identifier interface element 818 comprises a selectable link to the source collaborative content document that defines the source content data object corresponding to the second generated collaborative content data object 822.

Although the exemplary embodiment illustrated in FIGS. 8A and 8B shows a collaborative content interface 800 comprising a plurality of generated collaborative content data objects rendered therein that each correspond to a source content data object associated with a captured content source comprising a source collaborative content document, it should be understood that various embodiments of the present invention include an exemplary collaborative content interface 800 comprising a generated collaborative content data object rendered therein that corresponds to a source content data object comprising external content such that the captured content source identifier associated with the generated collaborative content data object is associated with an external resource configured to host an external networked location at which the external content (e.g., the source content data object) is provided. As described herein, executing a content generation workflow in order to capture external content hosted by an external resource at an external networked location includes generating a collaborative content data object that represents an at least partially reproduction of the external content that is defined at least in part by a supported data format such that the generated collaborative content data object may be stored as part of a collaborative content document data structure defining a collaborative content document and may be configured for rendering within the collaborative content interface 800 corresponding to the collaborative content document upon the collaborative content document being accessed by a client device (e.g., via a user selection of a selectable collaborative content document identifier element associated therewith).

As described in further detail herein with respect to Block 648 of FIG. 6C, a source content data object comprising external content associated with an external resource may be converted (e.g., via one or more data processing actions) to a supported data format such that the generated collaborative content data object corresponding thereto is configured to be rendered within the collaborative content interface 800 corresponding to the collaborative content document according to a specific supported data format that defines each collaborative content document of the collaborative content management system 108, such as the Atlassian® Document Format (ADF). Further, in various embodiments, a generated collaborative content data object included in a collaborative content document for rendering at an exemplary collaborative content interface 800 corresponding thereto may comprise collaborative content metadata that was generated by the collaborative content management server 110 in a supported data format based on source content metadata retrieved from the external content and/or the external networked location associated via one or more parsing operations executed by the collaborative content management server 110.

For example, as described herein, in various embodiments, the collaborative content interface 800 may be rendered for display at a client device based at least in part on collaborative content metadata associated with a generated collaborative content data object and corresponding to the source content metadata defined by external content and/or an external networked location. For example, a generated collaborative content data object corresponding to a source content data object comprising external content from an external networked location, as rendered within the collaborative content interface 800, may be defined at least in part by a captured content source identifier interface element generated based on source content metadata corresponding to a URL address detected by the collaborative content management server 110 upon parsing the external networked location. Further, a generated collaborative content data object corresponding to a source content data object comprising external content from an external networked location, as rendered within the collaborative content interface 800, may be defined at least in part by one or more section title elements, headings, and/or other structural demarcations that may be generated based on collaborative content metadata corresponding to source content metadata comprising webpage titles, article titles, tabs titles, and/or the like detected by the collaborative content management server 110 upon parsing the external networked location. The captured content source identifier interface element rendered within the collaborative content interface 800 may comprise a selectable link associated with the external networked location that facilitates access thereto via the collaborative content interface 800. Further, in various embodiments, a generated collaborative content data object provided within an exemplary collaborative content interface 800 may comprise a document summarization user interface element generated by the collaborative content management server 110, as described herein, based at least in part on source content metadata retrieved by the collaborative content management server 110 upon executing a data parsing operation associated with the external networked location, such as, by providing at least a portion of the collaborative content metadata corresponding to the source content metadata as input variables into a machine-learning algorithm configured to facilitate generation of the document summarization user interface element, so as to increase the substantive accuracy of the summary provided within document summarization user interface element.

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus for generating content for presentation at a collaborative content interface based on a captured content source, the apparatus comprising at least one processor and at least one memory, the at least one memory having computer-coded instructions therein, wherein the computer-coded instructions are configured to, in execution with the at least one processor, cause the apparatus to:

receive a first collaborative content generation request associated with a captured content source identifier, the captured content source identifier being associated with a captured content source defined at least in part by an external networked location associated with an external resource, wherein:
(i) the first collaborative content generation request comprises a collaborative content document identifier associated with a destination collaborative content document, (ii) the first collaborative content generation request is initiated based at least in part on a user selection of a source content data object at the captured content source, (iii) the captured content source and the destination collaborative content document define distinct computing locations, and (iv) wherein the source content data object is in a format defined by the external resource;

generate a first collaborative content data object associated with the collaborative content document identifier based at least in part on the source content data object accessed based on the captured content source identifier, wherein the first collaborative content data object defines at least a portion of a collaborative content document data structure associated with the collaborative content document identifier;

store the first collaborative content data object at a system repository associated with a collaborative content system such that the first collaborative content data object is stored in a format enabling rendering of the defined portion of the collaborative content document data structure via a collaborative content interface; and cause rendering of the collaborative content interface configured to display the destination collaborative content document associated with the collaborative content document identifier based at least in part on (i) the collaborative content document data structure, (ii) the first collaborative content data object, and (iii) one or more additional collaborative content data objects corresponding to additional portions of the collaborative content document data structure.

2. The apparatus of claim 1, wherein the computer-coded instructions are further configured to, in execution with the at least one processor, cause the apparatus to:

parse the source content data object to determine source content metadata;

wherein the first collaborative content data object generated based at least in part on the source content data object comprises first collaborative content metadata associated with a first collaborative content data object identifier associated with the first collaborative content data object, the first collaborative content metadata being generated based at least in part on the source content metadata.

3. The apparatus of claim 2, wherein the collaborative content interface is further configured to display at least a portion of the first collaborative content metadata.

4. The apparatus of claim 1, wherein causing rendering of the collaborative content interface is based at least in part on a destination collaborative content document selection associated with the collaborative content document identifier and initiated at an authorized client device; and wherein the authorized client device is associated with a user identifier associated with a user profile authorized to access the destination collaborative content document.

5. The apparatus of claim 1, wherein the first collaborative content generation request is initiated at a client device associated with a first user identifier associated with a first user profile authorized to access the destination collaborative content document.

6. The apparatus of claim 5, wherein the computer-coded instructions are further configured to, in execution with the at least one processor, cause the apparatus to:

receive, from the client device, a selection of a user engagement capture content generation element displayed at the client device; and retrieve, from the system repository, first user profile data associated with the first user identifier, wherein the first user profile data comprises one or more collaborative content document identifiers respectively associated with one or more collaborative content documents that the first user profile associated with the first user identifier is authorized to access.

7. The apparatus of claim 6, wherein the computer-coded instructions are further configured to, in execution with the at least one processor, cause the apparatus to:

display at the client device an interactive dialog based at least in part on the first user profile data, wherein the interactive dialog comprises one or more selectable elements corresponding to the one or more collaborative content document identifiers retrieved from the system repository; and receive a destination collaborative content document selection associated with the collaborative document identifier from the client device, the collaborative content document selection being defined by user input provided to the interactive dialog and comprising a selection of a selectable element corresponding to the destination collaborative content document.

8. The apparatus of claim 5, wherein the computer-coded instructions are further configured to, in execution with the at least one processor, cause the apparatus to:

receive first user credentials associated with the first user profile associated with the first user identifier from the client device as user input provided at the client device.

9. The apparatus of claim 1, wherein the computer-coded instructions are further configured to, in execution with the at least one processor, cause the apparatus to:

identify a second collaborative content generation request associated with a second captured content source, the second collaborative content generation request comprising the collaborative content document identifier associated with the destination collaborative content document, and a second source content data object associated with the second captured content source;

generate a second collaborative content data object based at least in part on the second source content data object, wherein the second collaborative content data object is assigned a second collaborative content data object identifier;

associate the generated second collaborative content data object with the collaborative content document identifier;

store the second collaborative content data object at the system repository such that the second collaborative content data object defines at least a portion of the collaborative content document data structure associated with the collaborative content document identifier; and generate an updated collaborative content interface associated with the collaborative content document identifier based at least in part on the collaborative content document data structure such that the updated collaborative content interface is configured to display at least a portion of the second collaborative content data object.

10. The apparatus of claim 1, wherein the first collaborative content generation request further comprises a source content type identifier and a first user identifier associated with a first user profile.

11. The apparatus of claim 1, wherein the computer-coded instructions are further configured to, in execution with the at least one processor, cause the apparatus to:

receive the source content data object from the external resource in an unsupported format defined by the external resource; and processing at least a portion of the source content data object so as to convert the source content data object into a supported format in association with generating the first collaborative content data object.

12. The apparatus of claim 11, wherein the source content data object is received via a proxy endpoint configured to facilitate communication between a collaborative content server associated with the collaborative content system and the external resource, the proxy endpoint being defined at least in part by an application program interface (API).

13. The apparatus of claim 11, wherein the external networked location comprises a webpage hosted by the external resource and displayed at an authorized client device via a web-based browser service.

14. The apparatus of claim 13, wherein processing the at least a portion of the source content data object comprises extracting inline-HTML elements of the source content data object.

15. The apparatus of claim 13, wherein at least a portion of the collaborative content system is defined by a plug-in of the web-based browser service.

16. The apparatus of claim 1, wherein the collaborative content interface is further configured to display a selectable element comprising a link to the external networked location.

17. The apparatus of claim 1, wherein the computer-coded instructions are further configured to, in execution with the at least one processor, cause the apparatus to:

identify a second collaborative content generation request associated with a second captured content source identifier associated with a second captured content source, the second collaborative content generation request comprising the collaborative content document identifier associated with the destination collaborative content document, and a second source content data object associated with the second captured content source identifier, wherein the second captured content source is defined at least in part by a source collaborative content document associated with the collaborative content system, wherein the second source content data object is defined at least in part by a source collaborative content data object that is accessible to a collaborative content server of the collaborative content system, wherein the captured content source identifier comprises a source collaborative content document identifier associated with the source collaborative content document;

generate a second collaborative content data object based at least in part on the second source content data object, wherein the second collaborative content data object is assigned a second collaborative content data object identifier;

associate the generated second collaborative content data object with the collaborative content document identifier, wherein associating the generated second collaborative content data object with the collaborative content document identifier comprises appending the second source content data object to the collaborative content document data structure associated with the collaborative content document identifier;

store the second collaborative content data object at the system repository such that the second collaborative content data object defines at least a portion of the collaborative content document data structure associated with the collaborative content document identifier; and generate an updated collaborative content interface associated with the collaborative content document identifier based at least in part on the collaborative content document data structure such that the updated collaborative content interface is configured to display at least a portion of the first collaborative content data object and at least a portion of the second collaborative content data object.

18. The apparatus of claim 17, wherein the collaborative content interface is further configured to display a selectable element comprising a link to the source collaborative content document.

* * * * *